(12) United States Patent
Finkelshtain et al.

(10) Patent No.: US 7,004,207 B2
(45) Date of Patent: Feb. 28, 2006

(54) REFILLING SYSTEM FOR A FUEL CELL AND METHOD OF REFILLING A FUEL CELL

(75) Inventors: Gennadi Finkelshtain, Shoham (IL); Mark Estrin, Meuhad (IL); Moti Meron, Hrzeliya (IL); Eric Torgeman, Tel Aviv (IL); Rami Hashimshony, Pardes Hanna (IL)

(73) Assignee: More Energy Ltd., Yehud (IL)

( * ) Notice: Subject to any disclaimer, the term of this patent is extended or adjusted under 35 U.S.C. 154(b) by 0 days.

(21) Appl. No.: 10/758,081

(22) Filed: Jan. 16, 2004

(65) Prior Publication Data

US 2005/0155668 A1  Jul. 21, 2005

(51) Int. Cl.
*B65B 1/04* (2006.01)

(52) U.S. Cl. .................... 141/2; 141/18; 141/114; 141/286; 141/100; 141/9; 429/19; 429/34

(58) Field of Classification Search .......... 141/1, 141/2, 18, 9, 100, 114, 286, 301, 302; 429/19, 429/34
See application file for complete search history.

(56) References Cited

U.S. PATENT DOCUMENTS

| | | | |
|---|---|---|---|
| 4,771,295 A * | 9/1988 | Baker et al. | 347/87 |
| 5,599,640 A | 2/1997 | Lee et al. | |
| 5,804,329 A | 9/1998 | Amendola | |
| 6,610,433 B1 * | 8/2003 | Herdeg et al. | 429/17 |
| 6,924,054 B1 * | 8/2005 | Prasad et al. | 429/34 |
| 2002/0083640 A1 | 7/2002 | Finkelshtain et al. | |
| 2002/0094459 A1 | 7/2002 | Finkelshtain et al. | |
| 2002/0142196 A1 | 10/2002 | Finkelshtain et al. | |
| 2003/0099876 A1 | 5/2003 | Finkelshtain et al. | |

\* cited by examiner

*Primary Examiner*—Steven O. Douglas
(74) *Attorney, Agent, or Firm*—Greenblum & Bernstein, P.L.C.

(57) ABSTRACT

System for refilling a fuel cell wherein the system includes a main container having at least one movable fuel container, at least one movable electrolyte container, and at least one spent fuel chamber. A valve which regulates or controls fluid flow between the main container and a fuel cell and vice versa. A method of refilling a fuel cell provides for moving the at one movable fuel container and the at least one movable electrolyte container to cause spent fuel from fuel cell to enter the at least one spent fuel chamber. This Abstract is not intended to define the invention disclosed in the specification, nor intended to limit the scope of the invention in any way.

117 Claims, 46 Drawing Sheets

REFILLING SYSTEM FOR A FUEL CELL AND METHOD OF REFILLING A FUEL CELL

BACKGROUND OF THE INVENTION

1. Field of the Invention

The present invention relates to a refilling system for a refillable liquid fuel cell. The invention also relates to a refilling device, e.g., a cartridge, for refilling a fuel cell. The present invention also relates to a refilling system for refillable liquid fuel cell wherein the fuel comprises a binary product whose components are stored separately. Additionally, the invention relates to a method of refilling a fuel cell using a refilling device.

2. Discussion of Background Information

Fuel cells produce electricity by bringing a fuel into contact with a catalytic anode. At the same time, an oxidant is brought into contact with a catalytic cathode. There are a lot of well-known problems with conventional fuel ($H_2$, $CH_3OH$) storage and transportation associated with fuel cells, especially in the field of portable fuels and fuel cells. As the fuel cell produces electricity, the liquid fuel and the electrolyte in a refillable liquid fuel cell are gradually exhausted of their useful components. After a period of use, the spent liquid fuel and the spent electrolyte need to be removed from the fuel cell and replaced. This process is not easily and/or economically accomplished. Refilling the fuel cell also presents other difficulties due to the hazardous nature of the spent liquid fuel and the spent electrolyte. Thus, there is a need for a refillable device for refillable liquid fuel cell which allows one to perform the refilling process more easily, more economically, and more safely.

SUMMARY OF THE INVENTION

The invention thus provides for a refilling system and/or cartridge which can, among other things, perform one or more of the following: separately storing two components, one of which is at least one fuel component and another of which is an electrolyte; mixing these two components at the time the liquid fuel cell is refilled with fuel and electrolyte; and removing and storing the spent fuel by-products of the fuel cell after refueling.

The invention is thus directed to a system for refilling a fuel cell wherein the system comprises a main container comprising at least one movable fuel container, at least one movable electrolyte container, and at least one spent fuel chamber, and a valve which regulates, e.g., controls, fluid flow between the main container and a fuel cell and vice versa.

The at least one movable fuel container may comprise a bellows container. The at least one movable fuel container may comprise an axially compressible container. The at least one movable fuel container may comprise a variable volume container. The at least one movable electrolyte container may comprise a bellows container. The at least one movable electrolyte container may comprise a axially compressible container. The at least one movable electrolyte container may comprise a variable volume container.

The system may further comprise an outer sleeve movably mounted to the main container.

The main container may comprise an outer wall which surrounds the at least one movable fuel container, the at least one movable electrolyte container, and the at least one spent fuel chamber. The at least one spent fuel chamber may comprise a first spent fuel chamber and a second spent fuel chamber. The at least one movable fuel container may be movable between a position inside the first spent fuel chamber to a position outside the first spent fuel chamber. The at least one movable electrolyte container may be movable between a position inside the second spent fuel chamber to a position outside the second spent fuel chamber. The system may further comprise a separating wall arranged between the first and second spent fuel chambers. The at least one movable electrolyte container may be movable between a position inside the second spent fuel chamber to a position outside the second spent fuel chamber.

The system may further comprise a piston coupled to the at least one movable fuel container, wherein the piston is movable within the at least one spent fuel chamber. The system may further comprise a piston coupled to the at least one movable electrolyte container, wherein the piston is movable within the at least one spent fuel chamber.

The at least one spent fuel chamber may comprise a first spent fuel chamber and a second spent fuel chamber, and may further comprising a first piston coupled to the at least one movable fuel container, wherein the first piston is movable within the first spent fuel chamber and a second piston coupled to the at least one movable electrolyte container, wherein the second piston is movable within the second spent fuel chamber.

The system may further comprise fuel arranged within the at least one movable fuel container and electrolyte arranged within the at least one movable electrolyte container.

The valve may comprise a first part which is coupled to the main container and a second part which is coupled to the fuel cell. The first part may be rotatably mounted to the second part. The first part may be releasably connectable to the second part. When the first part is disconnected from the second part, the first part may prevent fluid from exiting out of the main container and the second part may prevent fluid from exiting out of the fuel cell.

The valve may comprise a closed position and an opened position. The valve may comprise a plurality of exit ports which are in fluid communication with the fuel cell.

The system may further comprise a securing cap that secures the main container to the valve.

The invention also provides for a method of refilling a fuel cell with a valve and a main container that comprises at least one movable fuel container, at least one movable electrolyte container, and at least one spent fuel chamber, wherein the method comprises moving the at one movable fuel container and the at least one movable electrolyte container to cause spent fuel from fuel cell to enter the at least one spent fuel chamber.

The method may further comprise controlling fluid flow between the main container and a fuel cell.

The method may further comprise, after the moving, compressing the least one of the at one movable fuel container and the at least one movable electrolyte container to cause fuel and electrolyte to enter into the fuel cell.

The method may further comprise, after the moving, forcing fuel and electrolyte to enter into the fuel cell from the least one of the at one movable fuel container and the at least one movable electrolyte container. The at least one movable fuel container may comprise a bellows container. The at least one movable fuel container may comprise a axially compressible container.

The method may further comprise, before the moving, coupling one portion of the valve to the main container and another portion of the valve to the fuel cell.

The method may further comprise, before the moving, placing the valve in fluid communication with the main container and the fuel cell.

The method may further comprise, before the moving, coupling one portion of the valve to the main container and another portion of the valve to the fuel cell and thereafter connecting the one portion to the another portion. The method may further comprise controlling fluid flow between the main container and a fuel cell and vice versa with the valve.

The method may further comprise, before the moving, securely attaching a male portion of the valve to the main container and securely attaching a female portion of the valve to the fuel cell and thereafter connecting the male portion and the female portion to each other. The method may further comprise, after the moving, disconnecting the male portion of the valve from the female portion of the valve, and preventing, with the male portion, spent fuel from exiting the main container and preventing with the female portion, fuel and electrolyte from exiting the fuel cell.

The invention also provides for a cartridge for refilling a fuel cell, wherein the cartridge comprises a main container comprising at least one movable fuel container, at least one movable electrolyte container, and at least one spent fuel chamber, and a device that moves the at least one movable fuel container and at least one movable electrolyte container.

The device may comprise an outer sleeve which is coupled to the at least one movable fuel container and the at least one movable electrolyte container. The at least one movable fuel container may comprise a bellows container. The at least one movable fuel container may comprise a axially compressible container. The at least one movable fuel container may comprise a variable volume container. The at least one movable electrolyte container may comprise a bellows container. The at least one movable electrolyte container may comprise a axially compressible container. The at least one movable electrolyte container may comprise a variable volume container. The at least one movable fuel container may comprise an outer bellows container and an inner bellow container. The main container may comprise an outer wall which surrounds the at least one movable fuel container, the at least one movable electrolyte container, and the at least one spent fuel chamber.

The at least one spent fuel chamber may comprise a first spent fuel chamber and a second spent fuel chamber. The at least one movable fuel container may be movable between a position inside the first spent fuel chamber to a position outside the first spent fuel chamber. The at least one movable electrolyte container may be movable between a position inside the second spent fuel chamber to a position outside the second spent fuel chamber. The cartridge may further comprise a separating wall arranged between the first and second spent fuel chambers. The at least one movable electrolyte container may be movable between a position inside the second spent fuel chamber to a position outside the second spent fuel chamber.

The cartridge may further comprise a piston coupled to the at least one movable fuel container, wherein the piston is movable within the at least one spent fuel chamber.

The cartridge may further comprise a piston coupled to the at least one movable electrolyte container, wherein the piston is movable within the at least one spent fuel chamber.

The at least one spent fuel chamber may comprise a first spent fuel chamber and a second spent fuel chamber, and may further comprise a first piston coupled to the at least one movable fuel container, wherein the first piston is movable within the first spent fuel chamber and a second piston coupled to the at least one movable electrolyte container, wherein the second piston is movable within the second spent fuel chamber.

The cartridge may further comprise fuel arranged within the at least one movable fuel container and electrolyte arranged within the at least one movable electrolyte container.

The cartridge may further comprise a valve coupled to the main container. The valve may comprise first and second parts and wherein the first is disconnectable from a second part, whereby the first part prevents fluid from exiting out of the main container and the second part prevents fluid from exiting out of a fuel cell. The valve may comprise a closed position and an opened position. The valve may comprise a plurality of exit ports which are adapted for fluid communication with the fuel cell.

The cartridge may further comprise a valve and a securing cap that secures the main container to the valve.

The invention also provides for a system for refilling a fuel cell, wherein the system comprises a main container comprising at least one movable fuel container, at least one movable electrolyte container, and two spent fuel chambers, a valve which regulates or controls fluid flow between the main container and a fuel cell and vice versa. The valve comprises a first portion coupled to the main container and a second portion coupled to the fuel cell. The first portion is removably connectable to the second portion.

The at least one movable fuel container may comprise a bellows container. The at least one movable fuel container may comprise an axially compressible container. The at least one movable fuel container may comprise an outer bellows container and an inner bellows container. The at least one movable electrolyte container may comprise a bellows container. The at least one movable electrolyte container may comprise a axially compressible container. The at least one movable electrolyte container may comprise a variable volume container.

The system may further comprise an outer sleeve movably mounted to the main container.

The main container may comprise an outer wall which surrounds the at least one movable fuel container, the at least one movable electrolyte container, and the two spent fuel chambers. The two spent fuel chambers may be configured to retain therein the at least one movable fuel container and the at least one movable electrolyte container. The at least one movable fuel container may be movable between a position inside one of the two spent fuel chambers to a position outside thereof. The at least one movable electrolyte container may be movable between a position inside one of the two spent fuel chambers to a position outside thereof.

The system may further comprise a separating wall arranged between the two spent fuel chambers.

Each of the at least one movable fuel and electrolyte containers may be movable between a position inside the two spent fuel chambers to a position outside thereof.

The system may further comprise a piston coupled to the at least one movable fuel container, wherein the piston is movable within one of the two spent fuel chambers. The system may further comprise a piston coupled to the at least one movable electrolyte container, wherein the piston is movable within one of the two spent fuel chambers.

The system may further comprise a first piston coupled to the at least one movable fuel container, wherein the first piston is movable within one of the two spent fuel chambers and a second piston coupled to the at least one movable electrolyte container, wherein the second piston is movable within another of the two spent fuel chambers.

The system may further comprise fuel arranged within the at least one movable fuel container and electrolyte arranged within the at least one movable electrolyte container.

The first portion may be non-removably connected to the main container and the second portion may be non-removably connected to the fuel cell. The first portion may be securely and sealingly connected to the main container and the second portion may be securely and sealingly connected to the fuel cell. The first portion may be rotatably mounted to the second portion. When the first portion is disconnected from the second portion, the first portion may prevent fluid from exiting out of the main container and the second portion may prevent fluid from exiting out of the fuel cell.

The valve may comprise a closed position and an opened position. The valve may comprise a plurality of exit ports which are in fluid communication with the fuel cell.

The system may further comprise a securing cap that secures the main container to the valve.

The invention also provides for a method of refilling a fuel cell with a valve and a main container that comprises an outer sleeve, at least one movable fuel container, at least one movable electrolyte container, and two spent fuel chambers, wherein the method comprises moving an outer sleeve to cause the at least one movable fuel container and the at least one movable electrolyte container to cause spent fuel from fuel cell to enter the two spent fuel chambers, and forcing fuel and electrolyte to enter into the fuel cell from the at least one movable fuel container and the at least one movable electrolyte container.

The forcing may comprise compressing the least one movable fuel container and the at least one movable electrolyte container to cause fuel and electrolyte to enter into the fuel cell.

The method may further comprise controlling fluid flow between the main container and a fuel cell with the valve.

The at least one movable fuel container may comprise a bellows container. The at least one movable fuel container may comprise a axially compressible container.

The method may further comprise, before the moving, coupling one portion of the valve to the main container and another portion of the valve to the fuel cell.

The method may further comprise, before the moving, placing the valve in fluid communication with the main container and the fuel cell.

The method may further comprise, before the moving, coupling one portion of the valve to the main container and another portion of the valve to the fuel cell and thereafter connecting the one portion to the another portion. The method may further comprise controlling fluid flow between the main container and a fuel cell and vice versa with the valve.

The method may further comprise, before the moving, securely attaching a male portion of the valve to the main container and securely attaching a female portion of the valve to the fuel cell and thereafter connecting the male portion and the female portion to each other. The method may further comprise, after the moving, disconnecting the male portion of the valve from the female portion of the valve, and preventing, with the male portion, spent fuel from exiting the main container and preventing, with the female portion, fuel and electrolyte from exiting the fuel cell.

The invention also provides for a cartridge for refilling a fuel cell, wherein the cartridge comprises a main container comprising at least one movable and compressible fuel container, at least one movable and compressible electrolyte container, and two spent fuel chambers. A device moves the at least one movable and compressible fuel and electrolyte containers from a position within the two spent fuel chambers to a position at least partially outside thereof.

The device may comprise an outer sleeve which is coupled to the at one movable and compressible fuel and electrolyte containers. The at least one movable and compressible fuel container may comprise a bellows container. The at least one movable and compressible fuel container may comprise a axially compressible container. The at least one movable and compressible fuel container may comprise a variable volume container. The at least one movable and compressible electrolyte container may comprise a bellows container. The at least one movable and compressible electrolyte container may comprise an axially compressible container. The at least one movable and compressible electrolyte container may comprise a variable volume container. The at least one movable and compressible fuel container may comprise an outer bellows container and an inner bellows container. The main container may comprise an outer wall which surrounds the at least one movable and compressible fuel container, the at least one movable and compressible electrolyte container, and the two spent fuel chambers.

The two spent fuel chambers may comprise a first spent fuel chamber and a second spent fuel chamber. The cartridge may further comprise a separating wall arranged between the first and second spent fuel chambers.

The cartridge may further comprise a piston coupled to the at least one movable and compressible fuel container, wherein the piston is movable within one of the two spent fuel chambers. The cartridge may further comprise a piston coupled to the at least one movable and compressible electrolyte container, wherein the piston is movable within one of the two spent fuel chambers.

The cartridge may further comprise a first piston coupled to the at least one movable and compressible fuel container, wherein the first piston is movable within one of the two spent fuel chambers and a second piston coupled to the at least one movable and compressible electrolyte container, wherein the second piston is movable within another of the two spent fuel chambers.

The cartridge may further comprise fuel arranged within the at least one movable fuel container and electrolyte arranged within the at least one movable electrolyte container.

The cartridge may further comprise a valve coupled to the main container. The valve may comprises first and second parts and wherein the first is disconnectable from a second part, whereby the first part prevents fluid from exiting out of the main container and the second part prevents fluid from exiting out of a fuel cell. The valve may comprise a closed position and an opened position. The valve may comprise a plurality of exit ports which are adapted for fluid communication with the fuel cell.

The cartridge may further comprise a valve and a securing cap that secures the main container to the valve.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 34b shows a cross-section of the valve shown in FIG. 34a;

FIG. 39b shows a cross-section of the valve shown in FIG. 39a;

FIG. 40b shows top view of FIG. 40a;

FIG. 40c shows a cross-section of FIG. 40a;

FIG. 47c shows a cross-section view of the tip portion of the pin shown in FIG. 47a;

FIG. 47d shows a cross-section view of the tip portion of the pushing projection shown in FIG. 47a;

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
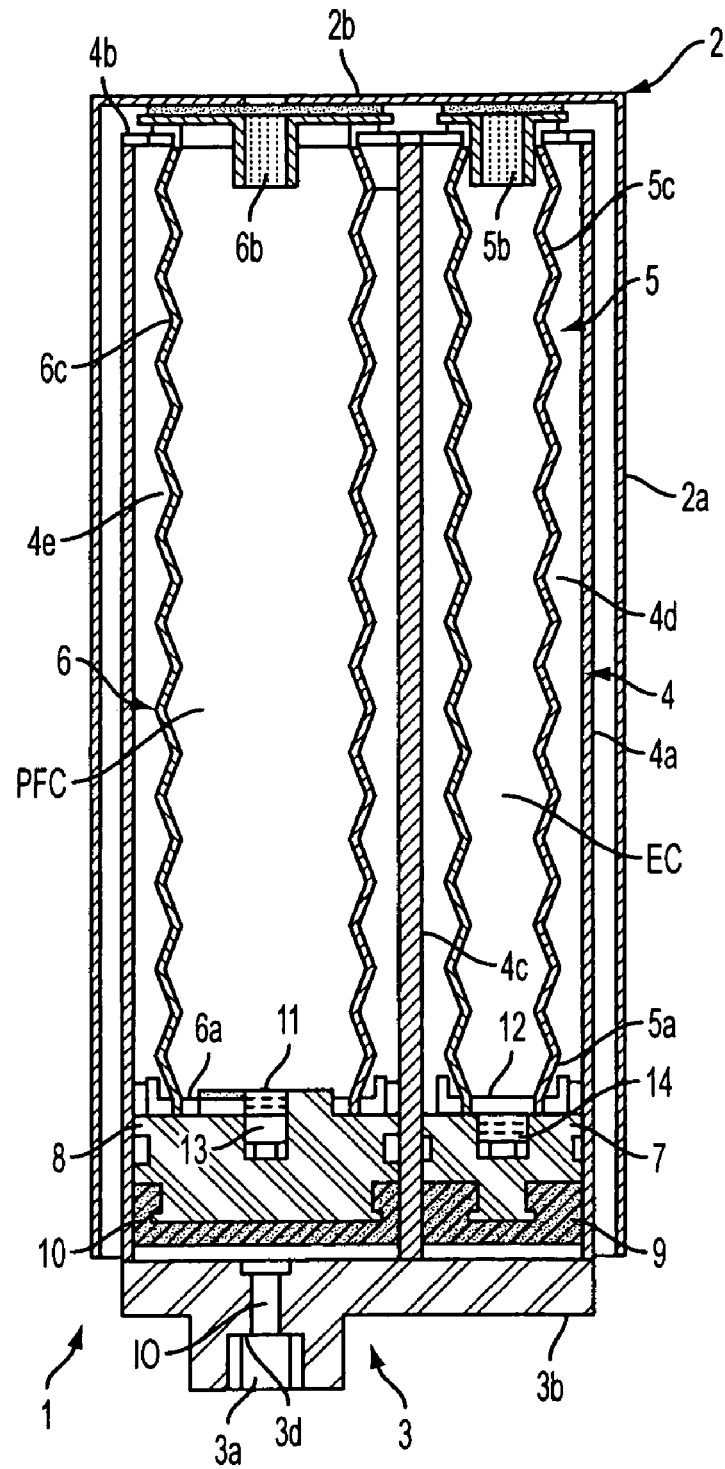
FIG. 1 shows a cross section of one non-limiting embodiment of a cartridge for refilling a fuel cell. This embodiment uses a single fuel supply chamber and a single electrolyte supply chamber.
Figure 2:
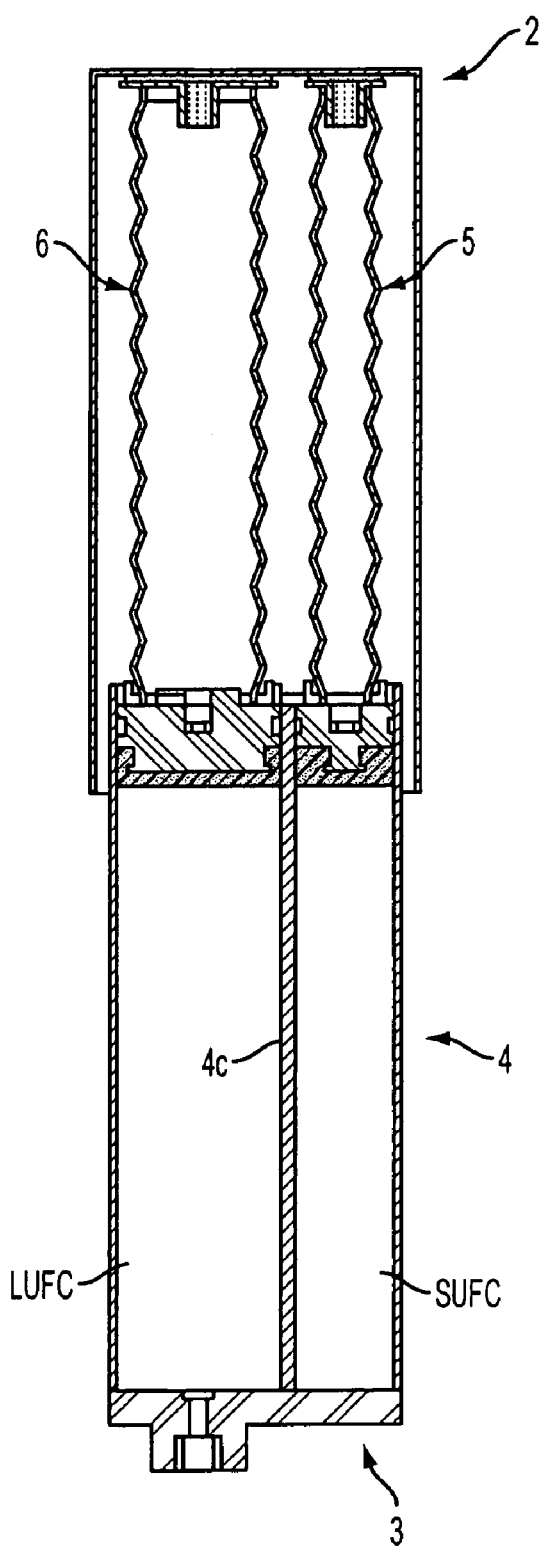
FIG. 2 shows a cross section of the embodiment shown in FIG. 1 after the cartridge assumes an expanded position. During movement to the expanded position from the position shown in FIG. 1, the cartridge draws the spent fuel from the fuel cell into its two spent fuel storing chambers.
Figure 3:
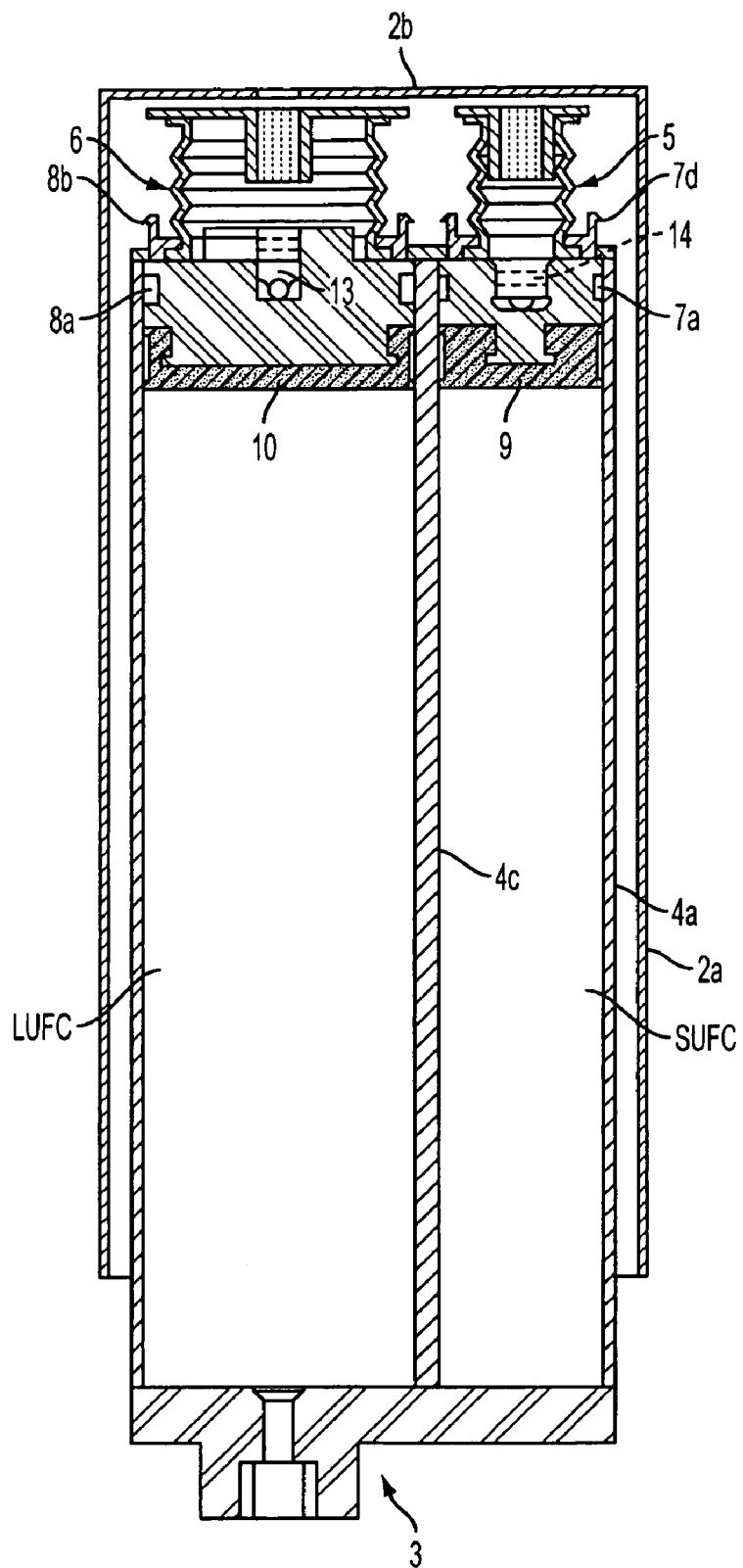
FIG. 3 shows a cross section of the embodiment shown in FIG. 1 after the cartridge assumes a compressed position. Upon movement to the compressed position from the position shown in FIG. 2, the cartridge pumps new or fresh fuel and electrolyte from its new fuel and new electrolyte chambers into the fuel cell.
Figure 4:
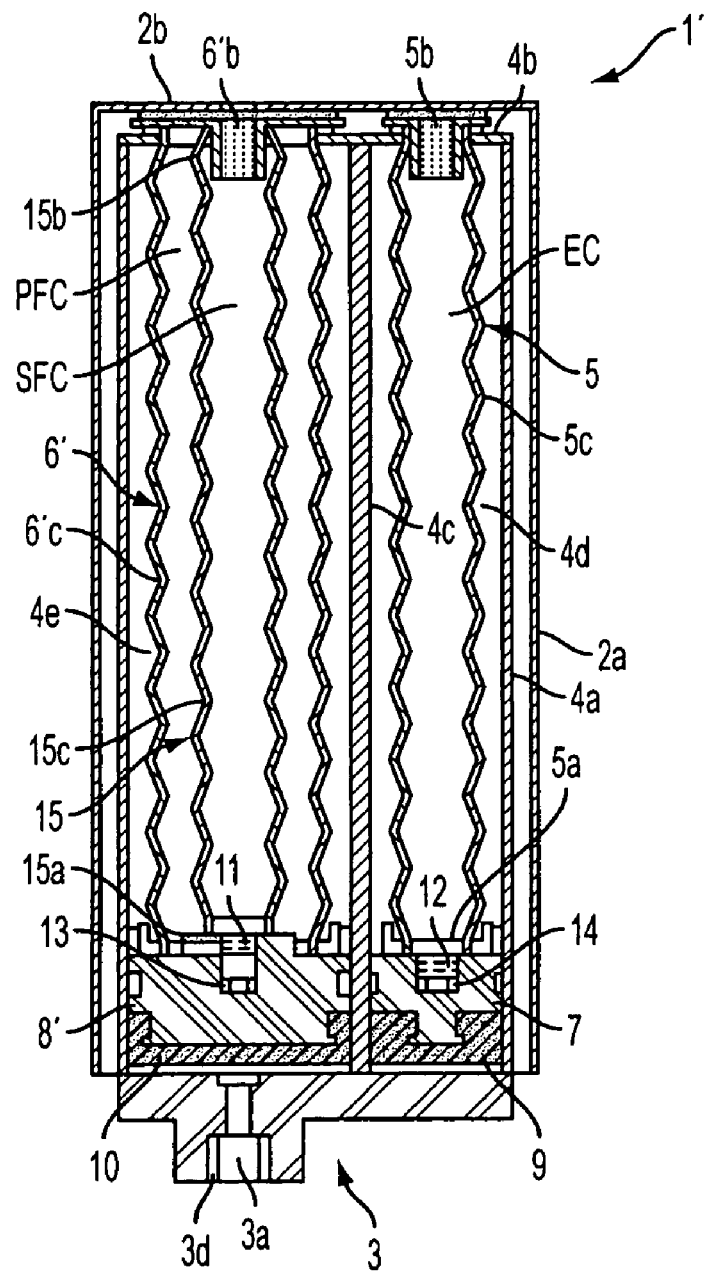
FIG. 4 shows a cross section of another non-limiting embodiment of a cartridge for refilling a fuel cell. This embodiment uses two fuel supply chambers and a single electrolyte supply chamber.

FIGS. 1–3 show a first non-limiting embodiment of the refilling device 1. The device has the form of a cartridge 1 and includes a sleeve member 2 which has an open end, an opening area which receives therein a main body portion 4 and which is defined by a wall 2a, and a closed end 2b. The sleeve member 2 can be, e.g., formed as a one-piece member of plastic (such as, e.g., polyurethane, and preferably ABS plastic, and most preferably polypropylene) and can be made by plastic extrusion. Alternatively, these parts can be formed separately and thereafter connected together by, e.g., ultrasonic welding. The sleeve 2 may have a wall thickness of approximately 2.5 mm, a length of approximately 162.5 mm, an overall width (measured across FIG. 1) of approximately 92 mm and an overall thickness (measured perpendicular to FIG. 1) of approximately 56 mm. The sleeve 2 may also have the same external shape and/or configuration as the sleeve shown in FIG. 6. To facilitate gripping by a user, an outer surface of the sleeve 2 may include a high-fiction surface and/or a textured surface. The outer surface of sleeve 2 may also include a plurality of projections to facilitate gripping.

The main body portion 4 of the cartridge 1 slides and/or is movably disposed within the sleeve member 2. The main body portion 4 can have a length of approximately 139 mm. Body 4 also includes a chamber wall 4a whose lower end is attached to an end plate 3 and an upper end that is attached an upper plate 4b. The body 4 may also have an overall width (measured across FIG. 1) of approximately 86 mm and an overall thickness (measured perpendicular to the plane of FIG. 1) of approximately 24 mm. The chamber wall 4a has a thickness of approximately 3 mm and a shape which is similar to that of the sleeve wall 2a, but is smaller to allow for a clearance (of e.g., between approximately 3 mm to approximately 5 mm) between the body wall 4a and sleeve wall 2a (see e.g., FIG. 17). The upper wall 4b and chamber wall 4a can be formed as a one-piece member of plastic (such as, e.g., polyurethane, and preferably ABS plastic, and most preferably polypropylene) and can be made by plastic extrusion. Alternatively, these parts can be formed separately and thereafter connected together by, e.g., ultrasonic welding. The end plate 3 can also be formed of plastic (such as, e.g., polyurethane, and preferably ABS plastic, and most preferably polypropylene) by extrusion and can be connected to the chamber wall 4a by, e.g., ultrasonic welding. The main body portion 4 includes two cylindrical chambers 4d, 4e having different volumes. The upper wall 4b additionally includes a small through opening which is sized to allow the electrolyte bellows 5 to move therethrough with a clearance and a large through opening which is sized to allow the fuel bellows 6 to move therethrough with a clearance.

Slidably disposed within a right side chamber 4*d* is a small piston 7. The piston 7 may be made of a polymer such as, e.g., PVC, and may have an outside diameter of approximately 33.6 mm. It may also have an overall axial length of approximately 22 mm. The central opening 14 of the piston 7 may have a diameter of approximately 6 mm. Moreover, the piston 7 may have a main internal passage 7*b* (see e.g., FIG. 7) which places the bellows 5 in fluid communication with passages 7*c* of the piston 7. See, e.g., passages 7*c* in FIGS. 7, 9 and 10. A sealing cap 9 is mounted to a bottom end of the piston 7 and provides sealing between an inner cylindrical surface of the right side chamber 4*d* and the piston 7. The sealing cap 9 be made of a rubber or a polymer such as, e.g., Teflon. The piston 7 and sealing cap 9 are circular in shape and are sized to slide up and down in a sealing manner within the right side cylindrical chamber 4*d*. The piston 7 includes a plurality of internal passages (similar to passages 7*c* shown in FIGS. 7, 9 and 10) and an outer groove 7*a* which allows fluid to flow between an electrolyte bellows 5 and the separating wall 4*c*. A releasable sealing plug 12 has a tapered end which is inserted in a press-fit manner into an opening 14 in upper end of the piston 7. This plug 12 is removed from the piston 7 when it is desired to allow the contents of bellows 5 to flow through the piston 7, through the wall 4*c* (as will be more clearly shown with respect to FIG. 12), and out through openings formed in end plate 3 (see for example openings 3*c* in FIG. 6). Although not shown, the plug 12 can be coupled to a tension member (which may be, e.g., a stainless steel, SS 303, fiberglass, Kevlar, or carbon fiber cord (not shown) which passes through the bellows 5 and whose upper end is secured to a pull-tab or trigger 19*b* (see FIG. 17). By way of non-limiting example, the tension member may have a diameter in the range of between approximately 0.5 mm and approximately 1 mm. To remove the plug 12 from the piston 7, a user need only pull-out the trigger 19*b*. Because of its shape, once removed the plug 12 is unlikely to again enter into the opening 14. Thereafter, fluid can flow from bellows 5 through piston 7. Alternatively, the plug 12, tension member and trigger 19*b* can be dispensed with altogether and/or replaced with, e.g., a one-way valve which allows fluid to flow from the bellows 5 to the piston 7, but not vice versa.

The electrolyte bellows 5 (which generally has the form or arrangement of a garmoshka or accordion), has a lower end which is secured to an upper end of the piston 7, and an upper end which is secured to a sealing end cap 5*b*. The bellows 5 may have a relaxed length of approximately of 135 mm, an internal diameter of approximately 20 mm, an outside diameter of approximately 31 mm, and may be made of, e.g., EPDM. The bellows 5 may also have a volume of approximately 62 cc and can also be made of, e.g., polyurethane, but is preferably made of polyethylene, and most preferably made of polypropylene. The bellows 5 retains therein approximately 30 cc of electrolyte and can be connected to the plug 5*b* by, e.g., ultrasonic welding. This can be facilitated using, e.g., a welding ring made of PVC which may have a diameter of approximately 33.5 mm. The bellows 5 can also be connected to the piston 7 by, e.g., ultrasonic welding. This can also be facilitated using a welding ring made of, e.g., PVC, which may have a diameter of approximately 33.5 mm. The plug or end cap 5*b* may be made of PVC and may have an outside diameter of approximately 33.6 mm. A central projection of the plug 5*b* may have a outside diameter of approximately 7 mm. The end cap 5*b* can also be configured to allow for the filling of the bellows 5 with electrolyte and defines an electrolyte chamber EC. An upper end of the plug 5*b* is secured (by e.g., ultrasonic welding or adhesive bonding) to an inner surface of the wall 2*b*. In this way, when the sleeve 2 moves upwards and away from the body 4 and end cap 3, the bellows 5 is also caused to move upwards. This, in turn, causes the piston 7 and sealing cap 9 to move upwards within chamber 4*d*. As a result of the movement of the piston 7 and sealing cap 9, a low pressure condition is created in chamber 4*d* beneath the cap 9. This, in turn, causes fluid and/or liquid to be drawn into the right side chamber 4*d*, which functions as a small used fuel chamber SUFC (see FIG. 2). The fluid is preferably spent fuel from a fuel cell.

Slidably disposed within a left side chamber 4*e* is a large piston 8. The piston 8 may be made of, e.g., PVC, and may have an outside diameter of approximately 42.5 mm. It may also have an overall axial length of approximately 22 mm. A central opening 13 of the piston 8 may have a diameter of approximately 6 mm. The piston 8 may have internal passages (e.g., three or four passages) with a diameter of approximately 3 mm. Moreover, the piston 8 may also have a main internal passage which places the bellows 6 in fluid communication with passages of the piston 8. See, e.g., passages 8'*c* in FIGS. 7, 9 and 10. A sealing cap 10 is mounted to a bottom end of the piston 8 and provides sealing between an inner cylindrical surface of the left side chamber 4*e* and the piston 8. The sealing cap 10 be made of a rubber or a polymer such as, e.g., Teflon. The piston 8 and sealing cap 10 are circular is shape and are sized to slide up and down within the left side chamber 4*e*. The piston 8 also includes an outer groove 8*a* which allows fluid to flow between a fuel bellows 6 and the separating wall 4*c*. A releasable sealing plug 11 has a tapered end which is inserted in a press-fit manner into opening 13 in an upper end of the piston 8. This plug 11 is removed from the piston 8 when it is desired to allow the contents of bellows 6 to flow through the piston 8, through the wall 4*c* (as will be more clearly shown with respect to FIG. 12), and out through openings in end plate 3 (see for example openings 3*c* in FIG. 6). Although not shown, the plug 11 can be coupled to a tension member (which may be, e.g., a stainless steel, SS 303, fiberglass, Kevlar, or carbon fiber cord (not shown) which passes through the bellows 6 and whose upper end is secured to a pull-tab or trigger 19*a* (see FIG. 17). By way of non-limiting example, the tension member may have a diameter in the range of between approximately 0.5 mm and approximately 1 mm. To remove the plug 11 from the piston 8, a user need only pull-out the trigger 19*a*. Because of its shape, once removed, the plug 11 is unlikely to again enter into the opening 13. Alternatively, the plug 11, tension member and trigger 19*a* can be dispensed with altogether and/or replaced with, e.g., a valve arranged within the piston 8 which allows fluid to flow from the bellow 6 to the piston 8, when the fuel exceeds a predetermined pressure caused by axial compression of the bellows 6. Such a valve arrangement can also be utilized in the piston 7.

The fuel bellows 6 has a lower end which is secured to the upper end of the piston 8, and an upper end which is secured to a sealing end cap 6*b*. These connections can be facilitated using, e.g., welding rings made of PVC which are suitable, sized and shaped, and whose outer diameter can be approximately 42.1 mm. The bellows 6 may have a relaxed length of approximately of 135 mm, an internal diameter of approximately 33.2 mm, an outside diameter of approximately 44 mm, and may be made of, e.g., EPDM. The bellows 6 may also have a volume of approximately 150 cc and can also be made of, e.g., polyurethane, but is preferably made of polyethylene, and most preferably made of polypropylene. The bellows 6 can retain therein approximately 121 cc of fuel and can be connected to the piston 8 and cap 6b by, e.g., ultrasonic welding. The plug or end cap 6b may be made of PVC and may have an outside diameter of approximately 42.2 mm. A central projection of the plug 6b may have a outside diameter of approximately 7 mm. The end cap 6b can also be configured to allow for the filling of the bellows 6 with fuel and defines a primary fuel chamber PFC. An upper end of the plug 6b is secured (by e.g., ultrasonic welding or adhesive bonding) to an inner surface of the wall 2b. In this way, when the sleeve 2 moves upwards and away from the body 4 and end cap 3, the bellows 6 (as well as the bellows 5 described above) is also caused to move upwards. This, in turn, causes the piston 8 and sealing cap 10 to move upwards. As a result of the movement of the piston 8 and sealing cap 10, a low pressure condition is created beneath the cap 10. This, in turn, causes fluid to be drawn into the left side chamber 4e which acts as a large used fuel chamber LUFC (see FIG. 2). The fluid is preferably spent fuel from a fuel cell.

As can be seen in FIG. 3, the upper wall 4b acts to limit the upward movement of the pistons 7 and 8. In this regard, the piston 7 includes a plurality of circumferential projections 7d which pass through the small through opening of upper wall 4b and which engage with the wall 4b to lock and/or prevent the piston 7 from moving back down into the electrolyte chamber 4d. The piston 8 also includes a plurality of circumferential projections 8b which pass through the large through opening of upper wall 4b and which engage with the wall 4b to lock and/or prevent the piston 8 from moving back down into the fuel chamber 4e. Of course, if the chambers LUFC and SUFC are filled completely up to the sealing caps 9 and 10, and if fluid is prevented from exiting from the end plate 3, then the pistons 7 and 8 will be prevented from moving back down owing to the incompressible nature of liquids. By way of non-limiting example, the volume of the LUFC can typically safely retain approximately 133 cc and the volume of the SUFC can typically safely retain approximately 33 cc of spent fuel.

The cartridge 1 shown in FIG. 3 can then serve to store the spent fuel safely in its chambers LUFC and SUFC for disposal or recycling. Because the pistons 7 and 8 are locked in an upper-most position, because further downward movement of the sleeve 2 is essentially prevented, and/or because further compression of the bellows 5 and 6 (which will be essentially empty of their contents in the position shown in FIG. 3), and because the end plate 3 and/or the male portion 100 of the valve prevents the spent fuel from leaking back out of the opening 3a, the spent fuel in chambers LUFC and SUFC will not be allowed to exit the cartridge 1 inadvertently.

Figure 15:
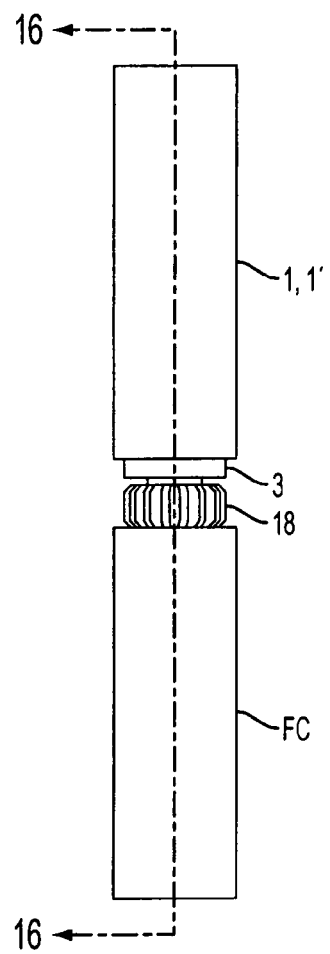
FIG. 15 shows a side view of the cartridge shown in FIG. 4 threadably coupled to the fuel cell. A valve is used to couple the cartridge to the fuel cell and to regulate/control flow between the fuel cell and the cartridge and vice versa.
Figure 16:
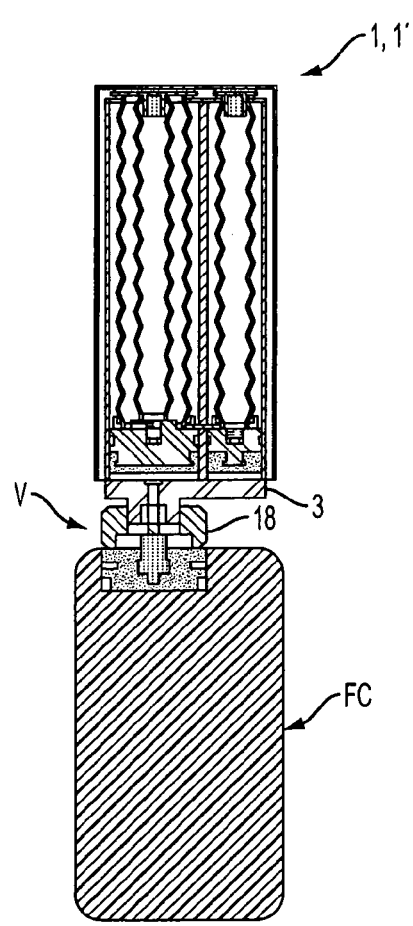
FIG. 16 shows a cross-section view of FIG. 15.

FIG. 2 illustrates the sleeve 2 in the raised or upper position. As explained above, movement of the sleeve 2 from the original position shown in FIG. 1 to the position shown in FIG. 2 causes fluid (i.e., spent fuel) to be drawn into the two chambers LUFC and SUFC. The details of how the spent fluid is drawn from a fuel cell through a valve will be described in detail below. The sleeve 2 can be moved by a user by gripping the sleeve 2 with one hand and by gripping the fuel cell (which will be coupled to the main body portion 4) with another hand. As this point, the new fuel remains in the primary fuel chamber PFC or bellows 6 and the new electrolyte remains in the electrolyte chamber EC or bellows 5. Moreover, because the pistons 7 and 8 have been moved to an uppermost position, the chambers LUFC and SUFC contain the spent fuel of the fuel cell to which the cartridge is mounted. FIGS. 15 and 16, by way of non-limiting example, illustrate one way the cartridge 1 can be mounted to the fuel cell during the removal of the spent fuel from a fuel cell FC. To facilitate connection and/or coupling to a fuel cell, the end plate 3 includes a projecting portion whose inner opening 3a is sized and/or configured to engage with a valve V (see, e.g., FIG. 16). The valve V can be of any desired type but is preferably of the type which facilitates coupling of the cartridge to a fuel cell, which preferably includes two removably connectable parts—one of which can be coupled to the fuel cell and another of which can be coupled to the cartridge 1, which parts cannot be disconnected during fluid passage, which prevents fluid passage if internal fluid openings of the value are not fully opened, which automatically closes the internal passage openings if the valve parts are disconnected from each other, and which is capable of preventing fluid leakage or dripping after the parts are disconnected. The opening 3a of the end plate 3 has a bottom edge or shoulder 3d that includes a plurality of openings 3c (see e.g., FIG. 6). These openings 3c are configured to communicate with, e.g., openings 101g of a valve (see valve embodiment FIG. 19) or with a coupling member whose fluid communication lines communicate with openings 301a and 301d of a valve (see valve embodiment shown in FIG. 37).

Figure 27:
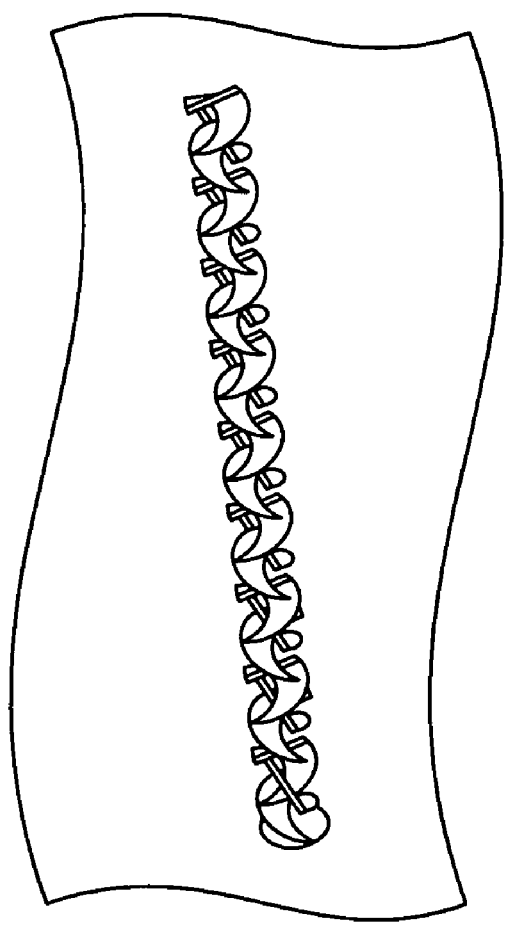
FIG. 27 shows one non-limiting embodiment of a stirring device which can be arranged within, e.g., feeding lines which connect the valve to the fuel cell.

The cartridge of FIGS. 1–3 thus performs duel consecutive functions of removing spent fuel from a fuel cell (i.e., by sucking or pumping it out of the fuel cell into chambers 4d, 4e and replacing (i.e., refueling by pumping fluids into the fuel cell) the spent fuel with new fuel and electrolyte from the cartridge. During the removing, the bellows 5 and 6, and pistons 7 and 8, move upwards and cause the volume beneath the pistons 7, 8 and in cylindrical chambers 4d and 4e to increase. Such movement naturally creates a low pressure condition or gradient beneath the pistons 7 and 8 which naturally causes/allows the spent fuel from the fuel cell to be sucked into the chambers 4d and 4e thereby forming spent fuel chambers LUFC and SUFC. The next action of replacing can occur directly and quickly after the removing action is finished by moving the sleeve 2 downwards. The replacing is thus preferably a separate second action. During the replacing, the bellows 5 and 6, which are essentially flexible and elastic (e.g., variable volume) containers and which form an integral part of the cartridge 1, are, at the same time, compressed axially from the state shown in FIG. 2 to the state shown in FIG. 3. This causes the new fuel and electrolyte to be forced out of the cartridge. The new fuel and electrolyte can be delivered separately to the end plate 3 or mixed during such delivery. The mixing can also occur during the replacing in a number of ways. For example, the mixing can begin when the fuel and electrolyte contact one another in the area of the opening 3a. Further mixing can also occur in the valve V (see, e.g., FIGS. 15 and 16). Additional mixing can occur in feed lines which connect the valve to the fuel cell and/or within mixing passages of the fuel cell FC itself. In this regard, by way of non-limiting example, the invention provides for a mixing device of the type shown FIG. 27 to be arranged, e.g., between the opening 3a and the valve V, and/or in one or more feed lines connecting the valve V to the fuel cell FC, and/or within internal passages of the fuel cell FC itself. The mixing or stirrer device shown in FIG. 27 may also be incorporated in a distributor ring (not shown) which may be arranged between the valve V and fuel cell FC or arranged within the fuel cell FC itself.

The invention contemplates that the bellows 6 and 5 can be respectively filled with new fuel and electrolyte before the end caps 6b and 5b are secured thereto by e.g., ultrasonic welding. Alternatively, the bellows 6 and 5 can be filled with new fuel and electrolyte from the piston end of the bellows 5 and 6, or even through the end caps 5b and 6b after they are secured to the bellows 5 and 6. In this case, the end caps 5b and 6b can be plugged after filling and/or utilize a self-sealing plug material (not shown). The cartridge 1 is also designed to prevent cross-contamination of the fuel and electrolyte before use and/or the refueling stage, as well as between the spent fuel and the new fuel and electrolyte at all stages, including the removing and the replacing stages. The end caps 5b and 6b may additionally also incorporate a centrally disposed gas evacuation device or membrane of the type described in Applicant's U.S. patent application No. Attorney docket No. P24757, the disclosure of which is hereby expressly incorporated by reference in its entirety.

Figure 17:
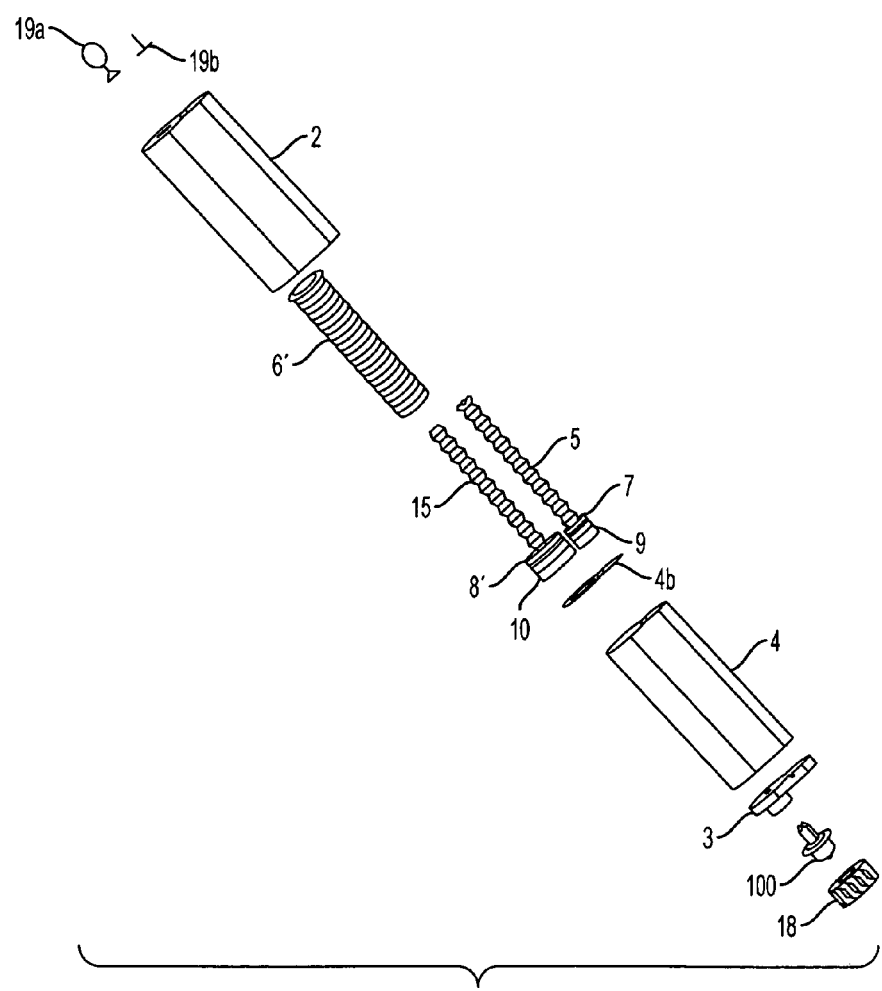
FIG. 17 shows an exploded view of the non-limiting embodiment shown in FIG. 4 with additional features.

As shown in, e.g., FIGS. 15–17, the cartridge 1 can be connected to the fuel cell FC or otherwise placed into fluid communication with the fuel cell FC via a valve V. According to one non-limiting embodiment, the cartridge 1 is attached to the fuel cell FC via the valve V. The valve V regulates/controls fluid flow between these devices and acts to open and shut-off such flow. In this regard, the cartridge 1 can be connected to the valve V via a securing cap 18 which has an external profiled surface (e.g., projections and recesses, knurling, or other high friction surface) that facilitates gripping (for tightening and loosening the same) of the same by a user. The securing cap 18 can provide for the duel action of securing the connection of the cartridge 1 to the fuel cell FC and provides sealing between the cartridge 1 and valve V. According to one non-limiting embodiment, the ring 18 has internal threads which engage with external threads (see, for example, 202a of FIG. 20) of the valve V. The securing cap 18 can, of course, be rotated in one direction to secure the cartridge 1 to the valve V and in an opposite direction to, e.g., allow the cartridge 1 and a male portion 100 of the valve V to separate from a female portion of the valve secured to the fuel cell FC. Of course, the invention contemplates other ways of connecting the cartridge 1 to the fuel cell FC and/or valve V (see, e.g., FIG. 37). In the valve V embodiment shown in FIGS. 15–22, the cartridge 1 can be rotated (after being connected to the valve V and fuel cell FC as shown in FIGS. 15–16) between a closed valve V position (see e.g., FIG. 18) and an open valve position (see e.g., FIG. 19). Although not shown, the cartridge 1 rotates about an axis running through opening 10. The angle of rotation will, of course, be based on the design of the valve V. By way of non-limiting example, the angle of rotation between the closed position shown in FIG. 18 and the open position shown in FIG. 19 can be, e.g., approximately 45 degrees in the case of a four port valve (see FIGS. 18–22), and e.g., 30 degrees in the case of a six port valve (see FIGS. 32–34). Since this angle is based on the number of openings (e.g., 4 openings 101d in the valve shown in FIGS. 18–22) in the valve V, the angle will vary depending on the number of openings and design of the valve V. The opening 3a is configured to receive therein a portion of the valve V. Accordingly to one non-limiting embodiment, an upper portion of a male member 101 of the male portion 100 of the valve V (see FIGS. 17–21) is designed to slide into opening 3a, which opening 3a acts as a socket, and whereby rotation of the cartridge 1 causes a corresponding rotation of the male member 101 of the male portion 100. In this regard, opening 3a is generally square shaped (see e.g., FIG. 6) so as to engage and receive therein the square shaped upper portion of male member 101 (see e.g., FIG. 21), and in particular planar surfaces 101a.

According to one embodiment, the male portion 100 of the valve V is connected to the end plate 3 via, e.g., fasteners (not shown). This connection may be a rigid and/or press-fit connection, i.e., the male portion 100 may be non-removably and/or securely and/or sealingly connected to the end plate 3. Similarly, the female portion 200 of the valve V is preferably connected to the fuel cell FC (see FIGS. 15 and 16) via, e.g., fasteners (not shown). This connection may also be a rigid connection, i.e., the female portion 200 may be non-removably and/or securely and/or sealingly connected to the fuel cell FC. To facilitate the connection of the cartridge 1, and its attached male portion 100, to the female portion 200 of the valve which is secured to the fuel cell FC, a user may hold or grasp in one hand the fuel cell FC, and in the other hand, the cartridge 1. Then, the user may manipulate the cartridge 1 with respect to the fuel cell FC until the male portion 100 is inserted into the female portion of the valve V. Once the male portion 100 is fully inserted in the female portion 200, the cartridge 1 is joined or connected to the fuel cell FC. To ensure that this connection is secure, so that the connection between the male portion 100 and female portion 200 is not accidentally or inadvertently broken or separated, a securing cap 18 is used to secure the cartridge 1 to the fuel cell FC. Such an arrangement is shown in, e.g., FIGS. 15 and 16. As will be described with respect to FIGS. 18–20, the use of a threaded cap 18 also allows the sealing surfaces of the male portion 100 to engage (in a press fit and sealing manner) the sealing surfaces of the female portion 200. This provides sealing between the male 100 and female portions 200 while the male 100 and female portions 200 are connected to each other. In the embodiment shown in FIGS. 15 and 16, the threads of the cap 18 and female portion of the valve V can be, e.g., M20x1. According to one embodiment, the fuel cell FC may be of the type disclosed in U.S. patent application Ser. No. 10/379,853, the disclosure of which is hereby expressly incorporated by reference in its entirety. The design of the male portion 100 and female portion 200 of the valve V is such that when these parts are disconnected from each other, they remain and/or are automatically closed. However, once connected to each other, they can both be open to allow fluid communication between the fuel cell FC and cartridge 1 and vice versa. It should be noted that the valve and cartridge system provides for venting of gasses between the fuel cell FC and an outside atmosphere.

FIGS. 4–13 show a second non-limiting embodiment of the refilling device 1'. The device has the form of a cartridge 1' and includes a sleeve member 2 (which can be substantially similar to the sleeve 2 described with regard to FIGS. 1–3). The sleeve 2 has an open bottom end, a opening area which receives therein a main body portion 4 and which is defined by a wall 2a, and a closed end 2b. The sleeve member 2 can be formed as a one-piece member of plastic and can be made by plastic extrusion, and can otherwise be made in the manner described with regard to FIGS. 1–3. The sleeve 2 may have a wall thickness of approximately 2.5 mm, a length of approximately 162.5 mm, an overall width (measured across FIG. 4) of approximately 92 mm and an overall thickness (measured perpendicular to FIG. 1) of approximately 56 mm. The sleeve 2 may also have the same external shape and/or configuration as the sleeve shown in FIG. 6. To facilitate gripping by a user, an outer surface of the sleeve 2 may include a high-fiction surface and/or a textured surface. The outer surface of sleeve 2 may also include a plurality of projections to facilitate gripping. The main body portion 4 (which can be substantially similar to the body 4 described with regard to FIGS. 1–3) of the cartridge 1 slides and/or is movably disposed within the sleeve member 2. The main body portion 4 can have a length of, e.g., approximately 139 mm, and includes a chamber wall 4a whose lower end is attached an end plate 3 and whose upper end is attached an upper plate 4b. The body 4 may also have an overall width (measured across FIG. 4) of, e.g., approximately 86 mm, and an overall thickness (measured perpendicular to FIG. 4) of, e.g., approximately 24 mm. The chamber wall 4a has a thickness of, e.g., approximately 3 mm, and a shape which can be similar to that of the sleeve wall 2a, but is smaller to allow for a clearance (of e.g., between approximately 3 mm to approximately 5 mm) between the wall 4a and sleeve 2a (see e.g., FIG. 17). The upper wall 4b and chamber wall 4a can be formed as a one-piece member of plastic (such as, e.g., polyurethane, and preferably ABS plastic, and most preferably polypropylene) and can be made by plastic extrusion. Alternatively, these parts can be formed separately and thereafter connected together by, e.g., ultrasonic welding. The end plate 3 can also be formed of plastic by extrusion and can be connected to the chamber wall 4a by, e.g., ultrasonic welding. The main body portion 4 includes two cylindrical chambers 4d, 4e having different volumes. Alternatively, the chambers 4d, 4e can be made to have the same sizes and/or volumes and can even be placed in fluid communication with each other (not shown) by e.g., providing connecting openings in wall 4c (not shown). The upper wall 4b also includes a small through opening which is sized to allow the electrolyte bellows 5 to move therethrough with a clearance and a large through opening which is sized to allow the fuel bellows 6 to move therethrough with a clearance.

Figure 9:
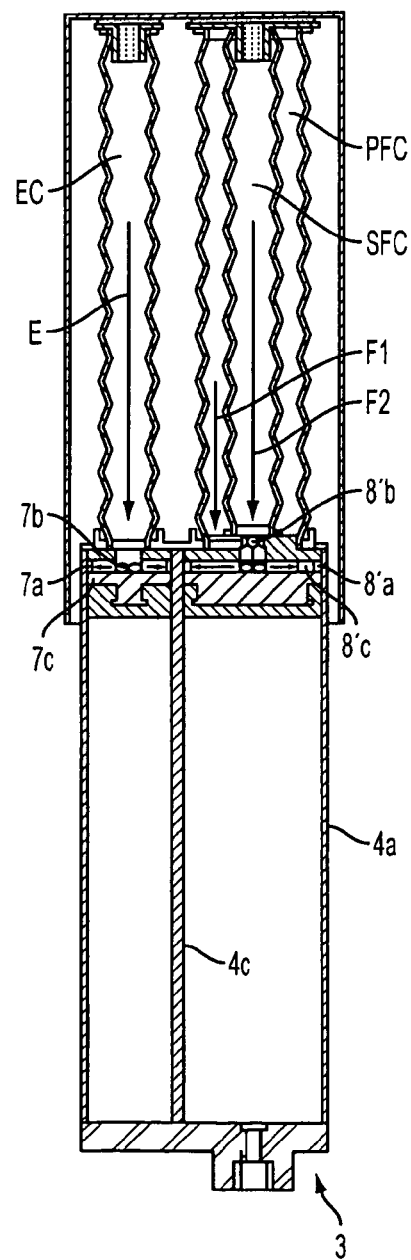
FIG. 9 shows a cross section of the embodiment shown in FIG. 4 during the movement to the compressed position. The new fuel and electrolyte flow from the two fuel supply chambers and the single electrolyte supply chamber is illustrated by arrows.
Figure 10:
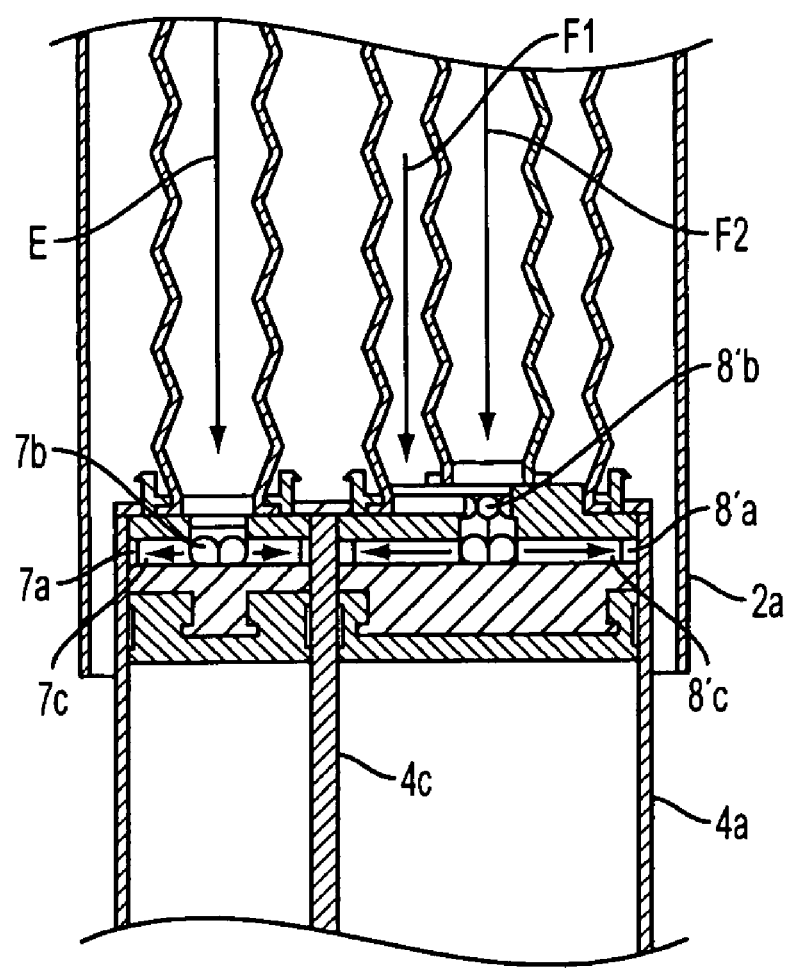
FIG. 10 shows an enlarged partial cross-section of FIG. 9. The new fuel and electrolyte flow from the two fuel supply chambers and the single electrolyte supply chamber is illustrated by arrows.
Figure 11:
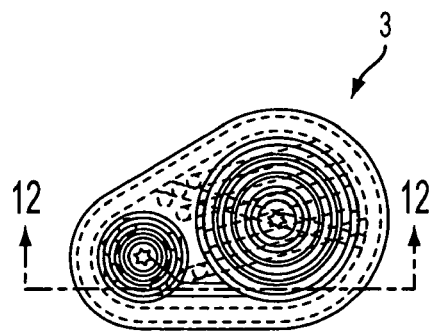
FIG. 11 shows another bottom view of the cartridge shown in FIG. 12. This figure also illustrates schematically the various internal chambers and passages for filling and refilling.

Slidably disposed within a right side chamber 4d is a small piston 7 (which can be substantially similar to the piston 7 described with regard to FIGS. 1–3). The piston 7 may be made of PVC, may have an outside diameter of approximately 33.6 mm, and an overall axial length of approximately 22 mm. A central opening 14 of the piston 7 may have a diameter of approximately 6 mm. Moreover, the piston 7 may also have a main internal passage 7b (see FIG. 7) which places the bellows 5 in fluid communication with passages 7c of the piston 7. A sealing cap 9 (which can be substantially similar to the cap 9 described with regard to FIGS. 1–3) is mounted to a bottom end of the piston 7 and provides sealing between an inner cylindrical surface of the right side chamber 4d and the piston 7. The piston 7 and sealing cap 9 are circular is shape and are sized to slide up and down in a sealing manner within the right side chamber 4d. As can be seen in FIGS. 7, 9 and 10, piston 7 includes a plurality of internal passages 7c and an outer groove 7a which allows fluid to flow between a electrolyte bellows 5 and the separating wall 4c. As with the passages in the piston 7 of FIGS. 1–3, these passages 7c may have a diameter of approximately 3 mm. The main internal passage 7b places the bellows 5 in fluid communication with passages 7c of the piston 7. A releasable sealing plug 12 (which can be substantially similar to the plug 12 described with regard to FIGS. 1–3) has a tapered end which is inserted in a press-fit manner into an upper end of the piston 7. This plug 12 can be removed from the piston 7 when it is desired to allow the contents of bellows 5 to flow through the piston 7, through the wall 4c (as will be more clearly shown with respect to FIG. 12), and out through openings in end plate 3 (see for example openings 3c in FIG. 6). Although not shown, the plug 12 can be coupled to a tension member (which may be, e.g., a stainless steel, SS 303, fiberglass, Kevlar, or carbon fiber cord) which passes through the bellows 5 and whose upper end is secured to a pull-tab or trigger 19b (see FIG. 17). To remove the plug 12 from the piston 7, a user need only pull-out the trigger 19b. Because of its shape, once removed, the plug 12 is unlikely to again enter into the opening 14. Alternatively, the plug 12, tension member and trigger 19b can be dispensed with altogether and/or replaced with, e.g., a one-way valve which allows fluid to flow from the bellows 5 to the piston 7, but not vice versa.

The electrolyte bellows 5 (which generally has the form or arrangement of a garmoshka or accordion and which can be substantially similar to the bellows 5 described with regard to FIGS. 1–3), has a lower end which is secured to the upper end of the piston 7, and an upper end which is secured to a sealing end cap 5b. The bellows 5 may have a relaxed length of approximately of 135 mm, an internal diameter of approximately 20 mm, an outside diameter of approximately 31 mm, and may be made of, e.g., EPDM. The bellows 5 may also have a volume of approximately 62 cc and can also be made of, e.g., polyurethane, but is preferably made of polyethylene, and most preferably made of polypropylene. The bellows 5 retains therein, e.g., approximately 30 cc of electrolyte, and can be connected to the plug 5b by, e.g., ultrasonic welding. This can be facilitated using a welding ring made of, e.g., PVC, which ring may have a diameter of approximately 33.5 mm. Alternatively, the bellows 5 can be directly connected to the cap 5b by, e.g., ultrasonic welding. The bellows 5 can also be connected the piston 7 by, e.g., ultrasonic welding. This can also be facilitated using a welding ring made of, e.g., PVC, which may have a diameter of approximately 33.5 mm. The plug or end cap 5b may be made of PVC and may have an outside diameter of approximately 33.6 mm. The central projection of the plug 5b may have a outside diameter of approximately 7 mm. The end cap 5b can be configured to allow for the filling of the bellows 5 with electrolyte and defines an electrolyte chamber EC. An upper end of the plug 5b is secured (by e.g., ultrasonic welding or adhesive bonding) to an inner surface of the wall 2b. In this way, when the sleeve 2 moves upwards and away from the body 4 and end cap 3, the bellows 5 is also caused to move upwards. This, in turn, causes the piston 7 and sealing cap 9 to move upwards. As a result of the movement of the piston 7 and sealing cap 9, a low pressure condition and/or gradient is created in chamber 4d beneath the cap 9. This in turn causes fluid to be drawn into the right side chamber 4d which acts as a small used fuel chamber SUFC (see FIG. 2). The fluid is preferably spent fuel from a fuel cell.

Slidably disposed within a left side chamber 4e is a large piston 8 (which can be substantially similar to the piston 8 described with regard to FIGS. 1–3). The piston 8 may be made of, e.g., PVC, may have an outside diameter of approximately 42.5 mm and an overall axial length of approximately 22 mm. A central opening 13 of the piston 8 may have a diameter of, e.g., approximately 6 mm. Moreover, the piston 8 may have internal passages 8'c (e.g., three or four passages) with a diameter of approximately 3 mm. A sealing cap 10 (which can be substantially similar to the cap 10 described with regard to FIGS. 1–3) is mounted to a bottom end of the piston 8 and provides sealing between an inner cylindrical surface of the left side chamber 4e and the piston 8. The piston 8 and sealing cap 10 are circular is shape and are sized to slide up and down in a sealing manner within the left side chamber 4e. The piston 8 includes an outer groove 8a which allows fluid to flow between a fuel bellows 6, through the piston 8, and the separating wall 4c.

A main internal passage 8'b places the bellows 6' and the bellows 15 in fluid communication with corresponding passages 8'c of the piston 8. A releasable sealing plug 11 (which can be substantially similar to the plug 11 described with regard to FIGS. 1–3) has a tapered end which is inserted in a press-fit manner into an upper end of the piston 8. This plug 11 is removed from the piston 8 when it is desired to allow the contents of bellows 6 to flow through the piston 8, through the wall 4c (as will be more clearly shown with respect to FIG. 12), and out through openings in end plate 3 (see for example openings 3c in FIG. 6). Although not shown, the plug 11 can be coupled to a tension member (which may be, e.g., a stainless steel, SS 303, fiberglass, Kevlar, or carbon fiber cord) which passes through the bellows 6 and whose upper end is secured to a pull-tab or trigger 19a (see FIG. 17). To remove the plug 11 from the piston 8, a user need only pull-out the trigger 19a. Because of its shape, once removed the plug 11 is unlikely to again enter into the opening 13. Alternatively, the plug 11, tension member and trigger 19a can be dispensed with altogether and/or replaced with, e.g., a valve arranged within the piston 8 which allows fluid to flow from the bellows 6' and 15 to the piston 8, when the fuel exceeds a predetermined pressure caused by axial compression of the bellows 6' and 15. Such a valve arrangement can also be utilized in the electrolyte piston 7.

An outer fuel bellows 6' (similar to bellows 6 of FIGS. 1–3) has a lower end which is secured to the upper end of the piston 8, and an upper end which is secured to a sealing end cap 6'b. These connections can be facilitated using, e.g., welding rings made of PVC, which are suitable sized and shaped, and whose outer diameter can be, e.g., approximately 42.1 mm. The bellows 6 may have a relaxed length of approximately of 135 mm, an internal diameter of approximately 33.2 mm, an outside diameter of approximately 44 mm, and may be made of, e.g., EPDM. The bellows 6' may also have a volume of approximately 150 cc and can also be made of, e.g., polyurethane, but is preferably made of polyethylene, and most preferably made of polypropylene. However, because some of the volume of the primary fuel bellows 6' is taken up by the secondary fuel bellows 15, the true volume of the primary fuel bellows 6' is sized to retain therein approximately 61 cc of fuel. As was the case in the embodiment shown in FIGS. 1–3, the bellows 6' can be connected the piston 8 and cap 6'b by, e.g., ultrasonic welding. The plug or end cap 6'b may be made of, e.g., PVC, and may have an outside diameter of approximately 42.2 mm. A central projection of the plug 6'b may have a outside diameter of approximately 7 mm. The end cap 6'b may also be configured to allow for the filling of the bellows 6' and bellows 15 with fuel, with the primary bellows 6' defining a primary fuel chamber PFC and with the inner bellows 15 defining a secondary fuel chamber SFC. An upper end of the plug 6'b is secured (by e.g., ultrasonic welding or adhesive bonding) to an inner surface of the wall 2b. In this way, when the sleeve 2 moves upwards and away from the body 4 and end cap 3, the bellows 6' and bellows 15 (as well as the bellows 5 described above) are also caused to move upwards. This, in turn, causes the piston 8 and sealing cap 10 to move upwards. As a result of the movement of the piston 8 and sealing cap 10, a low pressure or gradient condition is created in chamber 4e beneath the cap 10. This, in turn, causes fluid to be drawn into the left side chamber 4e which acts as a large used fuel chamber LUFC (see FIG. 5). As with the previous embodiment, the fluid is preferably spent fuel from a fuel cell.

The inner fuel bellows 15 has a lower end which is secured to the upper end of the piston 8 and an upper end which is secured to a sealing end cap 6'b. These connections can be facilitated using welding rings made of, e.g., PVC, which are suitably sized and shaped and whose outer diameter can be approximately 34 mm. The bellows 15 may have a relaxed length of approximately of 135 mm, an internal diameter of approximately 20 mm, an outside diameter of approximately 31 mm, and may be made of, e.g., EPDM. The bellows 15 may also have a volume of approximately 62 cc and can also be made of, e.g., polyurethane, but is preferably made of polyethylene, and most preferably made of polypropylene. The bellows 15 is sized to thus retain therein approximately 61 cc of fuel and can be connected the piston 8 and cap 6'b by, e.g., ultrasonic welding. Finally, the invention contemplates that the bellows 5 and the bellows 15 can be substantially identical in size, shape, and material.

Figure 13:
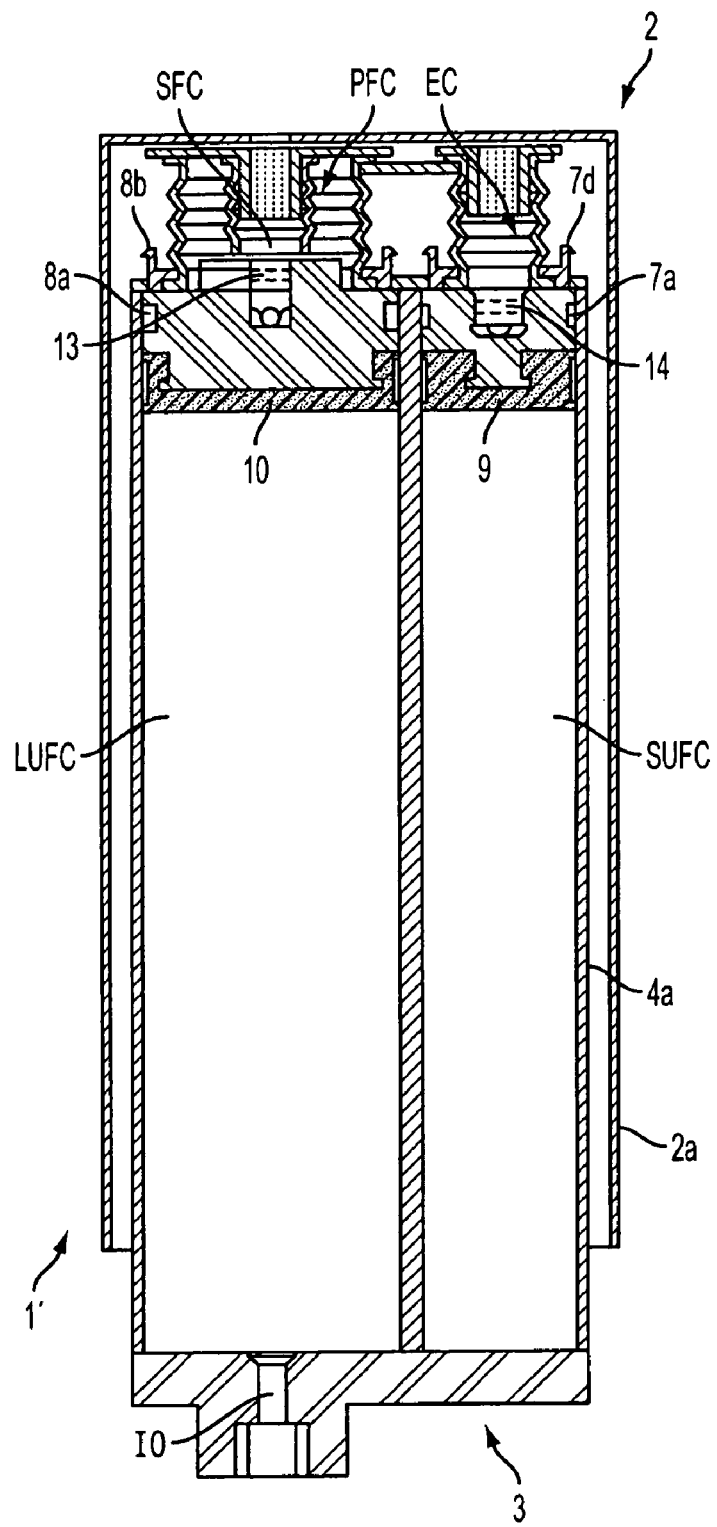
FIG. 13 shows a cross section of the embodiment shown in FIG. 4 after the cartridge assumes a compressed position. Upon movement to the compressed position from the position shown in FIG. 5, the cartridge pumps the new fuel and electrolyte from the new fuel and new electrolyte chambers into the fuel cell.

As can be seen in FIG. 13 (and was the case in the previous embodiment), the upper wall 4b acts to limit the upward movement of the pistons 7 and 8. The piston 7 includes a plurality of circumferential projections 7d which pass through a small through opening of upper wall 4b and which engage with the wall 4b to lock and/or prevent the piston 7 from moving back down into the electrolyte chamber 4d once the piston 7 reaches the position shown in, e.g., FIGS. 5 and 9. The piston 8 also includes a plurality of circumferential projections 8b which pass through a large through opening of the upper wall 4b and which engage with the wall 4b to lock and/or prevent the piston 8 from moving back down into the fuel chamber 4e once the piston 8 reaches the position shown in, e.g., FIGS. 5 and 9. Of course, if the chambers LUFC and SUFC are filled completely up to the sealing caps 9 and 10, and if fluid is prevented from exiting from the end plate 3, then the pistons 7 and 8 will not be able to move back down into chambers 4d, 4e owing to the incompressible nature of liquids. By way of non-limiting example, the volume of the LUFC can typically safely retain, e.g., approximately 133 cc, of spent fuel and the volume of the SUFC can typically safely retain, e.g., approximately 33 cc, of spent fuel.

The cartridge 1' shown in FIG. 13 can then serve to store the spent fuel safely in its chambers LUFC and SUFC for disposal or recycling. Because the pistons 7 and 8 are locked in an upper-most position (see FIG. 9), because further downward movement of the sleeve 2 is essentially prevented and/or because further compression of the bellows 5 and 6 (which will be essentially empty of their contents in the position shown in FIG. 13), and because the end plate 3 and/or the male portion 100 of the valve (see e.g., FIGS. 17–21) prevents the spent fuel from leaking back out of the opening 3a when the male portion 100 is disconnected from the female portion 200 of the valve, the spent fuel in chambers LUFC and SUFC will not be allowed to exit the cartridge 1 inadvertently.

Figure 5:
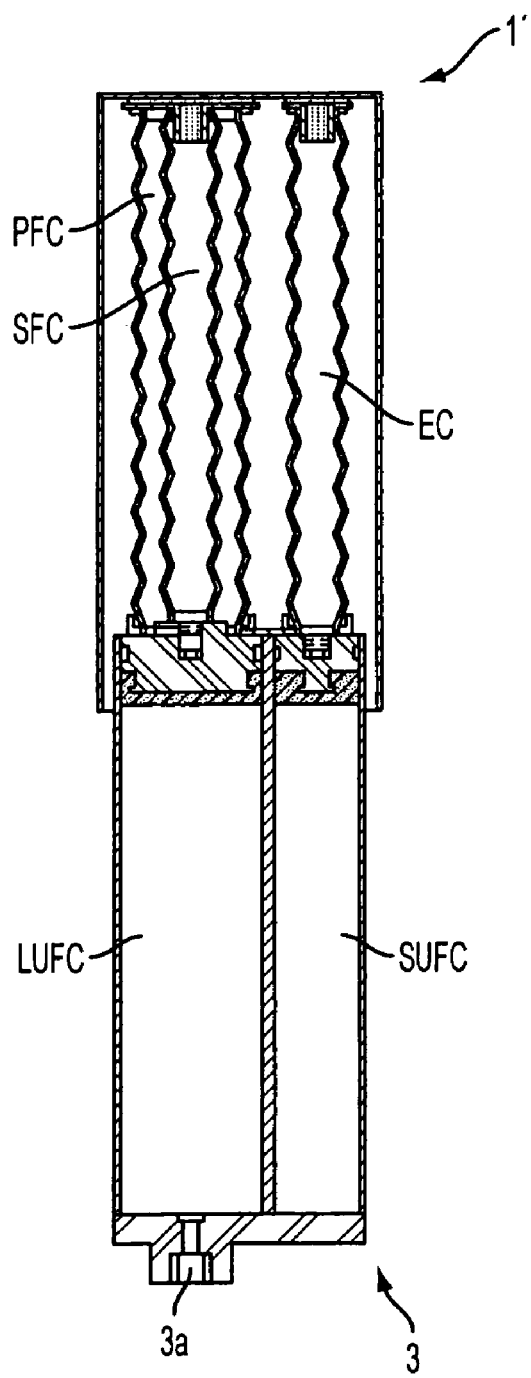
FIG. 5 shows a cross section of the embodiment shown in FIG. 4 after the cartridge assumes an expanded position. During movement to the expanded position from the position shown in FIG. 4, the cartridge draws the spent fuel from the fuel cell into its two spent fuel storing chambers.

FIG. 5 illustrates the sleeve 2 in the raised or upper position. As explained above, movement of the sleeve 2 from the original position shown in FIG. 4 to the position shown in FIG. 5 causes used fluid (i.e., spent fuel) to be drawn into the two chambers LUFC and SUFC. The details of how the spent fluid is drawn from a fuel cell has already been described with regard to the embodiment shown FIGS. 1–3 and will also be described in detail later on. The sleeve 2 can be moved by a user by gripping the sleeve 2 with one hand and by gripping the main body portion 4 with another hand. As this point, a first new fuel component remains in the primary fuel chamber PFC or bellows 6', a second new fuel component also remains in the secondary fuel chamber SFC or bellows 15, and the new electrolyte remains in the electrolyte chamber EC or bellows 5. Moreover, because the pistons 7 and 8 have been moved to an uppermost position, the chambers LUFC and SUFC contain the spent fuel of the fuel cell to which the cartridge is mounted (not shown). Thus, as with the embodiment shown in FIGS. 1–3, the invention allows the fresh fuel and electrolyte to exit the bellows 5, 6' and 15 only when the pistons 7 and 8 are in the uppermost position shown in FIG. 5. Prior to this point, the fresh fuel and electrolyte can remain safely and separately stored in the respective bellows 5, 6' and 15. FIGS. 15 and 16 illustrate one non-limiting way that the cartridge 1' can be mounted to the fuel cell FC during the removal of the spent fuel from a fuel cell FC. To facilitate connection and/or coupling to a fuel cell FC, the end plate 3 includes a projecting portion whose inner opening 3*a* is sized and/or configured to engage with a valve V (see FIG. 16). This valve V can be of any desired type but is preferably of the type which, e.g., facilitates coupling of the cartridge to a fuel cell, which valve includes two removably connectable parts—one of which can be coupled to the fuel cell FC and another of which can be coupled to the cartridge 1', which parts cannot be disconnected during fluid passage, which prevents fluid passage if internal fluid openings of the value are not fully opened, which automatically closes the internal passage openings if the valve parts are disconnected from each other, and which is capable of preventing fluid leakage or dripping after the parts are disconnected. The opening 3*a* of the end plate 3 has a bottom edge or shoulder 3*d* that includes a plurality of openings 3*c* (see e.g., FIG. 6). These openings 3*c* are configured to communicate with, e.g., openings 101*g* of a valve (see valve embodiment FIG. 19) or with a coupling member whose fluid communication lines communicate with openings 301*a* and 301*d* of a valve (see valve embodiment shown in FIG. 23). The number of openings 3*c* can also correspond to the number of openings, e.g., openings 10*g*, of the male portion of the valve.

Figure 12:
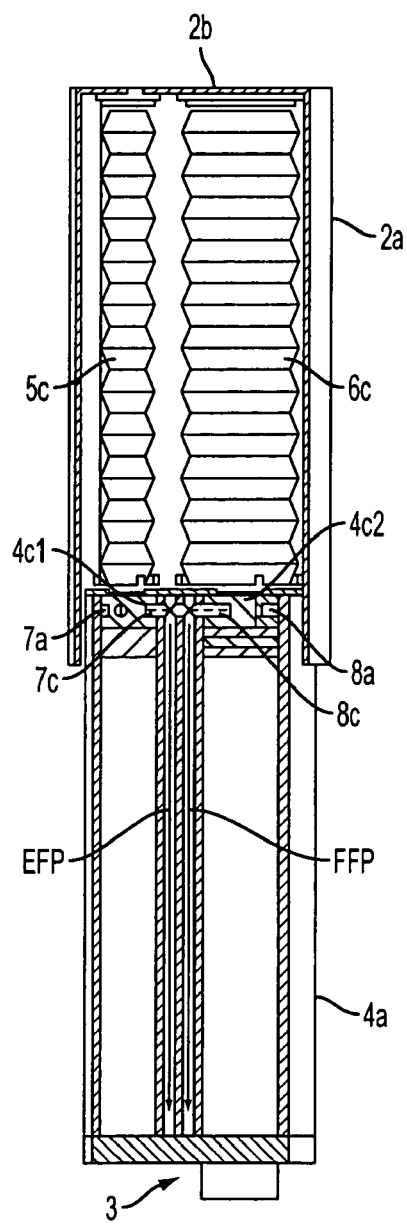
FIG. 12 shows another cross section of the embodiment shown in FIG. 4. This figure illustrates a possible non-limiting configuration of passages for allowing the new fuel and electrolyte to flow from the two fuel supply chambers and the single electrolyte supply chamber. The fluid flow in the passages is illustrated by arrows.

The cartridge 1' of FIGS. 4–13 thus performs the dual consecutive functions of removing (an action illustrated in FIG. 7) spent fuel from a fuel cell FC (by sucking or pumping it out of the fuel cell FC) and replacing (refueling by pumping in into the fuel cell) the spent fuel of the fuel cell FC with new fuel and electrolyte from the cartridge 1'. FIGS. 9, 10 and 12 illustrate one non-limiting way in which the new fuel and electrolyte components can flow (see flow arrows) within or through the cartridge 1' during the replacing. During the removing (i.e., the stage shown in FIG. 5), the bellows 5, 6' and 15, and pistons 7 and 8, move upwards under the action of the sleeve 2 and cause the volume in chambers 4*d* and 4*e* to increase beneath pistons 7 and 8 from a minimum volume shown in FIG. 4 to a maximum volume shown in FIG. 5. Such movement naturally creates a low pressure condition or gradient beneath the pistons 7 and 8, which naturally allows the spent fuel from the fuel cell FC to be sucked into the chambers 4*d* and 4*e* thereby forming spent fuel chambers LUFC and SUFC. The next action of replacing can occur directly and quickly after the removing action is finished by moving the sleeve 2 downwards. The replacing is thus a separate second action. During the replacing (the start of which is shown in FIG. 9), the bellows 5, 6' and 15, which are essentially flexible and elastic (e.g., variable volume) containers and which form an integral part of the cartridge 1', are compressed axially (under the action of moving the sleeve 2 downwards) at the same time from the state shown in FIGS. 5, 9 and 12 to the state shown in FIG. 13. During the replacing, the new fuel components and electrolyte can be mixed in a number of ways. This mixing can begin when the fuel components and electrolyte contact one another in the area of the opening 3*a*. The two fuel components from inner and outer bellows 15, 6' may also be mixed together as enter fuel passage FFP (if desired) or they may be communicated in separate passages FFP to opening 3*a*. Further mixing or the fuel components and electrolyte can occur in the valve V. Additional mixing can also occur in the feed lines which connect the valve V to the fuel cell FC and/or within mixing passages of the fuel cell FC itself (not shown). In this regard, by way of non-limiting example, the invention provides for a mixing device of the type shown FIG. 27 to be arranged, e.g., between the opening 3*a* and the valve V, and/or in one or more feed lines connecting the valve V to the fuel cell FC, and/or within internal passages of the fuel cell FC itself. The mixing device or stirrer may also be incorporated in a distributor ring (not shown) which may be arranged between the valve V and fuel cell FC or arranged within the fuel cell FC itself.

As with the previous embodiment shown in FIGS. 1–3, the invention contemplates that the bellows 6', 15 and 5 can be respectively filled with new fuel and electrolyte before the end caps 6'*b* and 5*b* are secured thereto by e.g., ultrasonic welding. Alternatively, the bellows 6', 15 and 5 can be filled with new fuel and electrolyte from the piston end of the bellows 5, 6' and 15, or through the end caps 5*b* and 6'*b* after they are secured to the bellows 5 and 6. In this case, the end caps 5*b* and 6'*b* can be plugged after filling and/or utilize a self-sealing plug material (not shown). The cartridge 1' is also designed to prevent cross-contamination of the two fuel components, between the fuel components and the electrolyte before use and/or the refueling stage, and between the spent fuel and the new fuel and electrolyte at all stages, including the removing and the replacing stages. The end caps 5*b* and 6'*b* may also incorporate a centrally disposed gas evacuation device or membrane of the type described in Applicant's U.S. patent application Ser. No. Attorney docket No. P24757, the disclosure of which is hereby expressly incorporated by reference in its entirety.

As shown in, e.g., FIGS. 15–17, the cartridge 1' can be connected to the fuel cell FC or otherwise placed into fluid communication with the fuel cell via a valve V. According to one non-limiting embodiment, the cartridge 1' is attached to the fuel cell FC via the valve V. The valve V regulates/controls fluid flow between these devices and acts to open and close-off such flow. In this regard, the cartridge 1' can be connected to the valve V via a securing cap 18 which has an external profiled surface that facilitates gripping (for tightening and loosening the same) of the same by a user. The cap 18 provides for the duel action of securing the connection and provides sealing between the cartridge 1' and valve V. The cap 18 has internal threads which engage with external threads (see, for example, 202*a* of FIG. 20) of the valve V and/or fuel cell FC. The cap 18 can, of course, be rotated in one direction to secure the cartridge 1' to the valve V and in an opposite direction to, e.g., allow the cartridge 1' and male portion 100 to separate from the female portion of the valve and fuel cell FC. Of course, the invention contemplates other ways of connecting the cartridge 1' to the fuel cell FC and/or valve V. In the valve V embodiment shown in FIGS. 15–22, for example, the cartridge 1' can be rotated (after being connected to the valve V and fuel cell FC) between a closed valve V position (see e.g., FIG. 18) and an open valve position (see e.g., FIG. 19). The angle of rotation will, of course, be based on the design of the valve V. By way of non-limiting example, the angle of rotation between the closed position shown in FIG. 18 and the open position shown in FIG. 19 can be approximately 45 degrees when the valve V utilizes four openings 101g and approximately 30 degrees when the valve V utilizes six openings (see FIGS. 32–34). Since this angle is based on the number of flow openings (e.g., 4 openings in the valve shown in FIGS. 18–22) of the valve V, the angle can be predetermined and can vary depending on the number of openings and design of the valve V. As with the embodiment shown in FIGS. 1–3, the opening 3a of the cartridge 1' receives therein a portion of the valve V. Accordingly to one non-limiting embodiment, an upper portion of a male member 101 of the male portion 100 of the valve V (see FIGS. 17–21) is designed to slide into opening 3a, which opening 3a acts as a socket whereby rotation of the cartridge 1' causes a corresponding rotation of the male member 101 of the male portion 100 relative to the female portion 200 and the fuel cell. FC. In this regard, opening 3a can be generally square shaped (see e.g., FIG. 6) so as to correspond to and to engage with the square-shaped upper portion of member 101 (see e.g., FIG. 21), and in particular planar surfaces 101a of member 101.

According to one non-limiting embodiment, the male portion 100 of the valve V may be connected to the end plate 3 via, e.g., fasteners (not shown). This connection may be a rigid and/or press-fit connection, i.e., the male portion 100 may be non-removably and/or securely and/or sealingly connected to the end plate 3. Similarly, the female portion 200 of the valve V can preferably connected to the fuel cell FC via, e.g., fasteners (not shown). This connection may also be a rigid connection, i.e., the female portion 200 may be non-removably and/or securely and/or sealingly connected to the fuel cell FC. To facilitate the connection of the cartridge 1', and its attached male portion 100, to the female portion 200 (which can is secured to the fuel cell FC), a user may hold or grasp in one hand the fuel cell FC and in the other hand the cartridge 1'. Then, the user manipulates the cartridge 1' with respect to the fuel cell FC until the male portion 100 is inserted into the female portion 200. Once the male portion 100 is fully inserted in the female portion 200, the cartridge 1' is joined or connected to the fuel cell FC. However, to ensure that this connection is secure and so that the connection is not accidentally or inadvertently broken, a securing cap 18 is used to secure the cartridge 1' to the fuel cell FC. Such an arrangement is shown in, e.g., FIGS. 15 and 16. As will be described with respect to FIGS. 18–20, the use of a threaded cap 18 also allows the sealing surfaces of the male portion 100 to engage (in a press fit and sealing manner) the sealing surfaces of the female portion 200. This provides sealing between the male 100 and female portions 200 while the male 100 and female portions 200 are connected to each other. In the embodiment shown in FIGS. 15 and 16, the threads of the cap 18 and female portion 200 of the valve V can be, e.g., M20x1. According to one embodiment, the fuel cell FC may be of the type disclosed in U.S. patent application Ser. No. 10/379,853, the disclosure of which is hereby expressly incorporated by reference in its entirety. The design of the male portion 100 and female portion 200 of the valve V is such that when these parts are disconnected from each other, and/or before these parts are rotated to the open position, they remain closed and prevent fluid flow between the cartridge 1' and fuel cell FC. However, once connected to each other, and rotated to the open position, fluid communication is provided between the fuel cell FC and cartridge 1 and vice versa.

Figure 6:
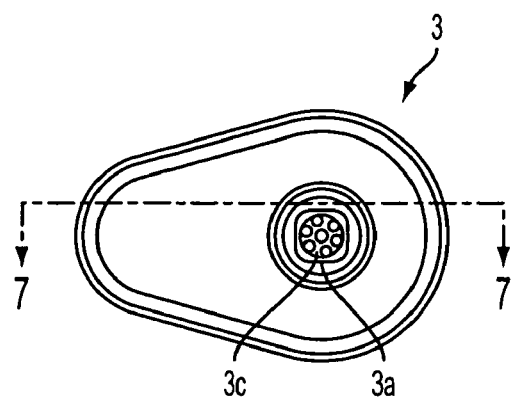
FIG. 6 shows a bottom view of the cartridge shown in FIG. 7.
Figure 7:
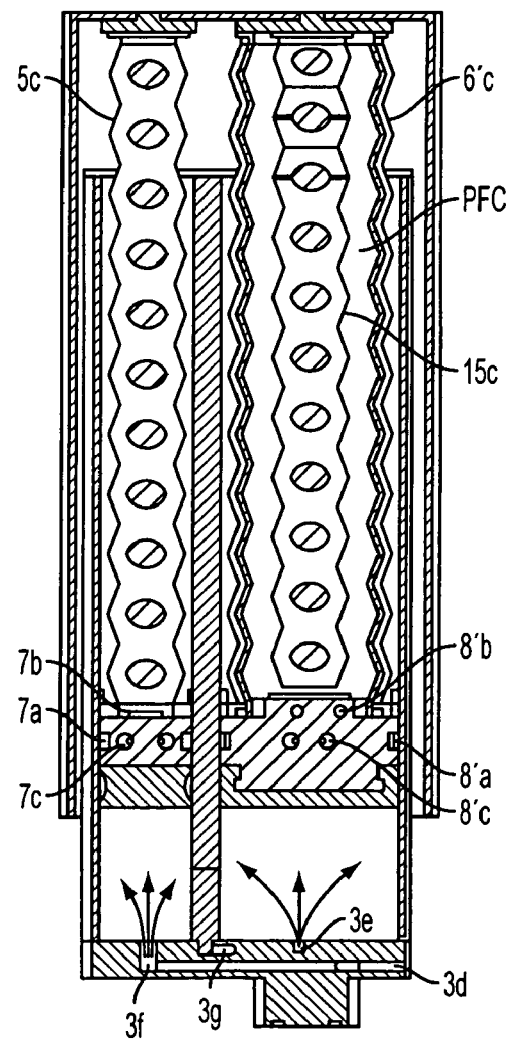
FIG. 7 shows another cross section of the embodiment shown in FIG. 4 during the movement to the expanded position. The spent fuel flow from the fuel cell entering into the two spent fuel storing chambers is schematically illustrated by arrows.
Figure 8:
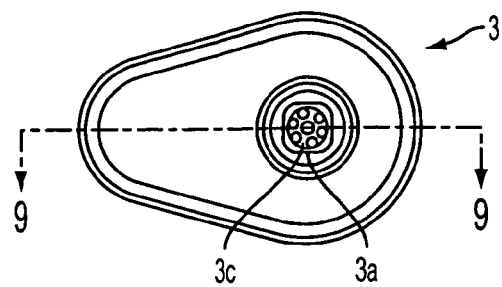
FIG. 8 shows a bottom view of the cartridge shown in FIG. 9.

As can be seen in FIG. 6, the opening 3a of the end cap 3 includes a plurality of openings 3c. These openings 3c communicate with transverse passages, e.g., 3d, 3e, 3f, and 3g (see FIGS. 7 and 11) in the end plate 3. By way of one non-limiting example, these transverse passages can be arranged in any desired complex arrangement within the end plate 3 (as shown in, e.g., FIG. 11), i.e., they can be formed at the time the end plate 3 is formed by, e.g., injection molding. The transverse passages in the end plate 3 in turn communicate with passages, e.g., EFP and FFP (see FIG. 12) in the main body portion 4. By way of one non-limiting example, these passages EFP, FFP can be arranged within the connecting wall 4c, as shown in FIG. 12, i.e., they can be integrally formed at the time the body 4 is formed by, e.g., injection molding. Alternatively, these passages EFP, FFP may be formed in other parts of the body 4 and even, e.g., on an external surface of the main body 4 (not shown). The size and number of passages can vary depending on the desired rate of flow and the density of the fuel and electrolyte components. According to one embodiment, two of the openings 3c and corresponding passages EFP can be allocated for (or are otherwise placed in fluid communication with) the electrolyte bellows 5, two other of the openings 3c and corresponding passages FFP can be allocated for (or are otherwise placed in fluid communication with) the primary fuel bellows 6', and two other of the openings 3c and corresponding passages FFP can be allocated for (or are otherwise placed in fluid communication with) the secondary fuel bellows 15. By way of non-limiting example, the openings and/or passages may be circular and may have a diameter of approximately 3 mm.

Figure 14:
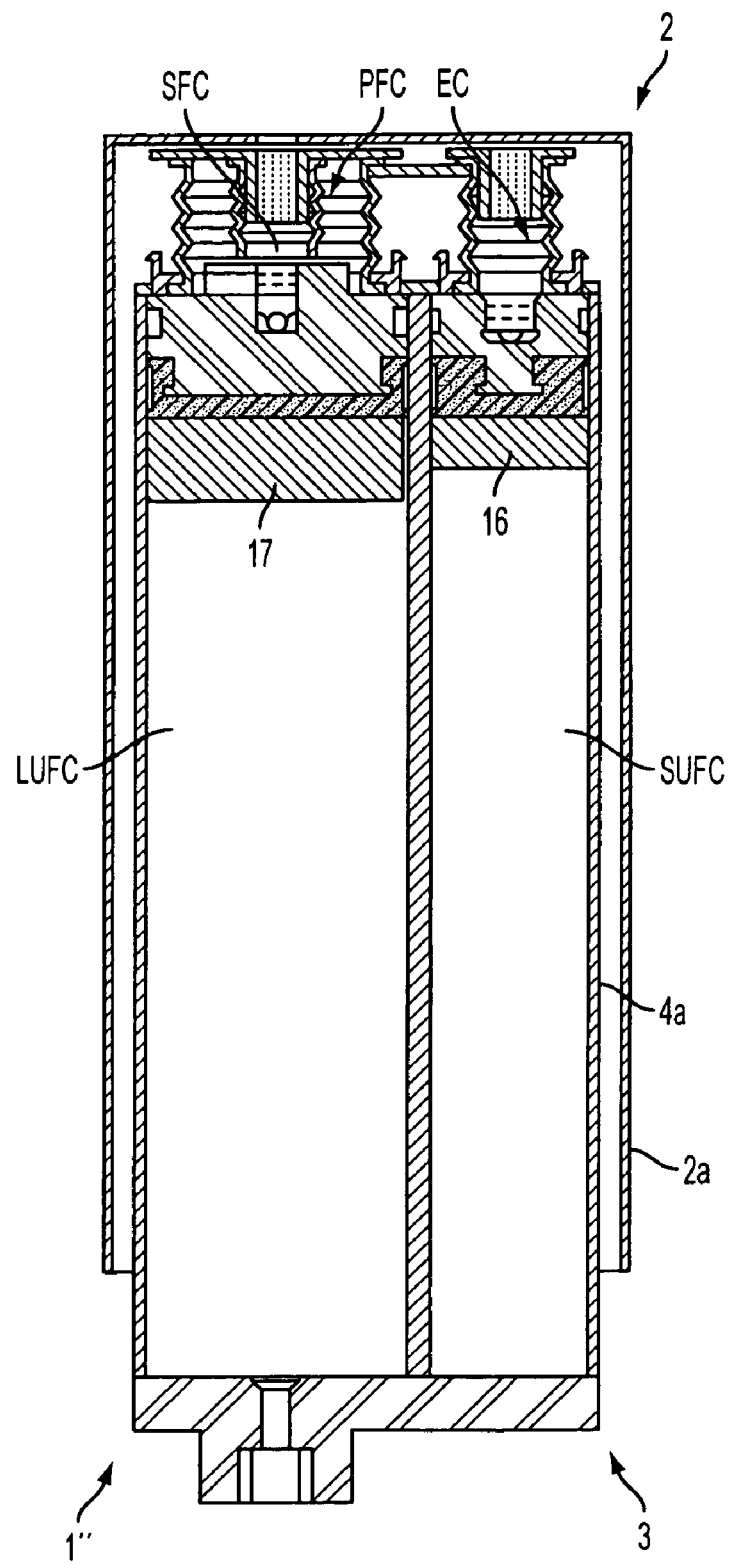
FIG. 14 shows a cross section of another non-limiting embodiment of a cartridge. This embodiment is similar to the embodiment shown in FIG. 4, and utilizes neutralizing devices arranged adjacent to the pistons to neutralize the mixed spent fuel and electrolyte in the spent fuel chambers. The cartridge is shown in the compressed position after the cartridge pumps the new fuel and electrolyte from its fuel and new electrolyte chambers into the fuel cell.

FIG. 14 shows a third non-limiting embodiment of the refilling device 1". The device has the form of a cartridge 1" and, with the exception of elements 16 and 17, can be generally identical to the embodiment shown in FIGS. 4–13. Elements 16 and 17 can also be utilized in the cartridge embodiment shown in FIGS. 1–3 (not shown). Element 16 is arranged within the small spent fuel chamber SUFC. This element 16 comprises a material which can neutralize the spent fuel or otherwise prevent chemical reactions from occurring between the spent fuel and spent electrolyte while these components are stored in the cartridge 1". Similarly, element 17 can be arranged within the large spent fuel chamber LUFC. As with element 16, this element 17 comprises a material which can neutralize the spent fuel or otherwise prevent chemical reactions from occurring between the spent fuel and spent electrolyte while these components are stored in the cartridge 1". The material should preferably also prevent the high PH used fuel and electrolyte from leaking out of the cartridge. Thus, it is preferred to used a material with which has super absorbency and which has a weight that is equal to approximately 1/500th the weight of the spent fuel and/or which has a volume of less than approximately 0.5 cc.

As explained above, FIGS. 15 and 16 illustrate one way that the cartridge 1 or 1' can be connected to the fuel cell FC or otherwise placed into fluid communication with the fuel cell via a valve V. The cartridge is attached to the top surface of the fuel cell FC via the valve V. According to this non-limiting embodiment, the female portion of the valve V is secured to the fuel cell FC and remains secured thereto. The male portion of the valve V is secured to the cartridge and remains secured thereto. The cartridge is connected to the valve V via a securing cap 18 which has an external profiled surface that facilitates gripping (for tightening and loosening the same) of the same by a user. As explained above, the cap 18 provides for the duel action of securing the connection and provides sealing between the cartridge 1 and valve V. The cap 18 can, of course, be rotated in one direction to secure the cartridge to the fuel cell FC, and in an opposite direction to, e.g., allow the cartridge and male portion 100 to separate as a unit from the female portion and fuel cell FC, which form another unit. Of course, the invention contemplates other ways of connecting the cartridge to the fuel cell FC and/or valve V (see e.g., FIG. 37). In the non-limiting valve V embodiment shown in FIGS. 15–22, for example, the cartridge can be rotated (after being connected to the fuel cell FC as shown in FIGS. 15–16) between a closed valve position (see e.g., FIG. 18) and an open valve position (see e.g., FIG. 19). The angle of rotation will, of course, be based on the design of the valve V. In the valve V embodiment shown in FIGS. 23–26, for example, the cartridge can be connected directly to the two input nipples of portion 500 of the valve V (see FIG. 38) or via two tubular lines (see FIG. 37). The output nipples of the valve V can also be directly connected to passages of the fuel cell FC (see FIG. 38) or to lines which connect to the fuel cell FC (see FIG. 37). As with the embodiment shown in FIGS. 18–22, the valve V can control/regulate fluid flow by moving and/or rotating between a closed valve V position (see e.g., FIGS. 18 and 23) and an open valve position (see e.g., FIGS. 19 and 24). The design of the valve shown in FIGS. 23–26 (which can be used with any cartridge embodiment disclosed herein in place of the valve shown in e.g., FIGS. 18 and 19) similarly has two portions 500 and 400 such that when these parts are disconnected from each other (see FIGS. 25a–b), they remain closed. Thus, portion 500 prevents fluid from leaking out of the cartridge while portion 400 prevents fluid from leaking out of fuel cell FC when disconnected and when these parts 500, 400 are not rotated to an open position (see FIG. 24). Once connected to each other and rotated to the open position, these parts 500, 400 allow fluid communication between the fuel cell FC and cartridge and vice versa.

FIG. 17 shows an exploded view of the embodiment shown in FIGS. 4–13. The triggers 19a and 19b are shown disconnected from the cartridge 1'. Also shown is the sleeve 2, outer fuel bellows 6', inner fuel bellows 15, electrolyte bellows 5, electrolyte piston 7, electrolyte piston sealing cap 9, fuel piston 8, fuel piston sealing cap 10, upper wall 4b with small and large openings, main body portion 4, end cap 3, male portion 100 of valve, and securing cap 18. The embodiment shown in FIGS. 1–3 would have a similar exploded view except that bellows 15 would be eliminated.

Figure 18:
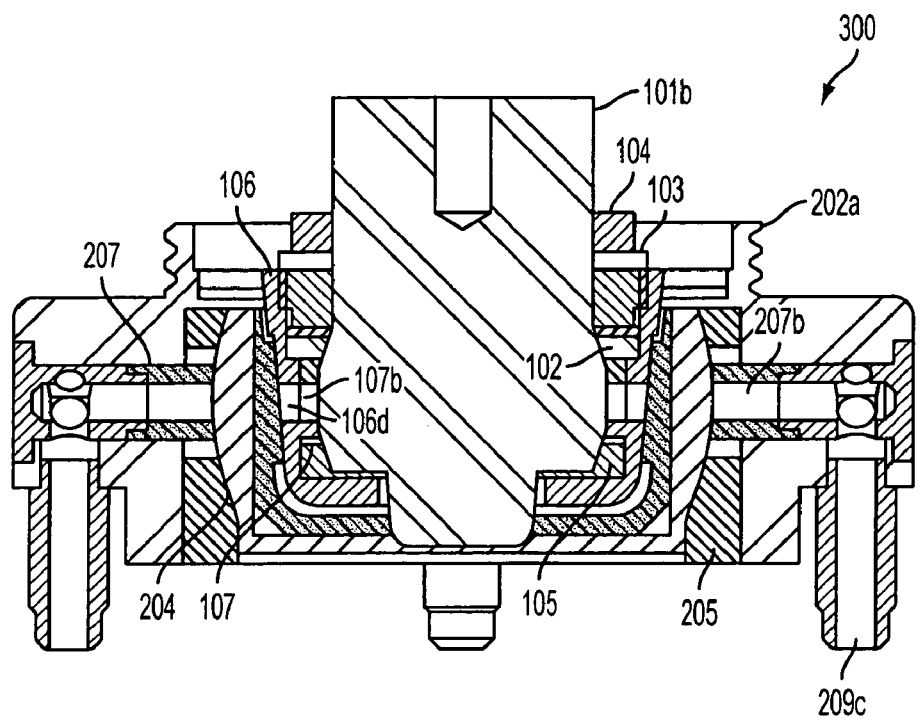
FIG. 18 shows a cross section of one non-limiting valve for connecting the cartridge to the fuel cell, for regulating/controlling spent fluid flow between the fuel cell and the cartridge, and for regulating/controlling new fluid flow between the cartridge and the fuel cell. The valve is shown in the closed position thereby preventing any fluid flow.

FIGS. 18–22 shows a first non-limiting embodiment of a valve 300 which can be used to couple or connect the cartridge (i.e., any of the cartridges 1, 1" and 1") to a fuel cell FC (in the same way as valve V in FIGS. 15 and 16). The valve 300 includes a male portion or subassembly 100 (see FIGS. 20 and 21) and a female portion 200 (see FIGS. 20 and 22). The valve 300 can be operated between a closed position (see FIG. 18) and an opened position (see FIG. 19). FIG. 18 shows a cross-section of the valve 300 in a connected state (the securing cap 18 has been removed) but in the closed position, i.e., the male portion 100 has not yet been rotated with respect to female portion 200 to the open position. As explained previously, the valve 300 has the function of controlling/regulating the fluid flow between the cartridge (i.e., any one of the cartridge embodiments disclosed herein) and the fuel cell FC. The valve 300 thus includes a plurality of fluid passages 101g, 101d, 107b, 106d, 203b, 204b, 208c and 209c which are placed in fluid communication with each other when the valve 300 is in the opened position and which allow fluid to pass between the cartridge and fuel cell and vice versa when the valve 300 is in the open position. A plurality of exit ports or nipples 209 (e.g., four in the embodiment shown in FIGS. 18–22) allow the fluid to enter and exit the valve 300 and to enter and exit the fuel cell FC. Thus ports 209 can be directly sealingly connected to the fuel cell FC (see FIGS. 15 and 16). This can occur by directly connecting the ports 209 to passages of the fuel cell FC or by connecting the ports 209 to fluid communication lines, tubes or hoses whose other ends are connected to the fuel cell FC (in the same way as, e.g., FIG. 37). In this regard, the invention contemplates that each of the ports can be connected to a different part or area of the fuel cell FC. Alternatively, they can be connected to a distributor ring which in turn is connected to the fuel cell FC (not shown). Moreover, the distributor ring can be arranged within the fuel cell FC. Of course, as explained above and as shown in FIGS. 15 and 16, the valve 300 can be attached directly to the fuel cell FC such that the female portion 200 remains secured to the fuel cell FC at all times and such that the male portion 100 of the valve 300 remains attached to the cartridge at all times.

In order to place the valve 300 into fluid communication with the cartridge, the end plate 3 is coupled to an upper end 101b of the centrally arranged male member 101. The male member 101 includes a plurality of vertical passages 101g, e.g., four, which can be arranged parallel to a centrally disposed opening 101h. These passages 101g are configures to communicate with aligned passages 3c in the end plate 3 (see e.g., FIG. 6). To ensure that passages 101g align with the passages 3c of the end plate 3, the male member 101 includes four flats 101a and rounded corners 101b which are sized to slide into a correspondingly sized opening 3d of the end plate 3. This connection may be, e.g., a press-fit connection. This connection also allows for rotation of the male member 101 to be caused by rotation of the cartridge about an axis running through openings 101h and IO. FIG. 18 shows the valve 300 in a position before the male member 101 is rotated to the opened position shown in FIG. 19. In the position shown in FIGS. 18 and 19, the male portion 100 and female portion 200 are connected together. This, as explained above, would occur when the securing cap 18 is threaded onto the threads 202a of the valve 300 to ensure that the cartridge and male portion 100 are secured to the female portion 200 (see e.g., FIGS. 15 and 16). In the embodiment shown in FIGS. 18–22, rotation of the male member 101 to a predetermined angle causes parts 203 and 204 to rotate (after an initial rotation movement) to an opened position shown in FIG. 19. As can be seen in FIG. 18, the male member 101 rotates relative to parts 106 and 107. In FIG. 18, the openings 107b and 106d are aligned with each other in the closed position. On the other hand, FIG. 18 shows that the openings 101d of the male member 101 and the openings 203b and 204b are not aligned. Similarly, the openings 203b and 204b are not aligned with openings 107b, 106d, 207b, 208c, 209c. Thus, fluid is prevented from passing between passages 101g, 101d of the male member 101 and the seals 107 and between passages 209c, 208c and 207b and 106d. However, when the male member 101 is completely rotated to a predetermined angle, all of the fluid communication openings/passages 101g, 101d, 107b, 106d, 203b, 204b, 208c and 209c are placed into fluid communication with each other (see FIG. 19). This open position allows fluid to flow between the cartridge and fuel cell and vice versa.

To ensure proper functioning of the valve 300, the male member 101 is kept in press-fit and/or sealing engagement with washer seals 107. As with the openings 101d, the four seals 107 are arranged at four equally spaced angular positions. This ensures that fluid does not leak between male member 101 and seals 107. The male member 101 is also seated within a male cup member 106. To ensure this seating, the male member 101 has a spherical section 101c which supported by a lower bearing ring 105 and an upper bearing ring 102. The seals 107 also provide lateral bearing surfaces for the spherical section 101c. To ensure that the meal member 101 remains in contact with bearing surfaces of members 102, 105 and 107, and to ensure that the male member 101 and male cup member 106 form a subassembly 100 which can be disconnected as a unit from the female portion 200, the male portion 100 utilizes a securing ring 103. Although not shown, the securing ring 103 may be press-fit onto the generally cylindrical section 101i of the male member 101. Alternatively, the securing ring 103 may include fine internal threads which engage corresponding fine external threads of the cylindrical section 101i (not shown). A spacer ring 104 is arranged above the securing ring 103. The spacer ring 104 has an opening whose inner surface 104b, 104c correspond to the surfaces 101a, 101b of the male member 101. The spacer ring 104 is forced against the securing ring 103 when the securing cap 18 is threaded onto the female member (see FIGS. 15 and 16).

A female member 204 is similarly kept in press-fit and/or sealing engagement with cylindrical seals 207. As with the openings 204b, the four seals 207 are arranged at four equally spaced angular positions. This ensures that fluid does not leak between female member 204 and seals 207. The female member 204 is also seated within the female portion body 202. To ensure this seating, the female member 204 has a spherical section 204a which supported by a lower bearing ring 205 and an upper bearing ring 210. The seals 207 also provide lateral bearing surfaces for the spherical section 204a. To ensure that the female member 204 remains in contact with bearing surfaces of members 205, 207 and 210, and to ensure that the female member 204 and the body 202 form a subassembly 200 which can be disconnected as a unit from the male portion 100, the female portion 200 utilizes a press-fit connection between the bearing ring 205 and the body 202. Moreover, as the bottom portion of the body 202 will generally be mounted in a secured manner to the fuel cell FC, such contact can be relied upon to ensure that the bearing ring 205 cannot move axially out and away from the body 202. An inner shoulder of the body 202 ensures that the upper bearing ring 210 does not move axially upwards and once the bearing ring 205 is fully inserted into the body 202, the female member 204 is axially retained within the body 202. In order to ensure that there is sealing engagement between the male portion 100, and specifically outer surfaces of the male outer sleeve 106, an interface cup 203 is arranged within the female member 204. This interface cup 203 rotates with female member 204 and is also in sealing engagement with the female member 204. The interface cup 203 thus ensures that no leaking occurs between openings 106d and 203b and between openings 203b and 204b. As is evident from comparing FIGS. 18 and 19, the female member 204 and interface cup 203 rotate together and are caused to move and/or rotate by rotation of the male member 101 between the position shown in FIG. 18 and the position shown in FIG. 19 and vice versa.

The nipples 209 are connected (e.g., press-fit) to the body 202 and are oriented downwards and parallel to an axis of opening 101h. To ensure that ports 209 are placed into fluid communication with the various openings 207b, 204b, 203b, 106d, 107b and 101d of the valve 300, coupling end caps 208 are arranged to seat into the body 202. These end caps 208 include a plurality of circumferential openings 208b, of which at one opens out to the openings 209c. The central axial openings 208c communicate with openings 207b of the cylindrical seals 207. To prevent leaking between the seals 207 and end caps 208, these parts are placed into frictional and/or press-fit contact. Moreover, to further ensure sealing between these parts, the ends of the end caps 208 include a reduced diameter section which fits into a counter-bore of the seals 207. The end caps 208 are press-fit and/or sealingly connected to openings of the body 202 to ensure that fluid does not leak between the body 202 and the end caps 208.

Figure 20:
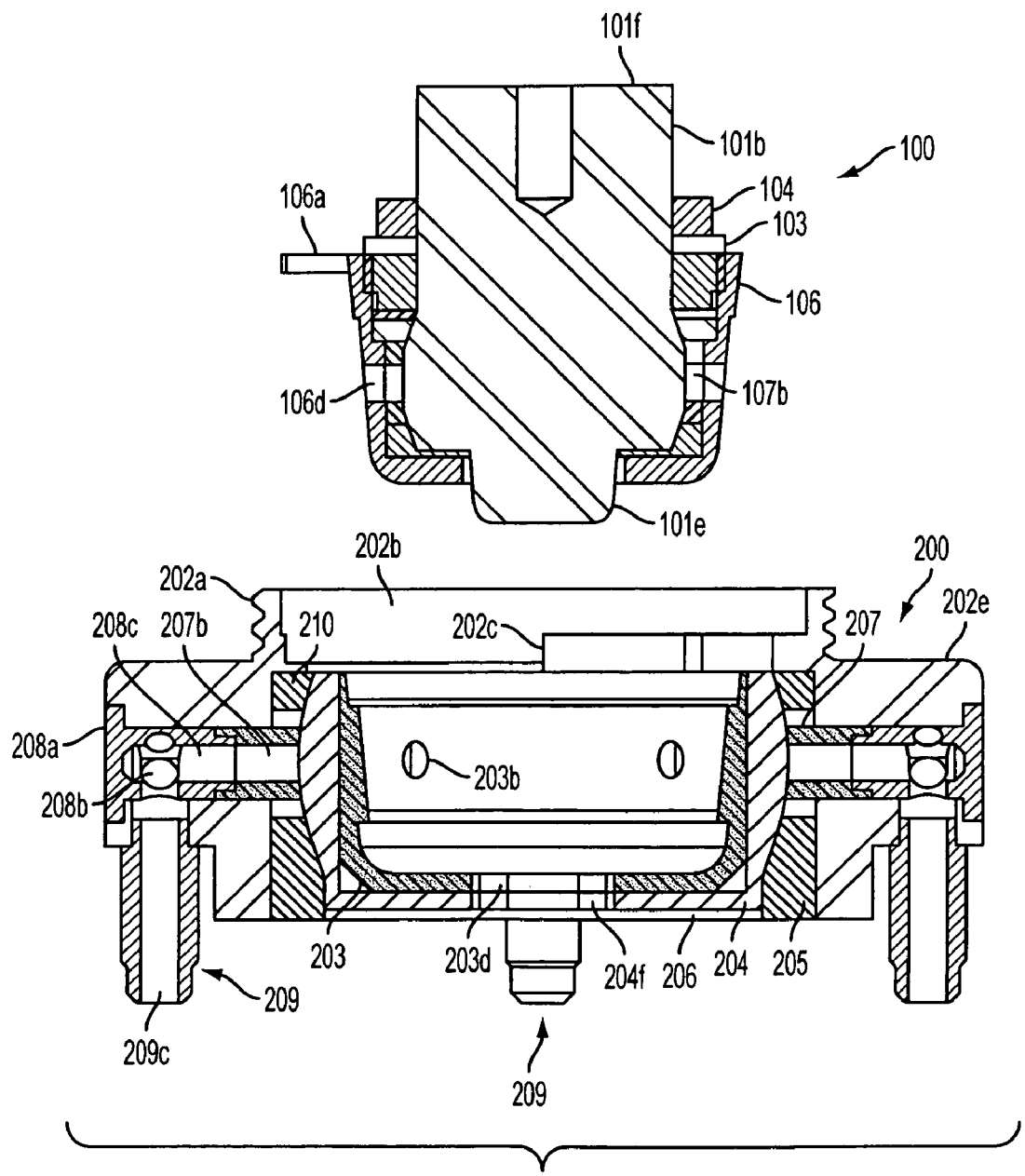
FIG. 20 shows a cross section of the valve shown in FIGS. 18 and 19 in a disconnected state. The male portion of the valve is shown positioned above the female portion.

FIG. 20 shows the valve 300 in a disconnected state. Although not shown, when in use according to an exemplary embodiment of the invention, the male portion 100 is connected to the cartridge while the female portion 200 is connected to the fuel cell FC. Thus, as explained above, the valve 300 serves to connect the cartridge to the fuel cell FC when its male and female portions are connected together. As can be noted in FIG. 20, the parts 202–210 form a connected subassembly which forms the female portion 200 of the valve 300. Moreover, parts 101–107 form a connected subassembly which forms the male portion 100 of the valve 300. FIG. 20 also illustrates the various surfaces which are placed into contact and/or sealing engagement with each other once the valve 300 is fully connected, i.e., once the male portion 100 connects to the female portion 200. Stop surfaces 202c, for example, are engaged by wing portions 106a, and specifically surfaces 106h, of the cup member 106 and act to prevent rotational movement of the cup member 106 relative to the body 202. To ensure that the male portion 100 is aligned properly within the female portion 200, the male member 101 includes a front projecting portion 101e which engages with openings 203d and 204f of the female portion. A sealing washer plug 206 is arranged at the bottom of the female portion 200 to ensure that contaminates are not introduced into the valve 300. To ensure that does not move axially, the washer 206 is press-fit into bearing ring 205. Finally, FIG. 20 illustrates an main advantage of the valve 300. That is, the male portion 100 is closed off when the male and female portions are disconnected from each other, i.e., the openings 101d are not aligned with or otherwise placed in fluid communication with openings 107b and 106d. Similarly, the female portion 200 is closed off when the male and female portions are disconnected from each other, i.e., the openings 203b and 204b are not aligned with or otherwise placed in fluid communication with openings 207b, 208c, and 209c. This ensures that when the valve 300 is in a disconnected state, fluid cannot leak out of the fuel cell FC (in the case of the female portion 200) and that fluid cannot leak out of the cartridge (in the case of the female portion 100).

Figure 21:
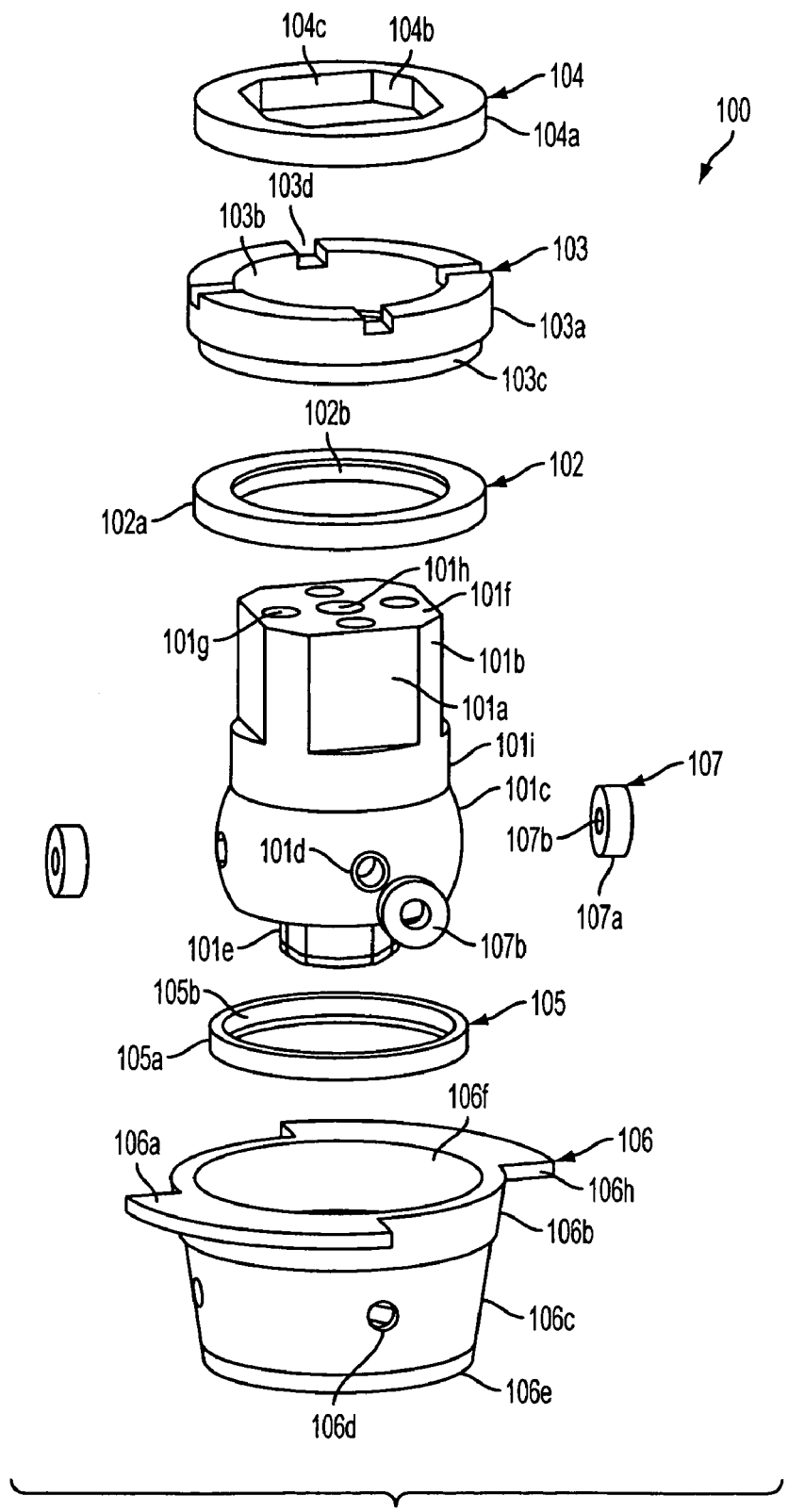
FIG. 21 shows an exploded view of the male portion of FIGS. 18–20 and illustrates the individual parts of the male portion.

FIG. 21 shows an exploded view of the male portion 100 of the valve 300. Here, it can be seen that the spacer ring 104 includes a generally square-shaped opening which is defined by straight walls 104c and rounded corners 104b which correspond in size to surfaces 101a and 101b of the male member 101. This allows the spacer ring to slide over and onto the male member 101. By way of non-limiting example, the spacer ring 104 may have an outside diameter of approximately 16 mm, an inside diameter of 12 mm, and a thickness of approximately 2 mm. Additionally, the spacer ring 104 may be made of a metal such as, e.g., SS 303. The securing ring 103 is arranged below the spacer ring 104 and includes four notches 103d which are equally angular spaced from each other. The securing ring 103 has an outer diameter 103a of approximately 18 mm an inner diameter 103b of approximately 12 mm and, includes a lower reduced diameter portion 103c which may have a diameter of approximately 16.5 mm. The securing ring 103 may be made of a metal such as, e.g., SS 303, and may have a thickness of approximately 5 mm. An upper bearing ring 102 is arranged below the securing ring 103 and includes an upper circular planar surface which engages with a lower circular planar surface of the securing ring 103. The bearing ring 102 has an outer diameter 102a of approximately 17 mm an inner diameter 102b of approximately 12 mm and, includes a lower chamfered surface (whose angle may be approximately 27 degrees relative to a center axis) which frictional engages with spherical section 101c of the male member 101. The upper bearing ring 102 may be made of a polymer such as, e.g., Teflon, and may have a thickness of approximately 2 mm. In the valve embodiment shown In FIGS. 18–22, it is preferred that there be an interference fit between the various parts which must provide sealing therebetween, such as between the polymer parts and the metal parts. Accordingly, it is preferable that the interference fit between these parts provide for plastic deformation of the polymer parts in the range of between approximately 0.2 mm and 0.4 mm. It is also preferred that the valve parts function to absorb the last drops when the valve parts 100, 200 are disconnected from each other.

The male member 101 is arranged below the upper bearing ring 102 and includes four planar side surfaces 101a which are equally angular spaced from each other, which may have a length of approximately 9.5 mm, and which are separated by rounded corners 101b. The male member 101 has an upper diameter 101b/101c of approximately 12 mm, a spherical surface section 101c whose diameter is approximately 14 mm, a lower projecting portion 101e. The spherical section 101c includes four openings 101d which may have a diameter of approximately 1.6 mm. The four vertical passages 101g may have a diameter of approximately 2 mm. The length of cylindrical section 101b/101c can be approximately 15 mm and the length of the spherical section can be approximately 8 mm. The male member 101 may be made of a metal such as, e.g., SS 303. Four washer seals 107 are arranged at equally spaced positions around the spherical section 101c. The seals 107 have an outer diameter 107a of approximately 6 mm and an opening of approximately 2.5 mm. One annular surface of the seal 107 is configured to frictionally and sealingly engage with the spherical surface 101c of the male member. The seals 107 may be made of a polymer such as, e.g., Teflon, and may have a thickness of approximately 2 mm. A lower bearing ring 105 is arranged below the male member 101 and includes a lower circular planar surface which engages with an upper circular planar surface of the male cup member 106. The bearing ring 105 has an outer diameter 105a of approximately 17 mm an inner diameter of approximately 12 mm and, includes an upper chamfered surface (whose angle may be approximately 27 degrees relative to a center axis) which frictional engages with spherical section 101c of the male member 101. The lower bearing ring 105 may be made of a polymer such as, e.g., Teflon, and may have a thickness of approximately 2 mm.

Figure 19:
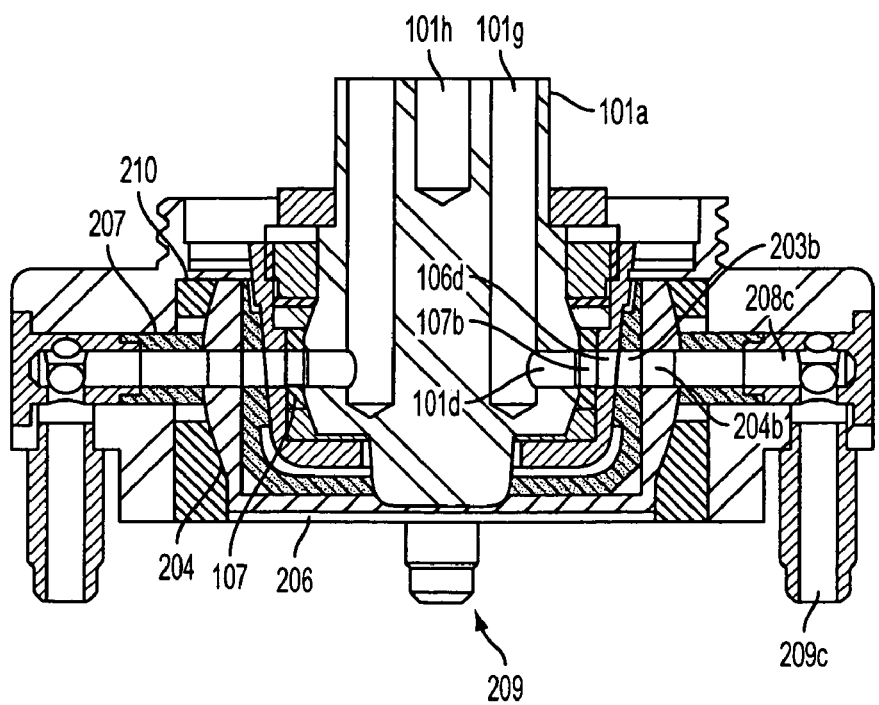
FIG. 19 shows a cross section of the valve shown in FIG. 18, but with the valve being shown in the opened position thereby allowing fluid flow between the fuel cell and the cartridge, and between the cartridge and the fuel cell.

The male cup member 106 is arranged below the lower bearing ring 105 and includes two wing sections 106a which are equally angular spaced from each other and which have surfaces 106h which engage with surfaces 202c of the body 202. The male cup member 106 an upper tapered surface 106d, a lower tapered surface 106c, a rounded corner 106e and a planar bottom surface which has a square shaped opening (not shown). The male cup member 106 also includes internal surfaces which are configured to receive therein the parts 105, 107, 101, 102 and 103 as is shown in FIGS. 18–20. The tapered section 106c includes four openings 106d which may have a diameter of approximately 1.6 mm. The overall length of the cup member 106 approximately 19 mm. The male cup member 106 may be made of a metal such as, e.g., SS 303.

Figure 22:
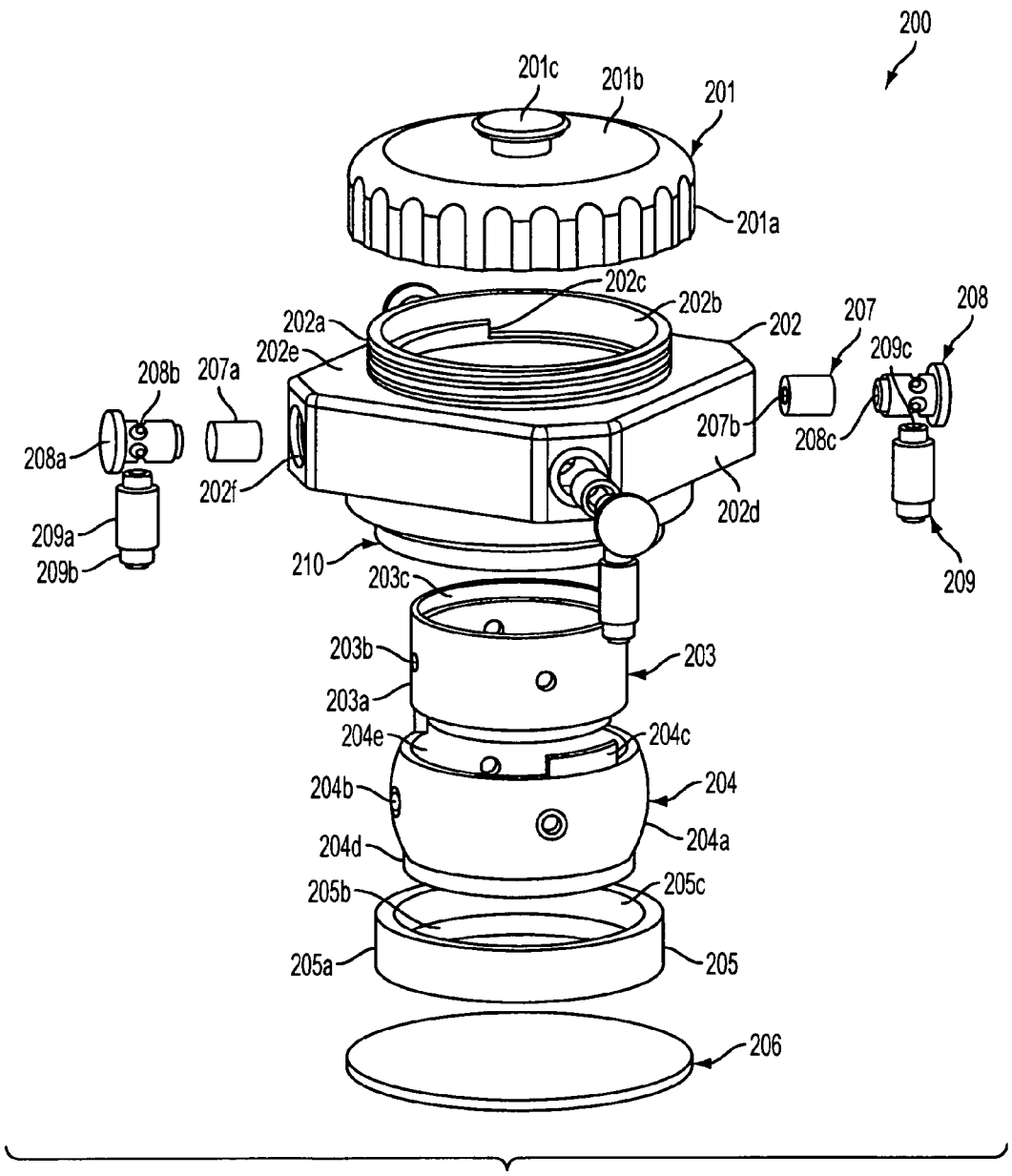
FIG. 22 shows an exploded view of the female portion of FIGS. 18–20 and illustrates the individual parts of the female portion. The figure also shows a cap for closing-off the female portion.

FIG. 22 shows an exploded view of the female portion 200 of the valve 300. Here, it can be seen that a sealing cap 201 (which can be made of a polymer and whose internal threads engage with threads 202a in the same way as securing cap 18) can be used to seal the valve 300 when the male portion 100 is disconnected from the female portion 200. The cap 201 includes an upper surface 201b, a handle 201c, and an external friction surface which facilitates gripping by a user. This surface 201a can include projections and recesses as is shown in FIG. 22. The cap 201 ensures that no debris enters the female portion 200 (and the fuel cell FC) and ensures that the sealing surfaces of the interface cup 203 are not contaminated and/or are otherwise protected. The female portion 200 includes a main body 202 that includes a generally square-shaped body which is defined by a planar upper surface 202e, planar sides 202d, and chamfered corners having openings 202f which correspond in size to the end caps 208. These openings 202f allows the cylindrical washers 207 and end caps 208 to slide into the body 202. By way of non-limiting example, the square-shaped main body 202 may have a width of approximately 45 mm and an overall thickness of approximately 15 mm. Additionally, the body 202 may be made of a metal such as, e.g., SS 303. Alternatively, the body 202 can be made of a polymer such as, e.g., acetal. As explained above, the body 202 includes external threads 202a which can be threadably engaged by the threads of the securing cap 18 and cap 201. Four cylindrical washer seals 207 are arranged at equally spaced positions and are configured to frictionally engage the spherical section 204a. The seals 207 have an outer diameter of approximately 5 mm and an opening of approximately 2.5 mm. One annular surface of the seal 207 is configured to frictionally and sealingly engage with the spherical surface 204a of the female member 204 while the opposite annular surface is configured to frictionally and sealingly engage with the end caps 208. The seals 207 may be made of a polymer such as, e.g., Teflon.

An upper bearing ring 210 is arranged below the body 202 and includes an upper circular planar surface which engages with an inner circular planar surface of the body (see FIGS. 18 and 19). The bearing ring 210 has an outer diameter of approximately 28 mm an inner diameter of approximately 23 mm. It also includes an inner chamfered surface (whose angle may be approximately 22 degrees relative to a center axis) which frictional engages with an upper portion of the spherical section 204a of the female member 204. The upper bearing ring 210 may be made of a polymer such as, e.g., Teflon, and may have a thickness of approximately 2 mm. An interface cup 203 is arranged below the ring 210 and includes a cylindrical outer surface 203a which frictionally and/or sealingly engages with an inner cylindrical surface of the female member 204 (see FIGS. 18 and 19). The interface cup 203 also includes a tapered inner surface which frictionally and/or sealingly engages with an outer tapered surface 106c of the male cup member 106 (see FIGS. 18 and 19). The interface cup 203 has an outer diameter 203a of approximately 20 mm and a planar bottom wall whose opening 203d receives therein the projecting portion 101e of the male member 101. It also includes four openings 203b which are aligned with the openings 204b of the female member 204. The interface cup 203 may be made of a polymer such as, e.g., Teflon, and the openings 203b may have a diameter of approximately 2.5 mm.

The female member 204 is arranged below the interface cup 203 and includes two projecting portions 204c which are equally angular spaced from each other. Side surfaces of these projections 204c are engagable by the wings 106a of the cup member 106 to cause the female member 204 and interface cup 203 to rotate between an opened position (see FIG. 19) and a closed position (see FIG. 18). The female member 204 has an upper diameter 204c of approximately 23 mm, a spherical surface section 204a whose diameter is approximately 25 mm, a lower cylindrical surface 204d, and a planar bottom wall whose opening 204f receives therein the projecting portion 101e of the male member 101. The spherical section 204a includes four openings 204b which may have a diameter of approximately 2 mm. The length of cylindrical section 204d can be approximately 2 mm and the length of the spherical section can be approximately 11 mm. The female member 204 may be made of a metal such as, e.g., SS 303. A lower bearing ring 205 is arranged below the female member 204 and includes a lower circular planar surface which can be flush with the bottom surface of the body 202 (see FIGS. 18 and 19). The bearing ring 205 has an outer diameter 205a of approximately 28 mm an inner diameter 205b of approximately 24 mm and, includes an upper chamfered surface 205c (whose angle may be approximately 16 degrees relative to a center axis) which frictional engages with spherical section 204a of the female member 204. The lower bearing ring 205 may be made of a polymer such as, e.g., Teflon, and may have a thickness of approximately 5 mm. Finally, a circular plate-like cover 206 is arranged below the ring 205 and is configured to seal the bottom of the valve 300 in the manner described above. The cover 206 may be made of a metal such as, e.g., SS 303, may have a diameter of approximately 23 mm and a thickness of approximately 1 mm.

As explained above with regard to FIGS. 18 and 19, a plurality of exit ports or nipples 209, e.g., four, are connected (by e.g., press-fit) allow the fluid to enter and exit the valve 300 and to enter the body 202. The ports 209 can be made of a metal such as, e.g., SS 303, and may have an outer diameter 209a of approximately 3 mm, a length of approximately 8.5 mm and an opening 209c of approximately 2 mm. The end caps 208 can be made of a metal such as, e.g., SS 303, and may have an outer diameter 209a of approximately 5 mm, a length of approximately 8.5 mm and an opening 208c of approximately 2.5 mm.

Figure 23:
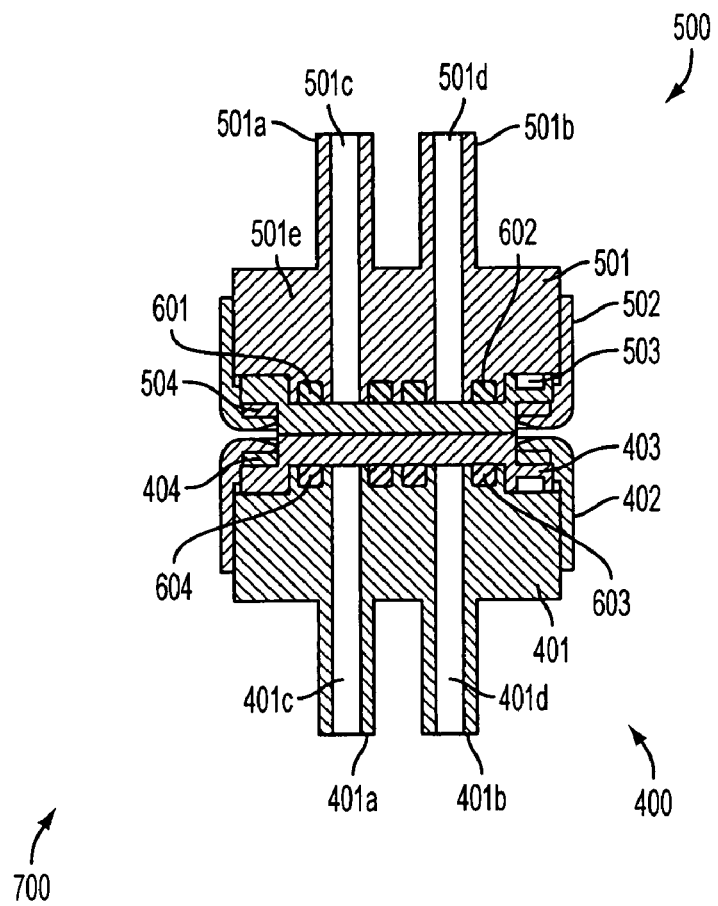
FIG. 23 shows a cross section of another non-limiting valve embodiment for connecting the cartridge to the fuel cell, for regulating/controlling spent fluid flow between the fuel cell and the cartridge, and for regulating/controlling new fluid flow between the cartridge and the fuel cell. The valve is shown in the closed position thereby preventing any fluid flow.
Figure 24:
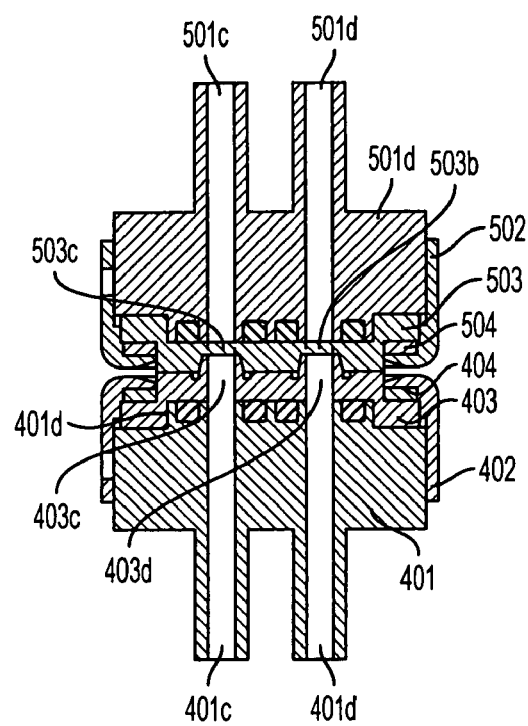
FIG. 24 shows a cross section of the valve shown in FIG. 23, but with the valve being shown in the opened position thereby allowing fluid flow between the fuel cell and the cartridge, and between the cartridge and the fuel cell.
Figure 37:
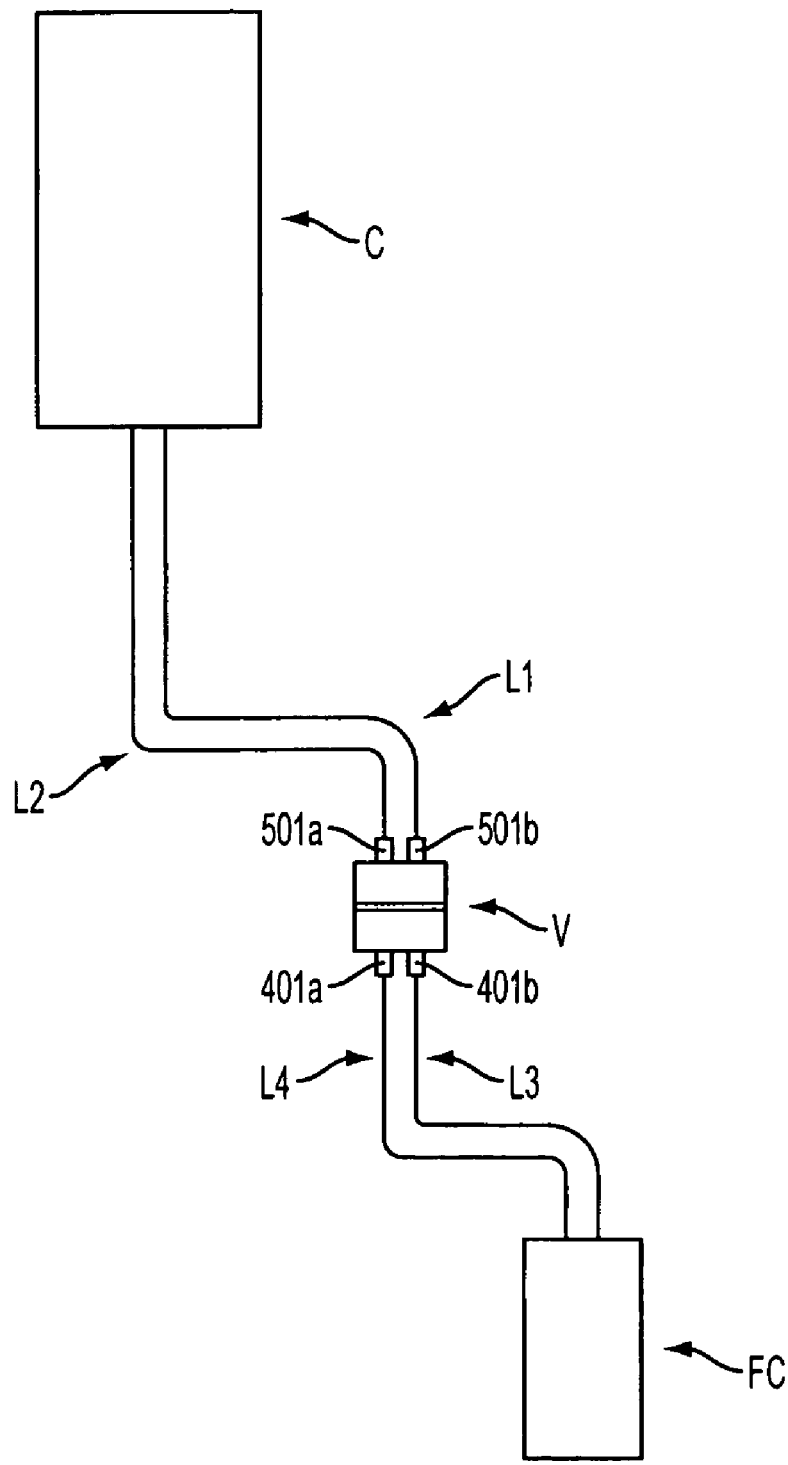
FIG. 37 shows in schematic form one non-limiting way in which the cartridge can be connected to a fuel cell via a valve.
Figure 38:
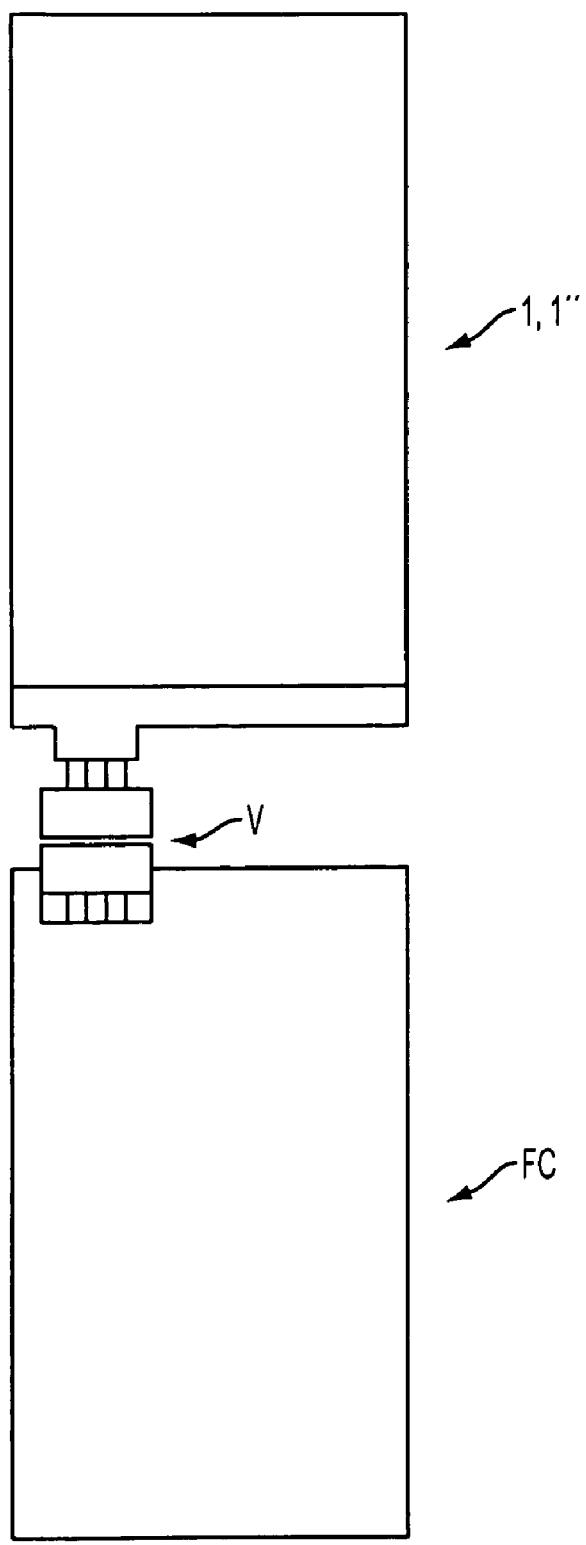
FIG. 38 shows in schematic form one non-limiting way in which the cartridge can be directly connected to a fuel cell via a valve.

FIGS. 23–26 show a second non-limiting embodiment of a valve 700 which can be used to couple or connect the cartridge (i.e., any of the cartridges 1, 1" and 1") to a fuel cell FC (by way of non-limiting examples, either in the same way as valve V in FIGS. 15 and 16 or using fluid lines as shown in FIG. 37). The valve 700 includes a first or upper portion or subassembly 500 and a second or lower portion 400 and can be operated between a closed position (see FIG. 23) and an opened position (see FIG. 24). FIG. 23 shows a cross-section of the valve 700 in a connected state (a mechanism which secures portions 500 and 400 together has been removed) but in the closed position. The valve 700 has the function of controlling/regulating the fluid flow between the cartridge (i.e., any one of the embodiments disclosed herein) and the fuel cell FC. The valve 700 thus includes a plurality of fluid passages and/or openings 501c, 501d, 503c, 503b, 403c, 403d, 401c and 401d which are placed in fluid communication with each other when the valve 700 is in the opened position (see FIG. 24). A plurality of input/output ports or nipples 501a, 501b and input/output ports 401a, 401b (e.g., two each in the embodiment shown in FIGS. 23–26) allow the fluid to enter and exit the valve 700 and to enter and exit the fuel cell FC. Thus ports 401a, 401b can be directly connected to or otherwise placed into fluid communication with the fuel cell FC while ports 501a, 501b can be directly connected to or otherwise placed into fluid communication with the cartridge. As can be seen in FIG. 38, this can occur by directly connecting the ports 501a, 501b to the cartridge and by directly connecting the ports 401a, 401b to the fuel cell FC. Alternatively, as illustrated in FIG. 37, the valve 700 can be connected to the cartridge and fuel cell by connecting the ports 501a, 501b to fluid communication lines, tubes or hoses L1, L2 whose other ends are connected to the cartridge C and by connecting the ports 401a, 401b to fluid communication lines, tubes or hoses L3, L4 whose other ends are connected to the fuel cell FC. The invention also contemplates that the ports 401a, 401b can be connected to a different part or area of the fuel cell FC and that ports 501a, 501b can be connected to different containers or chambers of the cartridge. Still further, and by way of non-limiting example, the ports 401a, 401b can be connected to a distributor ring which in turn is connected to the fuel cell FC (not shown). Of course, as explained above and as generally exemplified in the embodiment shown in FIGS. 15 and 16, the valve 700 is preferably attached directly to the fuel cell FC and cartridge such that the lower portion 400 remains secured to the fuel cell FC at all times and such that the upper portion 500 of the valve 700 remains attached to the cartridge at all times.

In order to place the valve 700 into fluid communication with the cartridge, the end plate 3 can be configured to be coupled to an upper end 501e of the upper member 501. The upper member 501 includes a plurality of vertical passages 501c, 501d, e.g., two, which are arranged parallel to a centrally disposed axis of member 501. These passages 501c, 501d can be configured to communicate with aligned passages in the cartridge, e.g., passages 3c in the end plate 3 (as would generally be the case in the example shown in FIG. 38). Alternatively, the passages 501c, 501d can be align or otherwise placed in fluid communication with the passages 3c of the end plate 3 using fluid communication lines as in the exemplary embodiment shown in FIG. 37. In this case, the cartridge would not need to be rotated to cause rotation of the upper member 501. Instead, according to one possible arrangement, the upper and lower sleeve members 502, 402 are rotated with respect upper member and lower members 501, 401 to open and close the valve 700 or the upper and lower washers 503, 403 are rotated with respect to each other. In this regard, the fluid communication lines shown in, e.g., FIG. 37, can be flexible lines so as not to inhibit such movement. FIG. 23 shows the valve 700 in a position before the upper and lower washers 503, 403 are rotated to the opened position shown in FIG. 24. In the position shown in FIGS. 23 and 24, the upper portion 500 and the lower portion 400 are connected together. This, as was explained above, would occur when a securing device (not shown) forces portion 500 towards the lower portion 400. As noted above, rotation (e.g., in opposite directions) of the upper and lower washers 503, 403 to a predetermined angle causes parts 503, 403 to assume an opened position shown in FIG. 24. In one possible embodiment, the upper and lower sleeves 502, 402 rotate relative to parts 501 and 401 to cause rotation of the washers 503, 403. While openings 501c, 501d and openings 401c, 401d are aligned with each other in the closed position shown in FIG. 23, the openings 503c, 503b and openings 403c, 403d are not aligned with openings 501c, 501d and openings 401c, 401d. Thus, fluid is prevented from passing between passages 501c and 401c and between passages 501d and 401d by the sealing washers 503, 403. However, when the sleeves 502 and 402 are completely rotated to a predetermined angle relative to each other, the fluid communication openings/passages 501c, 503c, 403c, 401c and the fluid communication openings/passages 501d, 503b, 403d, 401d are placed into fluid communication with each other (see FIG. 24).

To ensure proper functioning of the valve 700, the upper member 501 is kept in press-fit and/or sealing engagement with washer seal 503. Two O-ring seals 601, 602 are arranged at two equally spaced angular positions and within grooves formed in member 501. By way of non-limiting example, the O-rings 601, 602 may be Parker 20007 type O-rings. They may have an inside diameter of approximately 3.69 mm, a thickness of approximately 1.78 mm, and may be made of NBR or preferably Viton. This ensures that fluid does not leak between member 501 and washer seal 503. The washer seal 503 is seated within an outer groove 501c of the upper member 501. To ensure this seating, the upper member 501 has a centrally disposed circular projecting portion 501d which sealingly engages an upper surface of the washer seal 503. The washer seals 503, 403 thus have bearing surfaces which sealingly engage each other and members 501, 401. Upper washer 503 has two circular recesses which receive circular projections 403e, 403f of the washer 403. To ensure that the upper member 501, washer seal 503 and washer spring 504 form a subassembly 500 which can be disconnected as a unit from the lower portion 400, the upper 500 utilizes a securing sleeve 502. Although not shown, the securing sleeve 502 may be axially retained on the generally cylindrical section of the upper member 501. The spacer/washer spring 504 is arranged to continuously bias the washer 503 towards the upper member 501 and to apply compression to O-rings 601, 602. The washer spring 504 is forced against the washer seal 503 when the securing sleeve 502 is secured to the upper member 501.

The lower member 401 is similarly kept in press-fit and/or sealing engagement with a washer seal 403. Two O-ring seals 603, 604 are arranged at two equally spaced angular positions and within grooves formed in member 401. By way of non-limiting example, the O-rings 603, 604 may be Parker 20007 type O-rings. They may have an inside diameter of approximately 3.69 mm, a thickness of approximately 1.78 mm, and may be made of NBR or preferably Viton. This ensures that fluid does not leak between member 401 and washer seal 403. The washer seal 403 is seated within an outer groove 401c of the lower member 401. To ensure this seating, the lower member 401 has a centrally disposed circular projecting portion 401d which sealingly engages a lower surface of the washer seal 403. Lower washer 403 has two circular projections 403e, 403f which penetrate two circular recesses of the washer 503. To ensure that the lower member 401, washer seal 403 and washer spring 404 form a subassembly 400 which can be disconnected as a unit from the upper portion 500, the lower portion 400 utilizes a securing sleeve 402. Although not shown, the securing sleeve 402 may be axially retained on the generally cylindrical section of the lower member 401. The spacer/washer spring 404 is arranged to continuously bias the washer 403 towards the lower member 401 and to apply compression to O-rings 603, 604. The washer spring 404 is forced against the washer seal 403 when the securing sleeve 402 is secured to the lower member 401. The invention also contemplates a valve of the type just described wherein the O-rings 601–604 are replaced with seals or with lubricant (not shown).

Figure 25A:
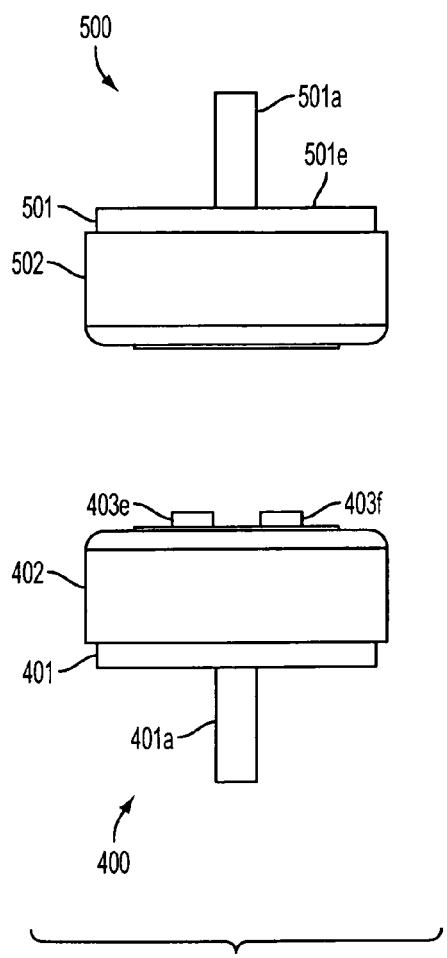
FIG. 25a shows the valve shown in FIGS. 23 and 24 in a disconnected state. The upper portion of the valve is shown positioned above the lower portion.
Figure 25B:
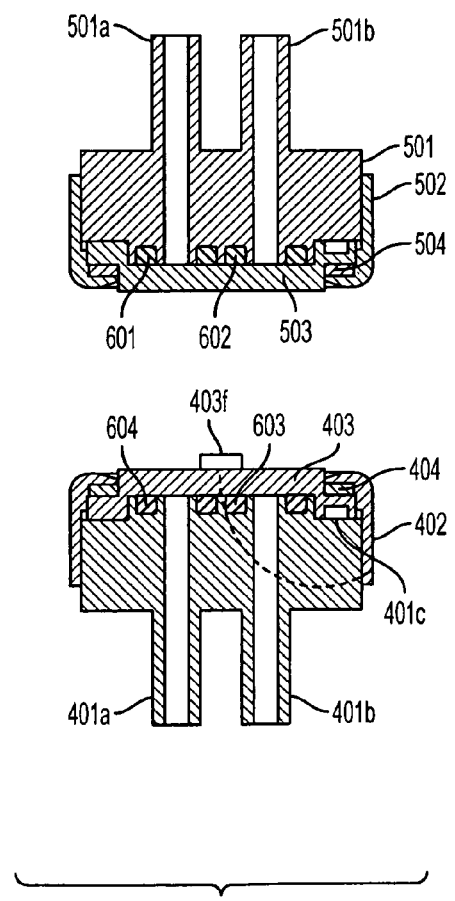
FIG. 25b shows a cross-section of the valve shown in FIG. 25a in a disconnected state.

FIGS. 25a–b show the valve 700 in a disconnected state. Although not shown, when in use according to one exemplary embodiment of the invention, the upper portion 500 is connected to the cartridge while the lower portion 400 is connected to the fuel cell FC. Thus, as explained above, the valve 700 serves to connect the cartridge to the fuel cell FC when its upper 500 and lower 400 portions are connected together. As can be noted in FIG. 25b, the parts 501–504, 601 and 602 form a connected subassembly which forms the upper portion 500 of the valve 700. Moreover, parts 401–404, 603 and 604 form a connected subassembly which forms the lower portion 400 of the valve 700. FIGS. 25a–b also illustrate the various surfaces which are placed into contact and/or sealing engagement with each other once the valve 700 is fully connected, i.e., once the upper portion 500 connects to the lower portion 400. The lower and upper surfaces of washers 503 and 403, for example, sealingly engage each other when the two parts 500, 400 of the valve 700 is fully connected/assembled. To ensure that the upper portion 500 is aligned properly within the lower portion 400, the lower portion includes projecting portions 403e, 403f which engages with recesses of the upper portion 500. Finally, FIGS. 25a–b illustrate an main advantage of the valve 700. That is, the upper portion 500 is closed off when the upper and lower portions are disconnected from each other, i.e., the openings 503c, 503b are not aligned with or otherwise placed in fluid communication with openings 501c, 501d. Similarly, the lower portion 400 is closed off when the upper and lower portions are disconnected from each other, i.e., the openings 403c, 403d are not aligned with or otherwise placed in fluid communication with openings 401c, 401d. This ensures that when the valve 700 is in a disconnected state, fluid cannot leak out of the fuel cell FC (in the case of the lower portion 400) and that fluid cannot leak out of the cartridge (in the case of the upper portion 500).

The valve 700 shown FIGS. 23–26 may function as follows: Outer sleeve 502 can be non-rotatably mounted to member 501 and can be connected by press-fit connection to member 501. Rotation of the washer 503 between the position shown in FIG. 23 and the position shown in FIG. 24 can occur by engagement with washer 403. Outer sleeve 402 can be non-rotatably mounted to member 401 and can be connected by press-fit connection to member 401. Rotation of the washer 403 between the position shown in FIG. 23 and the position shown in FIG. 24 can occur by engagement with washer 503. The alignment of the openings of the washers 503 and 402 can occur, to reach the opened position, by rotating portion 500 relative to portion 400 to a predetermined angle of rotation, and the non-alignment of the openings of washers 503 and 402 can occur, to reach the closed position, by counter-rotating portion 500 relative to portion 400 to an original position which allows the portions 500, 400 to be disconnected.

Figure 26:
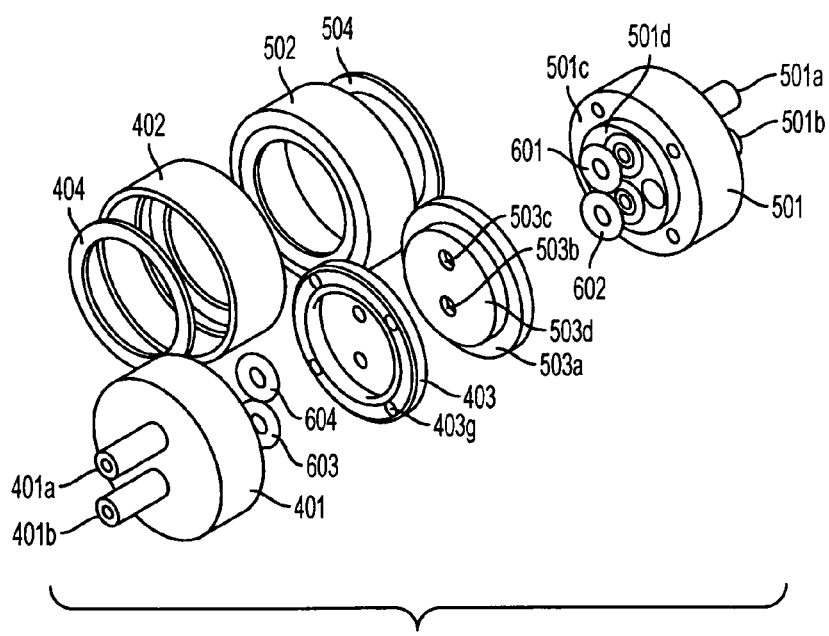
FIG. 26 shows an exploded view of the valve shown in FIGS. 23–25 and illustrates the individual parts thereof.

FIG. 26 shows an exploded view of the valve 700. Here, it can be seen that the washer 403 includes an annular groove 403g which is engaged by a projection (not shown) in the member 401 to limit rotational movement of the washer 403 between the opened position and the closed position. By way of non-limiting example, the washer 403 may have an outer diameter of approximately 24 mm and an overall thickness of approximately 5 mm. Additionally, the washer 403 may be made of a polymer such as, e.g., Delrin or Acetal. The washer spring 404 is arranged between the member 401 and sleeve 402. The sleeve 402, member 401 and spring 404 may be made of a metal such as, e.g., SS 303. The O-rings 603, 604 may also be made of rubber or a polymer such as, e.g., Teflon. The washer 503 similarly includes an annular groove (not shown) which is engaged by a projection (not shown) in the member 501 to limit rotational movement of the washer 503 between the opened position and the closed position. By way of non-limiting example, the washer 503 may have an outer diameter of approximately 24 mm and an overall thickness of approximately 5 mm. Additionally, the washer 503 may be made of a polymer such as, e.g., Delrin or Acetal. The washer spring 504 is arranged between the member 501 and sleeve 502. The sleeve 502, member 501 and spring 504 may be made of a metal such as, e.g., SS 303. The O-rings 601, 602 may also be made of rubber or a polymer such as, e.g., Teflon.

Figure 28:
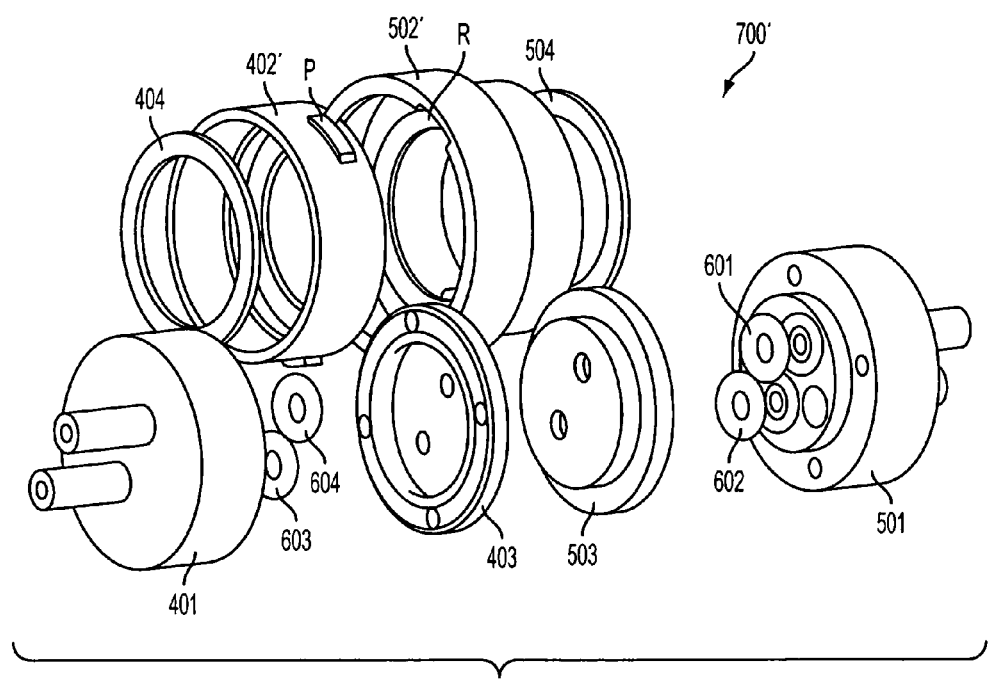
FIG. 28 shows an exploded view of another non-limiting embodiment of a valve similar to the valve shown in FIGS. 23–25 and illustrates the individual parts thereof.

FIG. 28 shows a preferred modification of the valve 700' shown in FIGS. 23–26. The valve 700' generally shares the same features as the valve 700, except that the sleeves 402 and 502 are replaced with sleeves 402' and 502'. In this embodiment, the sleeve 402' includes a plurality of equally angularly spaced circumferential projections P, e.g., two, which engage and slide within a corresponding number of equally angularly spaced recesses R, e.g., two, in sleeve 502'. These projections P and recesses R ensure that when the upper and lower parts are connected and disconnected from each other they assume the positions shown in FIGS. 23–26. The functioning of the valve 700', as well as the materials and sizes of the parts of the valve 700' can, by way of non-limiting example, otherwise be the same that was described with regard to valve 700. The valve 700' functions as follows: once the sleeve 402' is connected to the sleeve 502' by insertion of the projections or keys P into the slots or recesses R, a user can rotate the upper portion 400 relative to the lower portion 500. Such rotation causes the projections P to be locked within the sleeve 502'. This action results in the portions 400, 500 being oriented and/or locked in an opened position whereby fluid communication can occur within the valve 700'. In order to disconnect the portions 400, 500 from each other, a user must rotate the upper portion 400 relative to the lower portion 500 until the projections P again align with the slots R. This allows the parts 400, 500 to be disconnected from each other by moving these parts axially away from each other. However, such counter-rotation also causes the washers 403 and 503 to rotate to positions wherein their openings are not aligned with the openings of members 401, 501. The valve 700', as with the previously disclosed embodiments, can include a locking system which prevents the washers 403, 503 from rotating to an open position when the portions 400, 500 are disconnected.

Figure 29A:
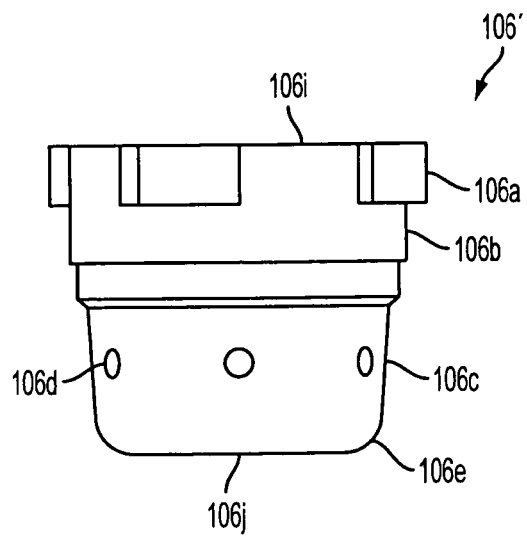
FIGS. 29a–c show in detail a non-limiting embodiment of a cup member similar to the cup member shown in FIG. 21 and which can be utilized in the non-limiting embodiment shown in FIGS. 32–34.
Figure 29B:
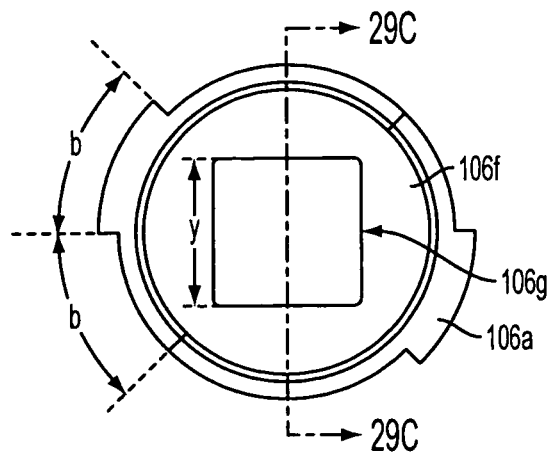
Figure 29C:
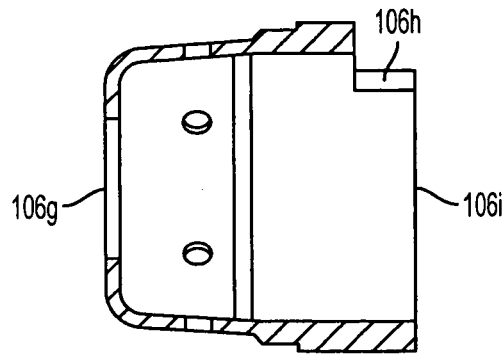
Figure 32B:
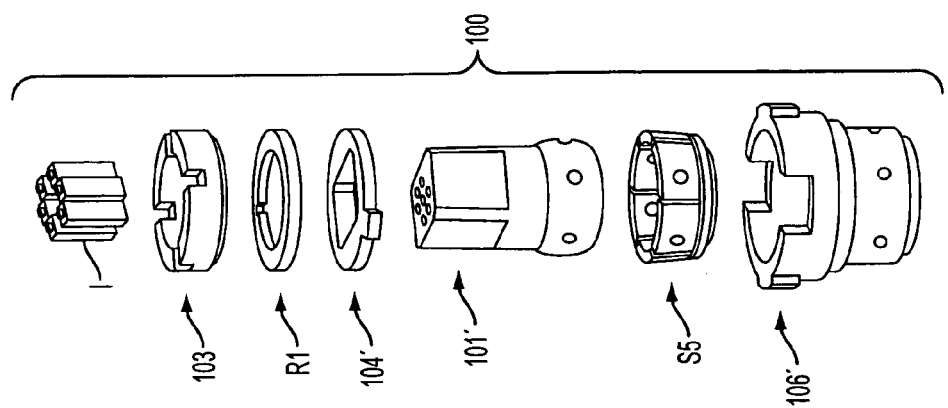
FIGS. 32a–b show exploded views of another non-limiting embodiment of a valve male portion similar to the valve male portion shown in FIG. 21 and illustrates the individual parts thereof and which can be utilized in the non-limiting embodiment shown in FIG. 34.
Figure 32A:
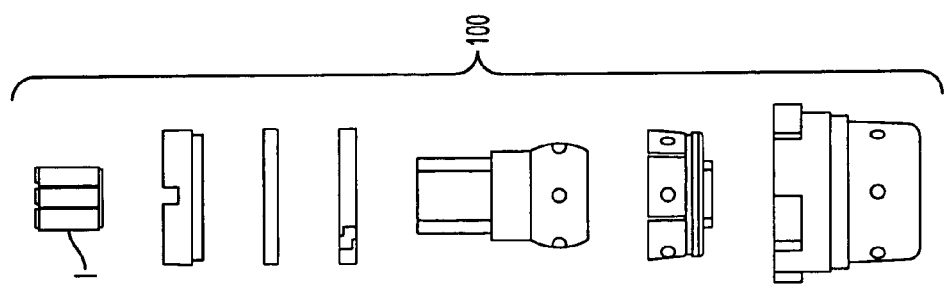
Figure 33A:
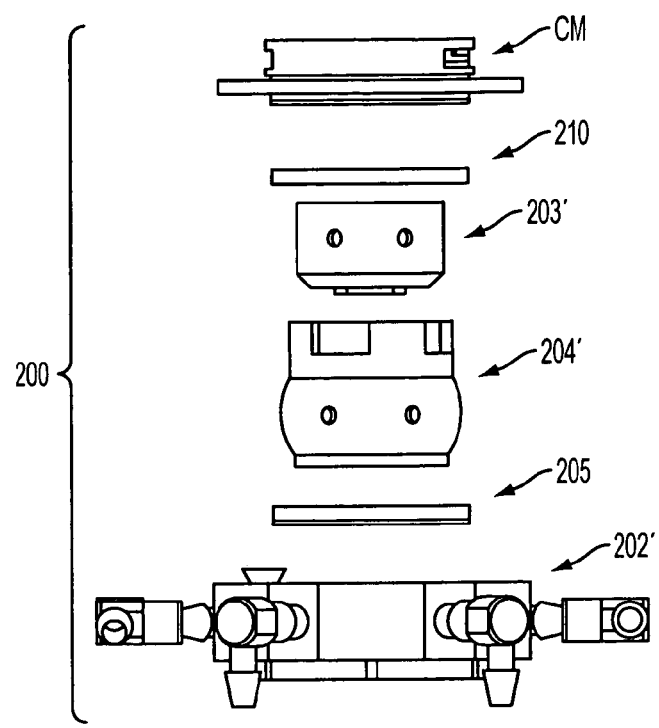
FIGS. 33a–b show exploded views of another non-limiting embodiment of a valve female portion similar to the valve female portion shown in FIG. 22 and illustrates the individual parts thereof and which can be utilized in the non-limiting embodiment shown in FIG. 34.
Figure 33B:
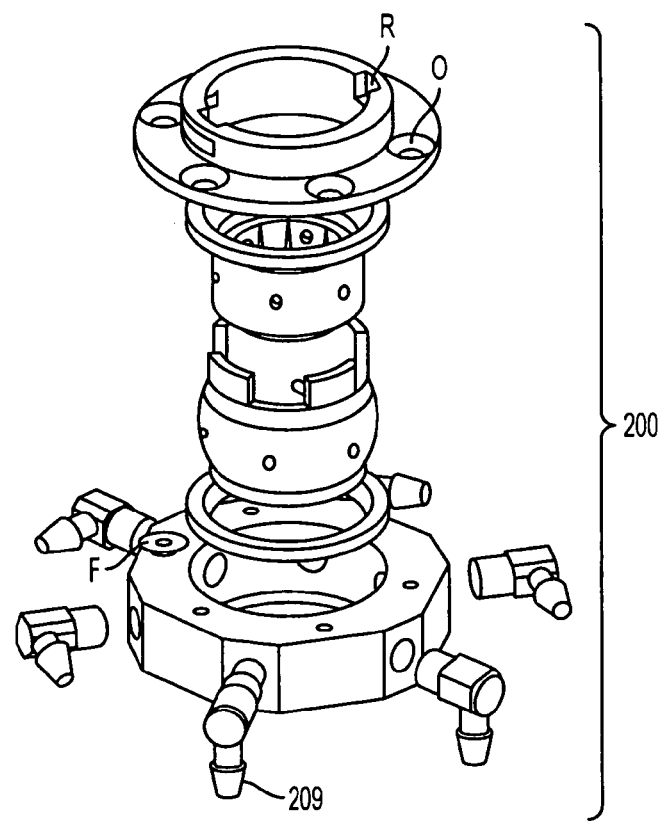

FIGS. 29a–c illustrate a possible configuration for cup member 106' which can used in a valve of the type shown in FIGS. 32–34. Here, it can clearly be seen that the male cup member 106' includes upper edge 106i, two wings 106a, slots with side surfaces 106h, cylindrical surface 106b, tapered surface 106c, openings 106d, bottom wall 106j, square shaped opening 106g in bottom wall 106j, and rounded corners 106e. The internal opening 106f is also visible and the angles "b", which can be approximately 45 degrees, are shown. The size Y of opening 106g can be approximately 10 mm. In contrast to the embodiment shown in FIGS. 18–22, the cup member 106 shown in FIGS. 29a–c utilizes six openings 106d instead of four. Such a cup member would be used with a valve having six ports (see e.g., embodiment shown in FIGS. 33a–b). The cup member 106' may otherwise have sizes similar to those described with regard to FIGS. 18–22 and may be made of a metal such as, e.g., SS 303. The cup member 106' shown in FIGS. 29a–c thus has particular application in the embodiment shown FIGS. 32–34 because it utilizes six openings 106d which correspond to the six ports 209.

Figure 30A:
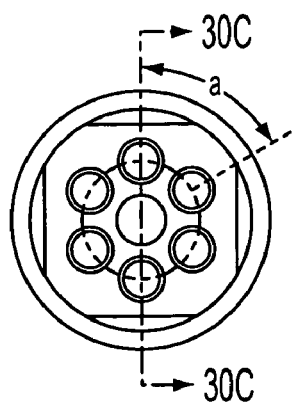
FIGS. 30a–c show in detail a non-limiting embodiment of a male member similar to the male member shown in FIG. 21 and which can be utilized in the non-limiting embodiment shown in FIGS. 32–34.
Figure 30B:
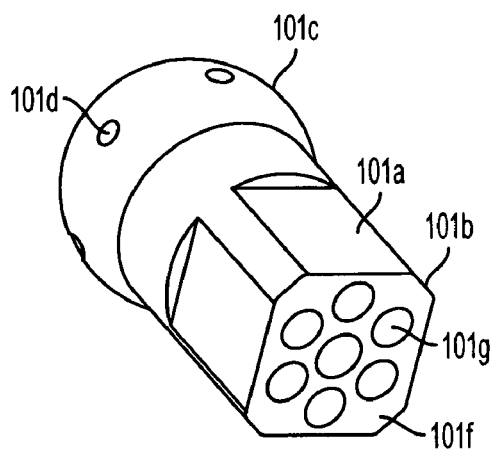
Figure 30C:
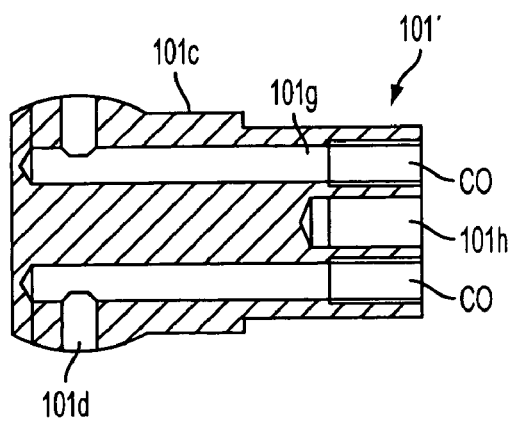

FIGS. 30a–c illustrate a possible configuration for male member 101' used in a valve of the type shown in FIGS. 32–34. Here, it can clearly be seen that the male member 101' many of the features shown in male member 101 of FIGS. 18–22. However, this embodiment eliminates the projection 101e, provides for counter-bored openings CO, and utilizes six openings 101g (angularly spaced at an approximate angle "a" of 60 degrees) instead of four. Such a male member 101' would be used with a valve having six ports (see e.g., embodiment shown in FIGS. 33a–b). The male member 101' may otherwise have sizes similar to those described with regard to FIGS. 18–22 and may be made of a metal such as, e.g., SS 303. The male member 101' shown in FIGS. 30a–c thus has particular application in the embodiment shown FIGS. 32–34 because it utilizes six openings 106d which correspond to the six ports 209.

Figure 31A:
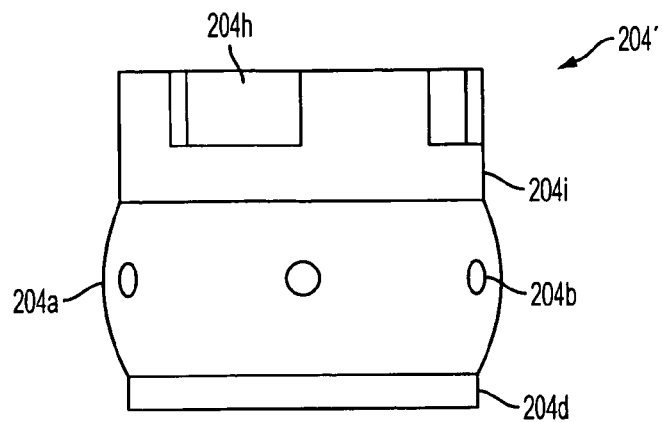
FIGS. 31a–c show in detail a non-limiting embodiment of a female member similar to the female member shown in FIG. 22 and which can be utilized in the non-limiting embodiment shown in FIGS. 33–34.
Figure 31B:
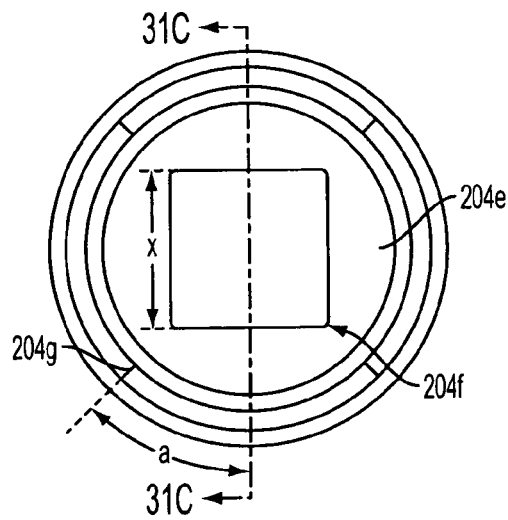
Figure 31C:
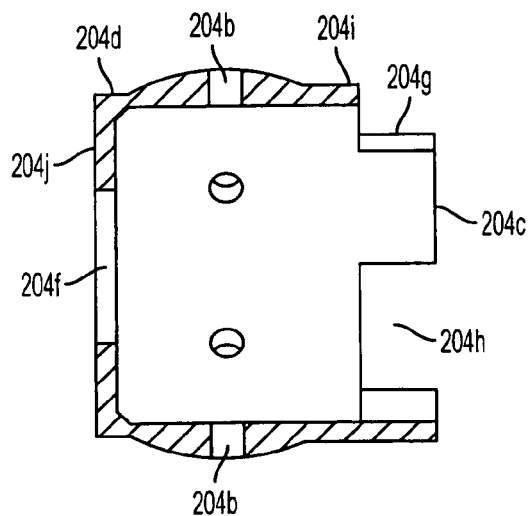

FIGS. 31a–c illustrate a possible configuration for female member 204 used in a valve of the type shown in FIGS. 32–34. Here it can clearly be seen that the female member 204' includes upper edge 204c, slots 204h, stop/engaging surfaces 204g, cylindrical surfaces 204i and 204d, spherical surface 204a, openings 204b, bottom wall 204j, square shaped opening 204f in bottom wall 204j. The internal opening 204e is also visible. The size X of opening 204f can be approximately 10 mm. In contrast to the embodiment shown in FIGS. 18–22, the female member 204' shown in FIGS. 31a–c utilizes six openings 204b instead of four. Such a female member would be used with a valve having six ports (see e.g., embodiment shown in FIGS. 33a–b). The female member 204' may otherwise have sizes similar to those described with regard to FIGS. 18–22 and may be made of a metal such as, e.g., SS 303. The female member 204' shown in FIGS. 31a–c thus has particular application in the embodiment shown FIGS. 32–34 because it utilizes six openings 106d which correspond to the six ports 209.

FIGS. 32a–b show an exploded view of a possible non-limiting embodiment of the male portion 100 for use as part of a valve of the type shown in FIGS. 18–22. This embodiment uses many corresponding parts whose dimensions, on the other hand, are different. It also utilizes the parts shown in FIGS. 29, 30, 41 and 42. Note that the sealing sleeve SS can be made of a polymer such as, e.g., Teflon, and can be used in place of in place of washer seals 107. FIGS. 33a–b show an exploded view of another possible non-limiting embodiment of the female portion 200 for use as part of a valve of the type, e.g., shown in FIGS. 18–22. This embodiment uses many corresponding parts whose dimensions, on the other hand, are different. It also utilizes an upper coupling member CM (see FIG. 43) which can be made of a plastic such as, e.g., ABS, or a metal such as, e.g., SS 303. The coupling member CM includes recesses which receive wings 106a of cup member 106' and a plurality of openings O which receive therein fasteners F for securing the member CM to the body 202'. The valve embodiment shown FIGS. 32–34 also utilizes a plurality of tubular inserts I which slide into the counter-bores CO of the male member 106 (see FIG. 30) and openings 3c (see FIG. 6) to facilitate coupling of the male member 106 in a sealing manner to the end plate 3. The inserts I can be made of metal such as, e.g., SS 303, and may have an outer diameter of 2.5, mm, an inside opening diameter of approximately 2 mm, and a length of approximately 8.5 mm. Parts corresponding to parts shown FIGS. 18–22 may have similar sizes and materials.

Figure 34A:
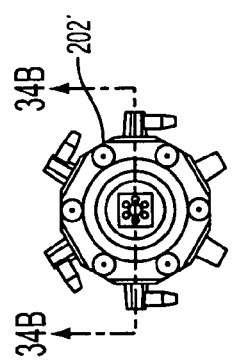
FIG. 34a shows a top view of another non-limiting embodiment of a valve.
Figure 34B:
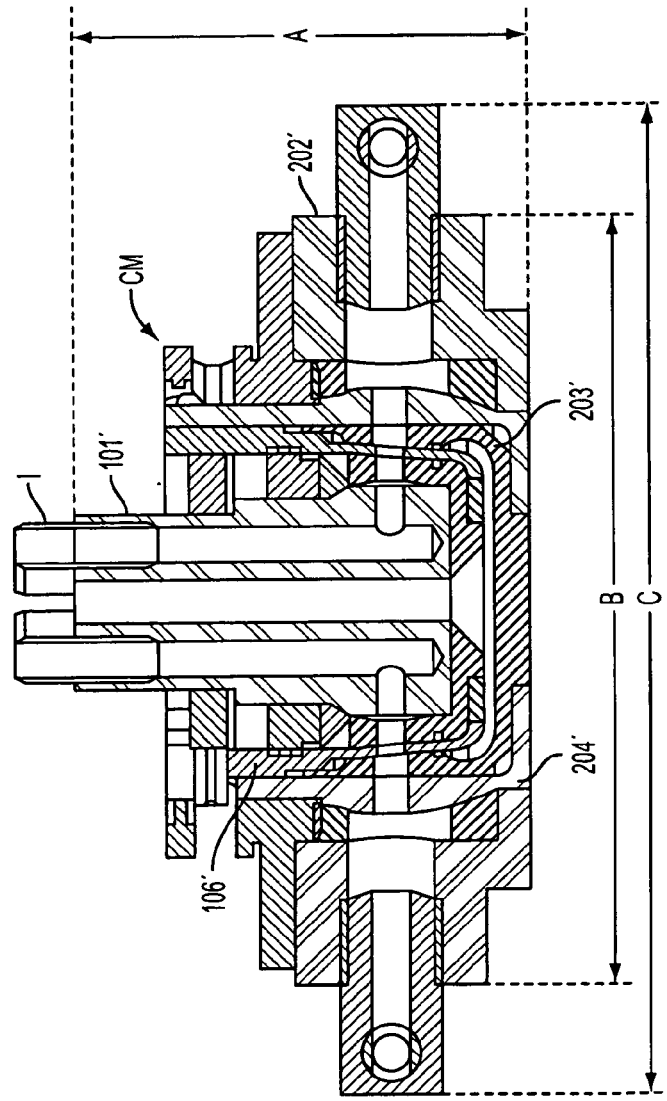

FIGS. 34a–b show a top view and cross-section view of the non-limiting embodiment shown in FIGS. 32 and 33 in an assembled form. The dimension A can be approximately 27 mm, the dimension B can be approximately 45 mm, and the dimension C can be approximately 58 mm. Parts generally corresponding to parts of FIGS. 18–22 may have different dimensions, but may be made of the same materials.

Figure 35A:
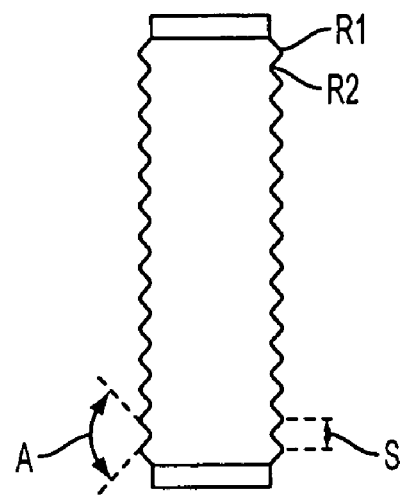
FIGS. 35a–b show in detail a non-limiting embodiment of a fuel bellows for use in the cartridge shown in FIGS. 1 and 4.
Figure 35B:
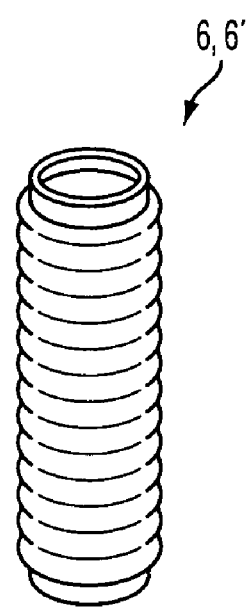

FIGS. 35a–b shows an exemplary embodiment of the fuel bellows 6, 6'. The bellows includes a plurality of pleats having radius R1 of approximately 1.8 mm and a radius R2 of approximately 0.8 mm. The pleats may for an angle A of approximately 90 degrees and a spacing S of approximately 8.75 mm. The overall length of the bellows can be approximately 136 mm, an outside diameter of approximately 42 mm, and an inner diameter of approximately 33 mm.

Figure 36A:
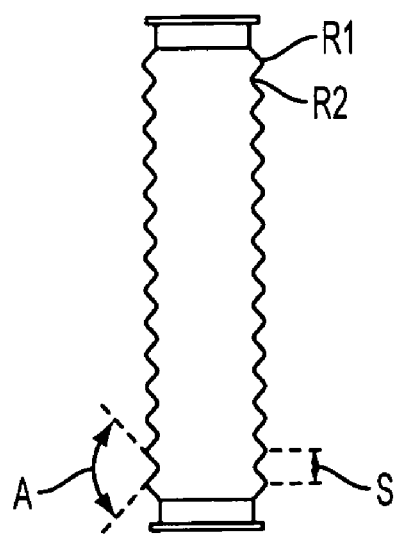
FIGS. 36a–b show in detail a non-limiting embodiment of a small fuel bellows and electrolyte bellows for use in the cartridge shown in FIGS. 1 and 4.
Figure 36B:
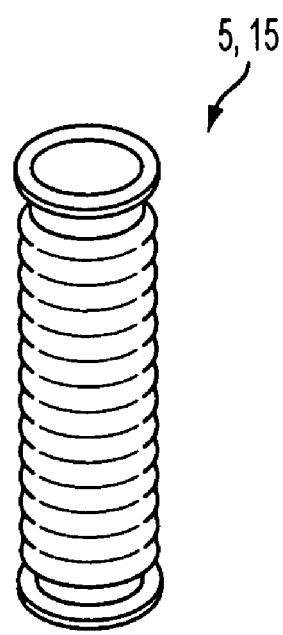

FIGS. 36a–b shows an exemplary embodiment of the small bellows 15 and electrolyte bellows 5. The bellows includes a plurality of pleats having radius R1 of approximately 1.8 mm and a radius R2 of approximately 0.8 mm. The pleats may for an angle A of approximately 90 degrees and a spacing S of approximately 8.75 mm. The overall length of the bellows can be approximately 136 mm, an outside diameter of approximately 31 mm, and an inner diameter of approximately 20 mm.

FIG. 37 shows an exemplary embodiment in schematic form of the refueling system of the invention. In this exemplary embodiment, a cartridge C is connected to ports 501a, 501b of the valve V via lines L1, L2 and a fuel cell FC is connected to ports 401a, 401b of valve V via lines L3, L4. The lines L1–L4 can be fluid communication lines, tubes or hoses whose ends are connected to the cartridge C, valve V and fuel cell FC. The invention contemplates that the valve V can be of any desired type such as those exemplified herein.

FIG. 38 shows an exemplary embodiment in schematic form of the refueling system of the invention. In this exemplary embodiment, a cartridge C is directly connected to ports of the valve V and a fuel cell FC is directly connected to ports of the valve V. This embodiment would otherwise function in the manner described with regard to FIGS. 15 and 16. The invention contemplates that the valve V can be of any desired type such as those exemplified herein.

Figure 39B:
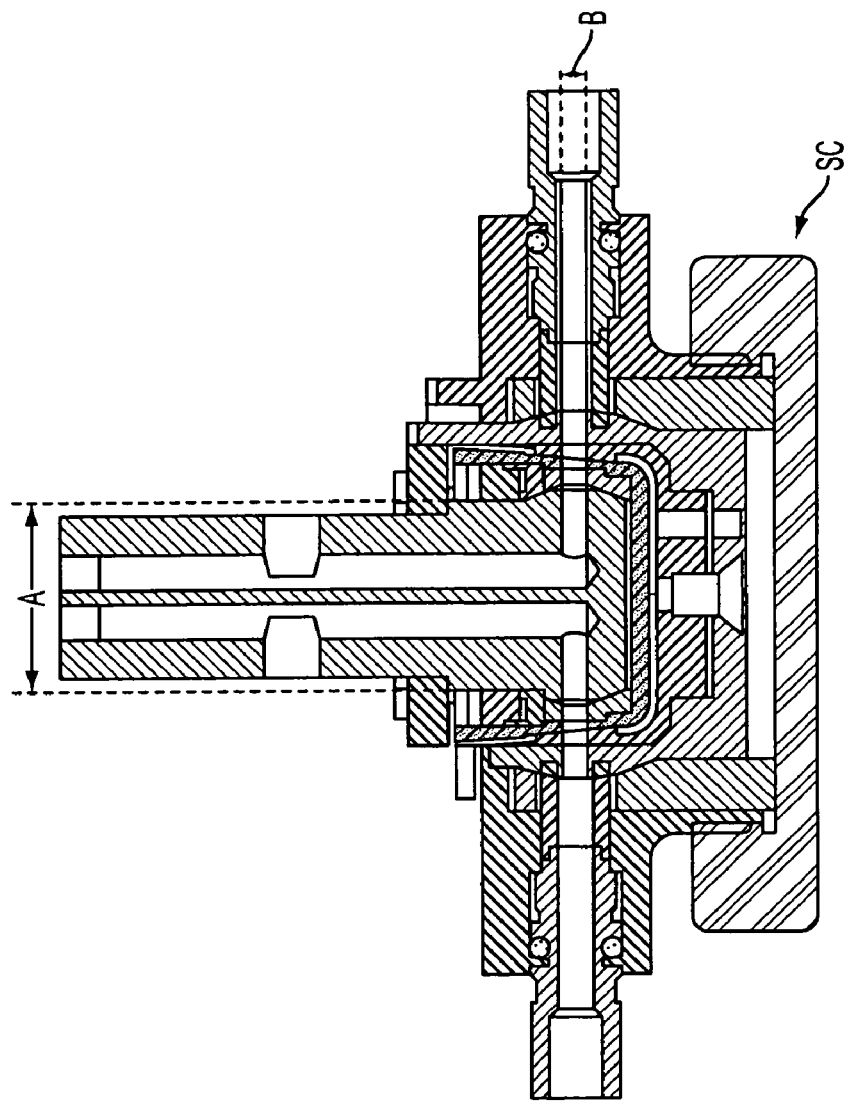
Figure 39A:
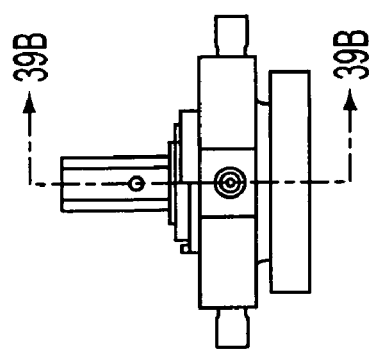
FIG. 39a shows a side view of another non-limiting embodiment of a valve.

FIGS. 39a–b show a side view and cross-section view of another possible non-limiting valve embodiment in an assembled form. This embodiment utilizes a sealing cover SC to seal the lower end of the valve. The diameter A can be approximately 14 mm and the opening diameter B can be approximately 2 mm. Parts generally corresponding to parts of FIGS. 18–22 may have different dimensions, but may be made of the same materials.

Figure 40A:
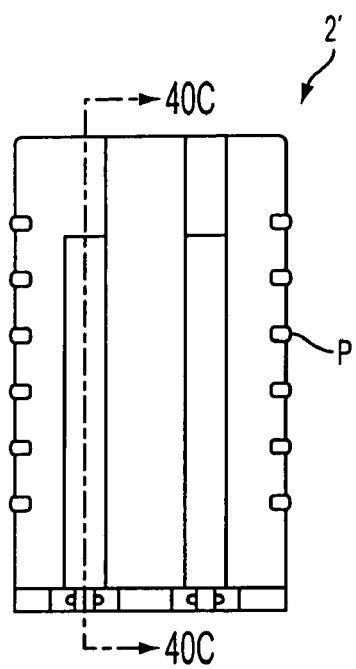
FIG. 40a shows a side view of a non-limiting outer sleeve for the cartridge of the invention.
Figure 40B:
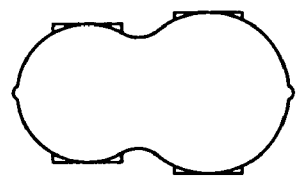
Figure 40C:
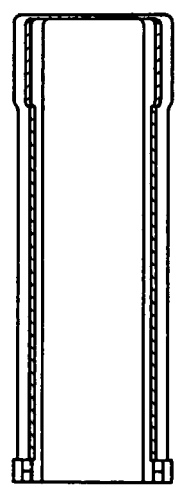

FIGS. 40a–c shows an exemplary embodiment of the outer sleeve 2'. The sleeve 2' includes a plurality of external projections P to facilitate gripping by a user. The dimensions and material of the sleeve 2' can otherwise generally be the same as those described in previous embodiments.

Figure 41A:
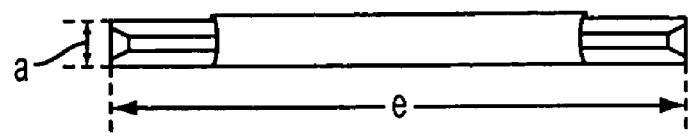
FIGS. 41a–c show in detail a non-limiting embodiment of a spacer ring similar to the spacer ring shown in FIG. 21 and which can be utilized in the non-limiting valve embodiment shown in FIGS. 32–34.
Figure 41B:
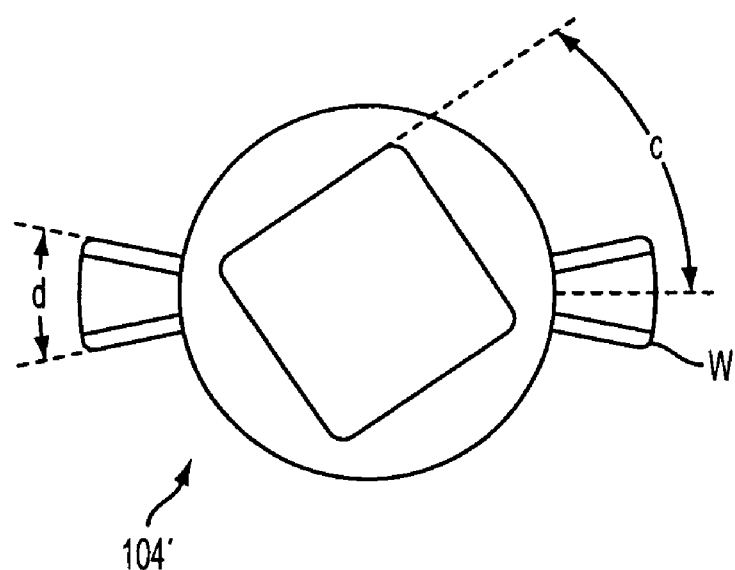
Figure 41C:
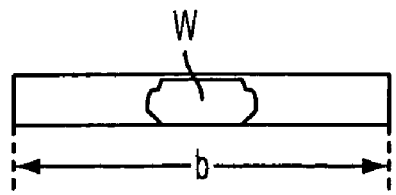
Figure 42A:
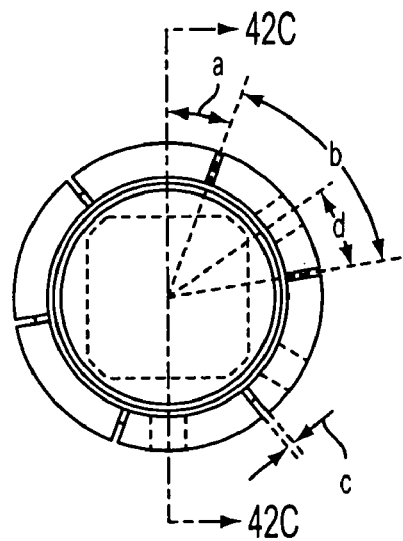
FIGS. 42a–f show in detail a non-limiting embodiment of a sealing sleeve which can be utilized in the non-limiting valve embodiment shown in FIGS. 32–34.
Figure 42B:
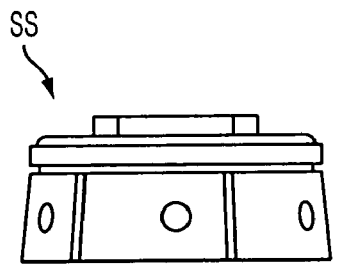
Figure 42C:
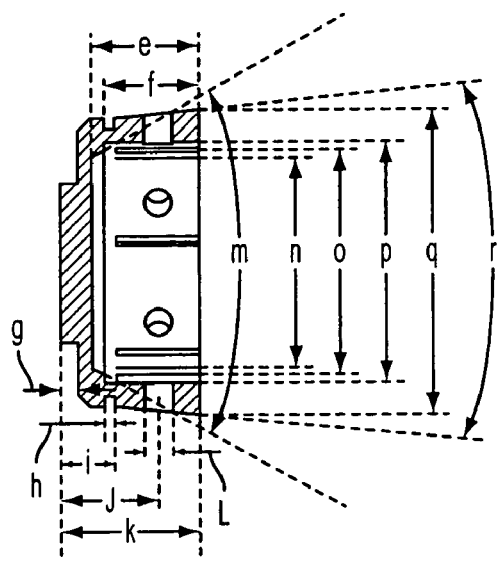
Figure 42D:
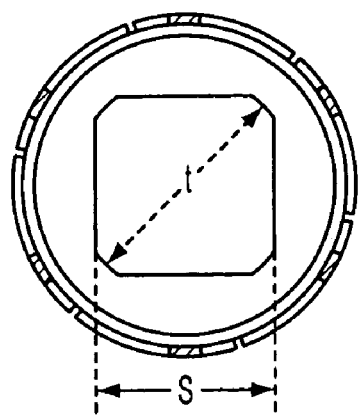
Figure 42E:
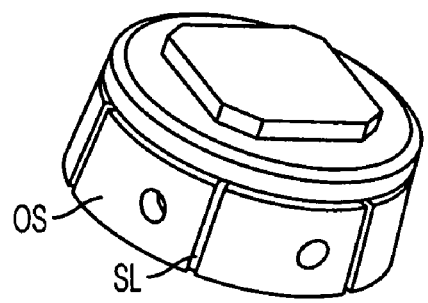
Figure 42F:
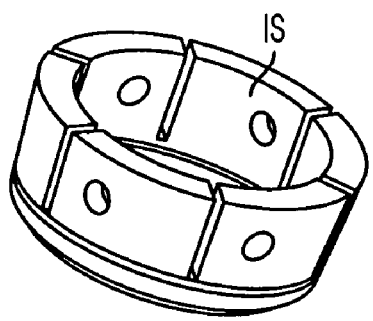
Figure 43A:
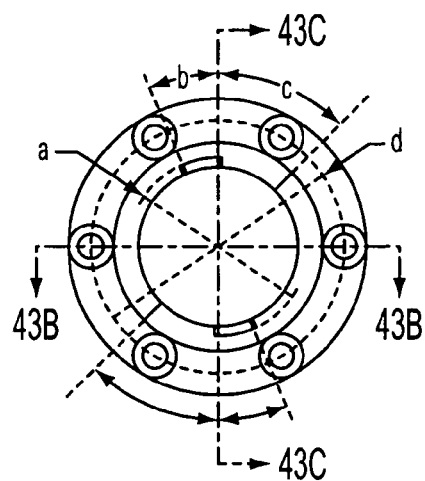
FIGS. 43a–e show in detail a non-limiting embodiment of a coupling member which can be utilized in the non-limiting valve embodiment shown in FIGS. 32–34.
Figure 43B:
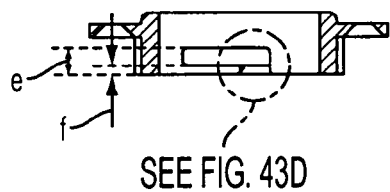
Figure 43C:
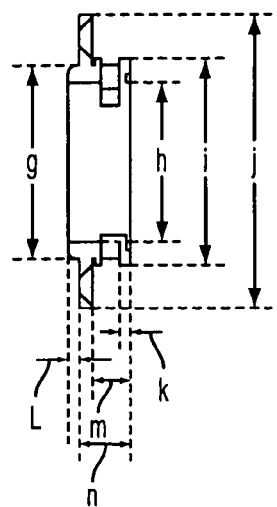
Figure 43D:
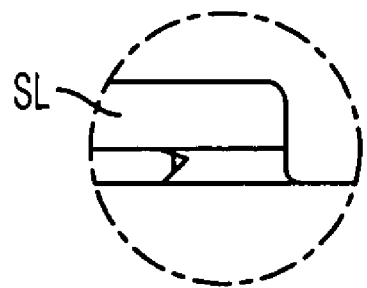
Figure 43E:
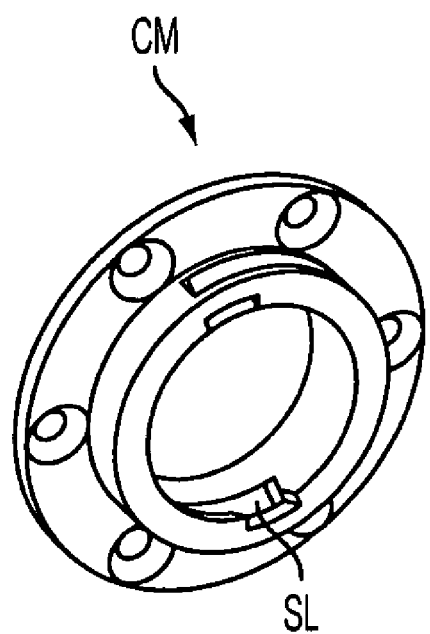

FIGS. 41a–c shows an exemplary embodiment of the spacer ring 104' for use on the valve embodiment shown in FIGS. 32–34. The ring 104' is similar to ring 104 of FIGS. 18–22 and further includes two oppositely arranged wings W. These wings W are configured to slide within slots SL (see FIG. 43). According to one non-limiting embodiment, the ring 104' has the following dimensions: "a" is approximately 2 mm, "b" is approximately 17 mm, "c" is approximately 34 degrees, "d" is approximately 23 degrees, and "e" is approximately 26 mm.

FIGS. 42a–f shows an exemplary embodiment of the sealing sleeve SS for use on the valve embodiment shown in FIGS. 32–34. The sleeve SS can be made of a polymer such as, e.g., Teflon, and includes a plurality of slots SL. The outer surface OS is configured to provide sealing with the inner surface of cup member 106' whereas the inner surface IS is configured to provide sealing with the spherical surface 101c of the male member 101'. According to one non-limiting embodiment, the sleeve SS has the following dimensions: "a" is approximately 20 degrees, "b" is approximately 60 degrees, "c" is approximately 0.5 mm, "d" is approximately 20 degrees, "e" is approximately 6 mm, "f" is approximately 5 mm, "g" is approximately 1 mm, "h" is approximately 0.5 mm, "i" is approximately 3 mm, "j" is approximately 5.5 mm, "k" is approximately 8 mm, "1" is approximately 1.6 mm, "m" is approximately 58 degrees, "n" is approximately 12 mm, "o" is approximately 12.5 mm, "p" is approximately 13 mm, "q" is approximately 17 mm, "r" is approximately 10 degrees, "s" is approximately 9 mm, and "t" is approximately 11 mm.

FIGS. 43a–e shows an exemplary embodiment of the coupling member CM for use on the valve embodiment shown in FIGS. 32–34. The member CM can be made of metal such as, e.g., SS 303, and includes two oppositely arranged slots SL. The coupling member CM is configured to be secured to the female body 202' with, e.g., fasteners. According to one non-limiting embodiment, the coupling member CM has the following dimensions: "a" is approximately 26 mm, "b" is approximately 23 degrees, "c" is approximately 45 degrees, "d" is approximately 36 mm, "e" is approximately 4 mm, "f" is approximately 1.5 mm, "g" is approximately 28 mm, "h" is approximately 23 mm, "i" is approximately 30 mm, "j" is approximately 43 mm, "k" is approximately 1.5 mm, "1" is approximately 1.5 mm, "m" is approximately 5.5 mm, and "n" is approximately 9 mm.

Figure 44A:
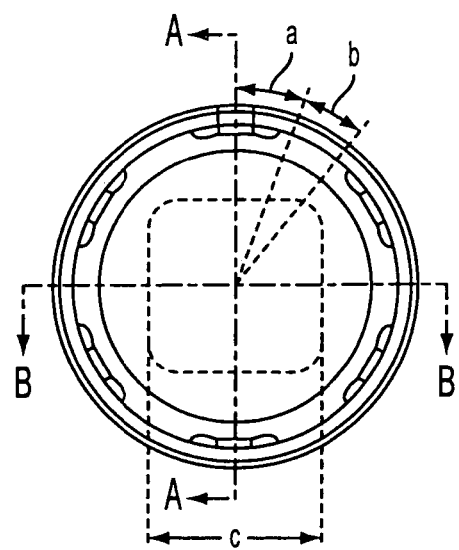
FIGS. 44a–c show in detail a non-limiting embodiment of an interface sleeve which can be utilized in the non-limiting valve embodiment shown in FIGS. 32–34.
Figure 44B:
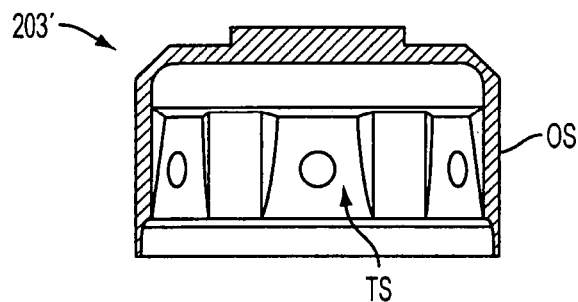
Figure 44C:
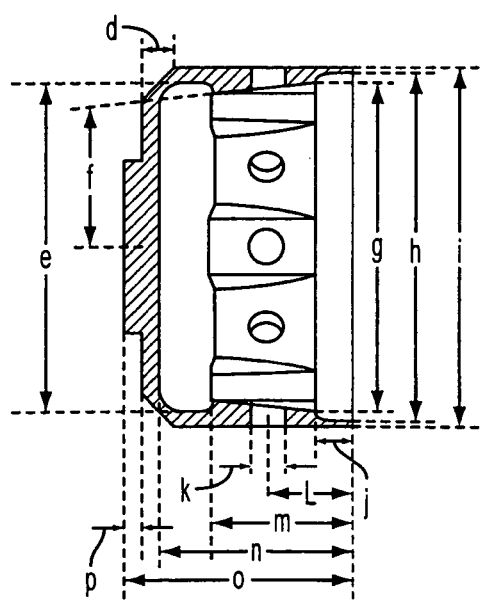
Figure 45A:
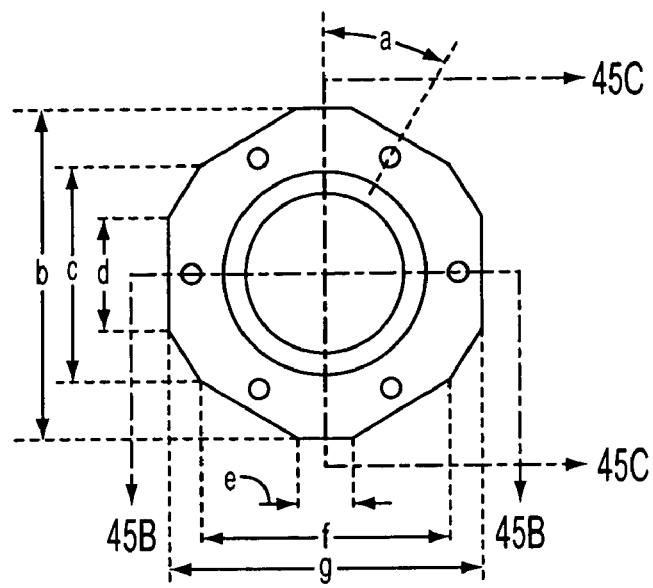
FIGS. 45a–e show in detail a non-limiting embodiment of a female body which can be utilized in the non-limiting valve embodiment shown in FIGS. 32–34.
Figure 45B:
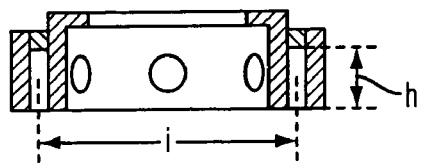
Figure 45C:
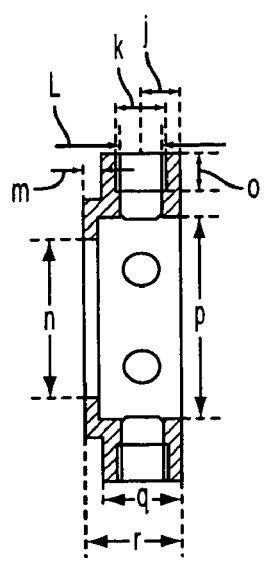
Figure 45D:
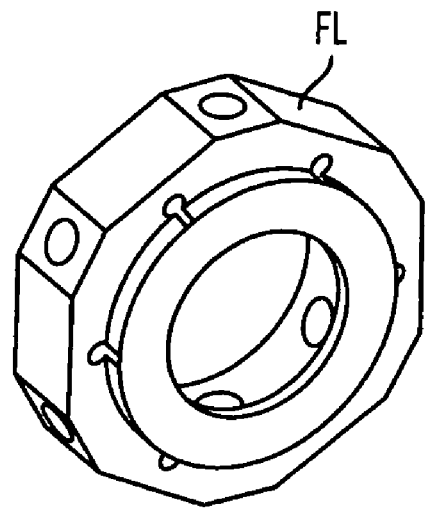
Figure 45E:
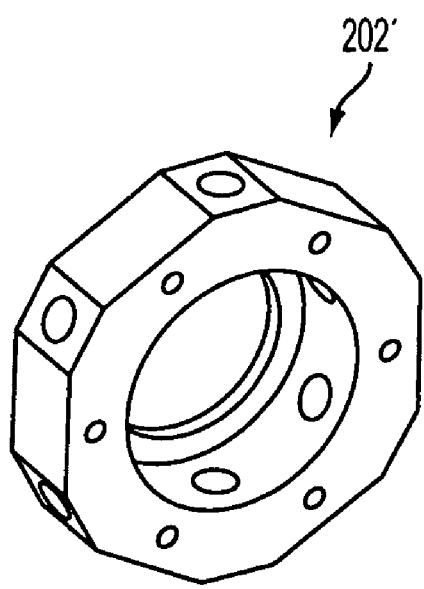

FIGS. 44a–c shows an exemplary embodiment of the interface sleeve 203' for use on the valve embodiment shown in FIGS. 32–34. The sleeve 203' can be made of a polymer such as, e.g., Teflon, and includes a plurality of tapered surfaces TS. The outer surface OS is configured to provide sealing with the inner surface of female member 204' whereas the surfaces TS are configured to provide sealing with the tapered surface 106c of the cup member 106'. According to one non-limiting embodiment, the sleeve 203' has the following dimensions: "a" is approximately 20 degrees, "b" is approximately 20 degrees, "c" is approximately 10 mm, "d" is approximately 2 mm, "e" is approximately 18.5 mm, "f" is approximately 5 degrees, "g" is approximately 18.5 mm, "h" is approximately 20 mm, "i" is approximately 20.5 mm, "j" is approximately 2 mm, "k" is approximately 2 mm, "1" is approximately 5 mm, "m" is approximately 8 mm, "n" is approximately 11 mm, "o" is approximately 13 mm, and "p" is approximately 1 mm.

FIGS. 45a–e shows an exemplary embodiment of the female body 202' for use on the valve embodiment shown in FIGS. 32–34. The body 202' can be made of metal such as, e.g., SS 303, and includes six equally spaced flats FL and openings for ports 209. The body 202' is configured to be secured to a fuel cell with, e.g., fasteners. According to one non-limiting embodiment, the body 202' has the following dimensions: "a" is approximately 30 degrees, "b" is approximately 45 mm, "c" is approximately 30 mm, "d" is approximately 15 mm, "e" is approximately 8 mm, "f" is approximately 35 mm, "g" is approximately 43 mm, "h" is approximately 9 mm, "i" is approximately 35 mm, "j" is approximately 5.5 mm, "k" is approximately 6 mm, "1" is approximately 5 mm, "m" is approximately 2.5 mm, and "n" is approximately 22 mm, "o" is approximately 5 mm, "p" is approximately 28 mm, and "q" is approximately 11.5 mm, and "r" is approximately 13.5 mm.

Figure 46:
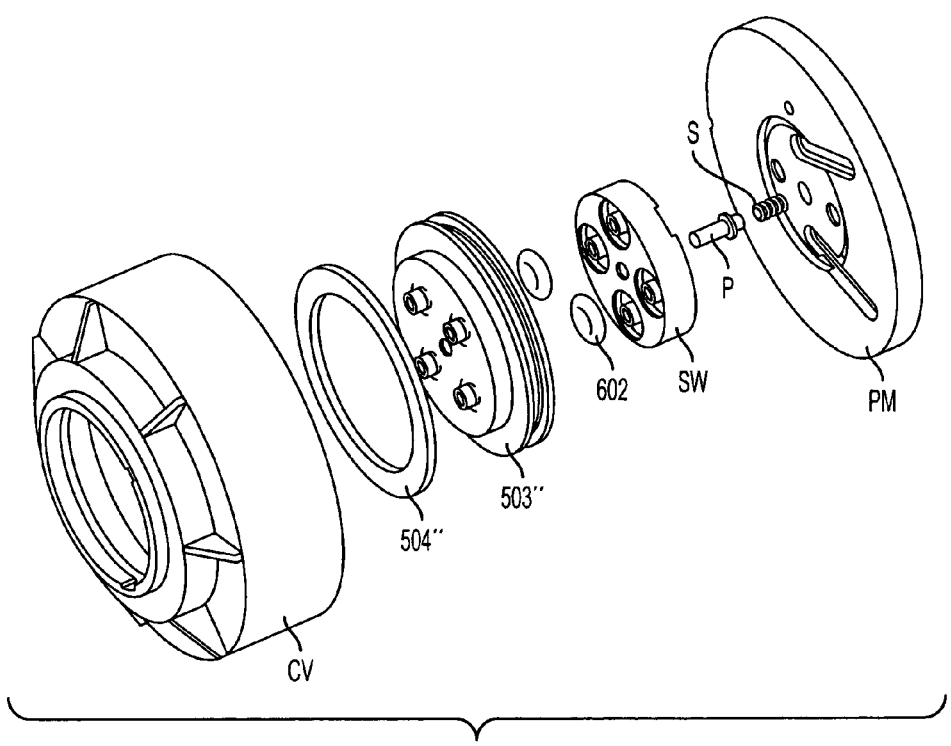
FIG. 46 show an exploded view of another non-limiting embodiment of a valve male portion similar to the valve male portion shown in FIGS. 23–26 and illustrates the individual parts thereof.

FIG. 46 shows a view of a male portion of another preferred modification of the valve 700' shown in FIGS.

Figure 47A:
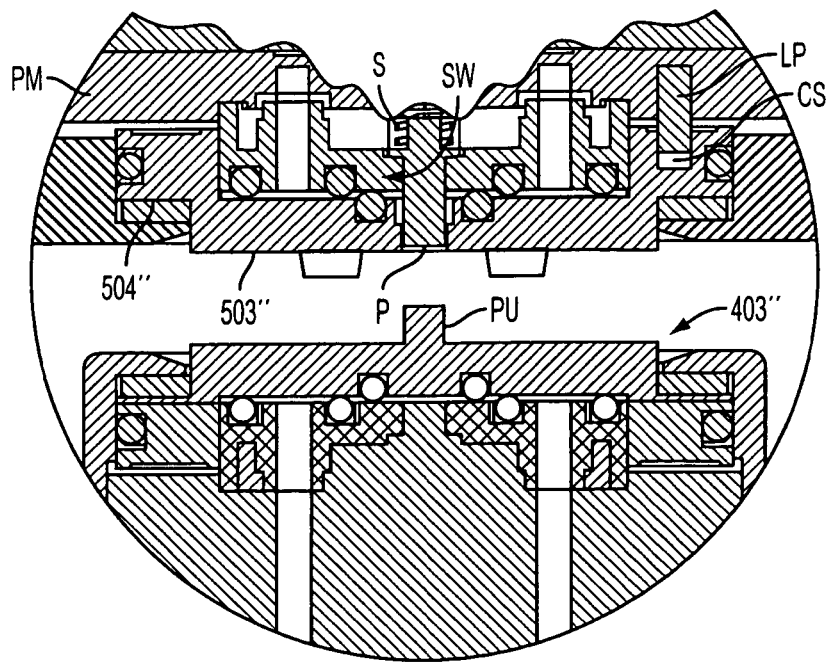
FIG. 47a shows a partial cross-section view of the embodiment shown in FIG. 46 with the cover being removed as well as positions of a female member of a valve.

23–26. FIG. 47a shows the male portion of FIG. 46 arranged above the female portion. The male portion includes a cover CV, a washer spring 504", a washer 503", four O-rings, e.g., 602, a sealing washer SW, a pin P, a spring S and a plate member PM. This embodiment illustrates one non-limiting way in which the washer 503" can be locked in the closed position when the male valve is disconnected from the female portion. As can be seen from FIG. 47a, a pushing projection PU extends from the washer 403" of the female member. When the male and female portions are brought into contact with one another, this projection PU contacts the pin P and pushes it against the biasing force of the spring S. When this occurs, the pin P disengages from the washer 503". This, in turn, releases the washer 503" from a locking position (the locking position being caused by engagement between the pin P and opening OO of the washer 503"). The washer 503" is now free to rotate to the open position (by rotating the male member relative to the fame member as was described with regard to FIGS. 23–26) wherein the fluid communication openings are aligned with those of the sealing washer SW and the plate member PM of the male member, as well as those of the female member. In order to ensure that male member and female member are not rotated beyond a desired angle, a limiting pin LP extends from the plate member PM and rides in a curved slot CS of the washer 503". In the position shown in FIG. 47a, the male member and female members have not been connected to each other, thus the washers 503" and 403" are in the closed position. This means that the pin P is engaged with the washer 503" such that the washer 503" cannot rotate to the open position.

Figure 47B:
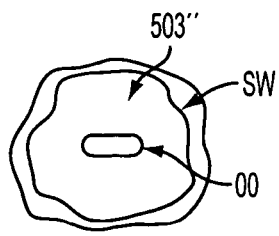
FIG. 47b shows a top partial view of the washer arranged above the sealing washer of FIG. 47a. The figure illustrates the oval/elongated opening which receives therein the pin.
Figure 47C:
Figure 47D:
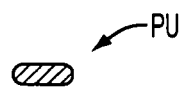
Figure 47E:
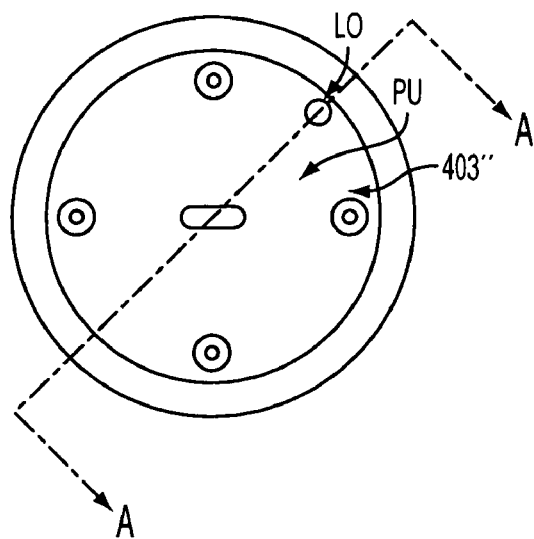
FIG. 47e shows a top view of the female portion of the valve shown in FIG. 47a and illustrates the washer with its locking opening and pushing projection.
Figure 47F:
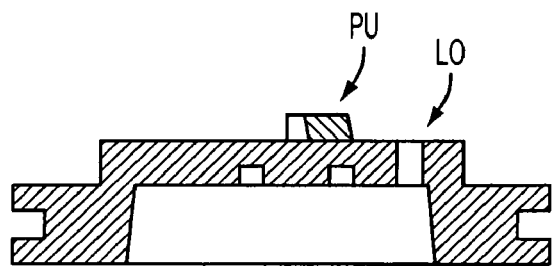
FIG. 47f shows a cross-section view of the washer shown in FIG. 47e and illustrates the locking opening and pushing projection.
Figure 47G:
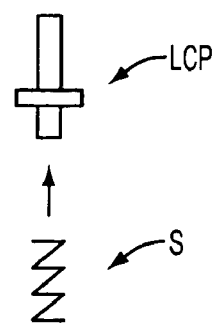
FIG. 47g shows a side view of the locking pin and spring which are used to, lock the washer of the female member in the closed position.

FIG. 47b shows a top partial view of the washer 502" arranged above the sealing washer SW of FIG. 47a. The figure illustrates the oval/elongated opening OO which receives therein the pin P. The tip portion of the pin P also has an oval/elongated cross-section that is sized to slide into the opening OO to prevent the washer 503" from rotating. Using such a configuration, the washer 502" is prevented from rotating into a position wherein its openings are aligned with those of the sealing washer SW and plate member PM when the male member is disconnected from the female member. FIG. 47d shows a cross-section view of the tip portion of the pushing projection shown in FIG. 47a. When the male and female members are brought into a connected state, the pushing projection slides into opening OO to force the pin P out of engagement with the washer 503". At the same time, a circular projection (not shown) on the washer 503" extends into a locking opening LO of the washer 403". As is evident from FIGS. 47e–g, this projection forces a locking pin LCP out of engagement with to the opening LO. The locking pin LO is biased against the washer 403" via a spring S. Thus, connection of the male and female members causes pins P and LCP to respectively disengage from washers 502" and 403" so that these washers can rotate to the open position. Moreover, since the male and female portion of the valve cannot be disconnected with counter-rotating by the same amount by which there were rotated to the allow for fluid communication therebetween, once rotated back, the pins P and LCP are again aligned with openings OO and LO. Then, the male and female portions are disconnected from each other, the springs S bias the pins P, LCP into engagement with openings OO, LO, whereby the washers 503" and 403" are again locked in a closed rotational position whereby the fluid communication openings of the washers 503" and 403" are not aligned with the corresponding openings of the male and female portion of the valve. In this regard, FIG. 47e shows a top view of the female portion of the valve shown in FIG. 47a and illustrates the washer 403" with its locking opening LO and pushing projection PU. FIG. 47f shows a cross-section view of the washer 403" shown in FIG. 47e and illustrates the locking opening LO and pushing projection PU. FIG. 47g shows a side view of the locking pin LCP and spring S which are used to lock the washer 403" of the female member in the closed position.

It is noted that the cartridge or refilling device can be disposable and is preferably made of light-weight materials. It should also be noted that the exemplary dimensions, values, sizes, volumes, etc., disclosed herein are not intended to be limiting and may vary by as much as, e.g., 50% less to 150% more. Moreover, it should be noted that one way that the spent fluids of the cartridge can be recycled is to remove the male valve portion from the end plate 3 and allowing the contents to exit from opening IO (see e.g., FIGS. 1 and 13). The majority of parts of the cartridge can be made of polymer materials which are suitable for the fuel cell environment and which can withstand contact/exposure with fuel and electrolyte from a fuel cell and/or similar chemicals. Examples of non-limiting polymer materials include PVC, PP and polyurethane, etc.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A system for refilling a fuel cell, the system comprising:
   a main container comprising at least one movable fuel container, at least one movable electrolyte container, and at least one spent fuel chamber; and
   a valve which regulates or controls fluid flow between the main container and a fuel cell and vice versa.

2. The system of claim 1, wherein the at least one movable fuel container comprises a bellows.

3. The system of claim 1, wherein the at least one movable fuel container comprises an axially compressible container.

4. The system of claim 1, wherein the at least one movable fuel container comprises a variable volume container.

5. The system of claim 1, wherein the at least one movable electrolyte container comprises a bellows.

6. The system of claim 1, wherein the at least one movable electrolyte container comprises an axially compressible container.

7. The system of claim 1, wherein the at least one movable electrolyte container comprises a variable volume container.

8. The system of claim 1, further comprising an outer sleeve movably mounted to the main container.

9. The system of claim 1, wherein the main container comprises an outer wall which surrounds the at least one movable fuel container, the at least one movable electrolyte container, and the at least one spent fuel chamber.

10. The system of claim 1, wherein the at least one spent fuel chamber comprises a first spent fuel chamber and a second spent fuel chamber.

11. The system of claim 10, wherein the at least one movable fuel container is movable between a position inside the first spent fuel chamber to a position outside the first spent fuel chamber.

12. The system of claim 11, wherein the at least one movable electrolyte container is movable between a position inside the second spent fuel chamber to a position outside the second spent fuel chamber.

13. The system of claim 12, further comprising a separating wall arranged between the first and second spent fuel chambers.

14. The system of claim 10, wherein the at least one movable electrolyte container is movable between a position inside the second spent fuel chamber to a position outside the second spent fuel chamber.

15. The system of claim 1, further comprising a piston coupled to the at least one movable fuel container, wherein the piston is movable within the at least one spent fuel chamber.

16. The system of claim 1, further comprising a piston coupled to the at least one movable electrolyte container, wherein the piston is movable within the at least one spent fuel chamber.

17. The system of claim 1, wherein the at least one spent fuel chamber comprises a first spent fuel chamber and a second spent fuel chamber, and further comprising:
a first piston coupled to the at least one movable fuel container, wherein the first piston is movable within the first spent fuel chamber; and
a second piston coupled to the at least one movable electrolyte container, wherein the second piston is movable within the second spent fuel chamber.

18. The system of claim 1, further comprising fuel arranged within the at least one movable fuel container and electrolyte arranged within the at least one movable electrolyte container.

19. The system of claim 1, wherein the valve comprises a first part which is coupled to the main container and a second part which is coupled to the fuel cell.

20. The system of claim 19, wherein the first part is rotatably mounted to the second part.

21. The system of claim 19, wherein the first part is releasably connectable to the second part.

22. The system of claim 21, wherein, when the first part is disconnected from the second part, the first part prevents fluid from exiting out of the main container and the second part prevents fluid from exiting out of the fuel cell.

23. The system of claim 1, wherein the valve comprises a closed position and an opened position.

24. The system of claim 1, wherein the valve comprises a plurality of exit ports which are in fluid communication with the fuel cell.

25. The system of claim 1, further comprising a securing cap that secures the main container to the valve.

26. A method of refilling a fuel cell with a valve and a main container that comprises at least one movable fuel container, at least one movable electrolyte container, and at least one spent fuel chamber, the method comprising:
moving the at one movable fuel container and the at least one movable electrolyte container to cause spent fuel from fuel cell to enter the at least one spent fuel chamber.

27. The method of claim 26, further comprising controlling fluid flow between the main container and a fuel cell.

28. The method of claim 26, further comprising, after the moving, compressing the least one of the at one movable fuel container and the at least one movable electrolyte container to cause fuel and electrolyte to enter into the fuel cell.

29. The method of claim 26, further comprising, after the moving, forcing fuel and electrolyte to enter into the fuel cell from the least one of the at one movable fuel container and the at least one movable electrolyte container.

30. The method of claim 29, wherein the at least one movable fuel container comprises a bellows container.

31. The system of claim 29, wherein the at least one movable fuel container comprises a axially compressible container.

32. The method of claim 26, further comprising, before the moving, coupling one portion of the valve to the main container and another portion of the valve to the fuel cell.

33. The method of claim 26, further comprising, before the moving, placing the valve in fluid communication with the main container and the fuel cell.

34. The method of claim 26, further comprising, before the moving, coupling one portion of the valve to the main container and another portion of the valve to the fuel cell and thereafter connecting the one portion to the another portion.

35. The method of claim 34, further comprising controlling fluid flow between the main container and a fuel cell and vice versa with the valve.

36. The method of claim 26, further comprising, before the moving, securely attaching a male portion of the valve to the main container and securely attaching a female portion of the valve to the fuel cell and thereafter connecting the male portion and the female portion to each other.

37. The method of claim 36, further comprising, after the moving, disconnecting the male portion of the valve from the female portion of the valve, and preventing, with the male portion, spent fuel from exiting the main container and preventing, with the female portion, fuel and electrolyte from exiting the fuel cell.

38. A cartridge for refilling a fuel cell, the cartridge comprising:
a main container comprising at least one movable fuel container, at least one movable electrolyte container, and at least one spent fuel chamber; and
a device that moves the at least one movable fuel container and at least one movable electrolyte container.

39. The cartridge of claim 38, wherein the device comprises an outer sleeve which is coupled to the at least one movable fuel container and the at least one movable electrolyte container.

40. The cartridge of claim 38, wherein the at least one movable fuel container comprises a bellows.

41. The cartridge of claim 38, wherein the at least one movable fuel container comprises an axially compressible container.

42. The cartridge of claim 38, wherein the at least one movable fuel container comprises a variable volume container.

43. The cartridge of claim 38, wherein the at least one movable electrolyte container comprises a bellows.

44. The cartridge of claim 38, wherein the at least one movable electrolyte container comprises an axially compressible container.

45. The system of claim 38, wherein the at least one movable electrolyte container comprises a variable volume container.

46. The cartridge of claim 38, wherein the at least one movable fuel container comprises an outer bellows container and an inner bellow container.

47. The cartridge of claim 38, wherein the main container comprises an outer wall which surrounds the at least one movable fuel container, the at least one movable electrolyte container, and the at least one spent fuel chamber.

48. The cartridge of claim 38, wherein the at least one spent fuel chamber comprises a first spent fuel chamber and a second spent fuel chamber.

49. The cartridge of claim 48, wherein the at least one movable fuel container is movable between a position inside the first spent fuel chamber to a position outside the first spent fuel chamber.

50. The cartridge of claim 49, wherein the at least one movable electrolyte container is movable between a position inside the second spent fuel chamber to a position outside the second spent fuel chamber.

51. The cartridge of claim 50, further comprising a separating wall arranged between the first and second spent fuel chambers.

52. The cartridge of claim 49, wherein the at least one movable electrolyte container is movable between a position inside the second spent fuel chamber to a position outside the second spent fuel chamber.

53. The cartridge of claim 38, further comprising a piston coupled to the at least one movable fuel container, wherein the piston is movable within the at least one spent fuel chamber.

54. The cartridge of claim 38, further comprising a piston coupled to the at least one movable electrolyte container, wherein the piston is movable within the at least one spent fuel chamber.

55. The cartridge of claim 38, wherein the at least one spent fuel chamber comprises a first spent fuel chamber and a second spent fuel chamber, and further comprising:
   a first piston coupled to the at least one movable fuel container, wherein the first piston is movable within the first spent fuel chamber; and
   a second piston coupled to the at least one movable electrolyte container, wherein the second piston is movable within the second spent fuel chamber.

56. The cartridge of claim 38, further comprising fuel arranged within the at least one movable fuel container and electrolyte arranged within the at least one movable electrolyte container.

57. The cartridge of claim 38, further comprising a valve coupled to the main container.

58. The cartridge of claim 57, wherein the valve comprises first and second parts and wherein the first is disconnectable from a second part, whereby the first part prevents fluid from exiting out of the main container and the second part prevents fluid from exiting out of a fuel cell.

59. The cartridge of claim 57, wherein the valve comprises a closed position and an opened position.

60. The cartridge of claim 57, wherein the valve comprises a plurality of exit ports which are adapted for fluid communication with the fuel cell.

61. The cartridge of claim 38, further comprising a valve and a securing cap that secures the main container to the valve.

62. A system for refilling a fuel cell, the system comprising:
   a main container comprising at least one movable fuel container, at least one movable electrolyte container, and two spent fuel chambers; and
   a valve which regulates or controls fluid flow between the main container and a fuel cell and vice versa;
   the valve comprising a first portion coupled to the main container and a second portion coupled to the fuel cell, wherein the first portion is removably connectable to the second portion.

63. The system of claim 62, wherein the at least one movable fuel container comprises a bellows.

64. The system of claim 62, wherein the at least one movable fuel container comprises an axially compressible container.

65. The system of claim 62, wherein the at least one movable fuel container comprises an outer bellows and an inner bellows.

66. The system of claim 62, wherein the at least one movable electrolyte container comprises a bellows.

67. The system of claim 62, wherein the at least one movable electrolyte container comprises a axially compressible container.

68. The system of claim 62, wherein the at least one movable electrolyte container comprises a variable volume container.

69. The system of claim 62, further comprising an outer sleeve movably mounted to the main container.

70. The system of claim 62, wherein the main container comprises an outer wall which surrounds the at least one movable fuel container, the at least one movable electrolyte container, and the two spent fuel chambers.

71. The system of claim 62, wherein the two spent fuel chambers are configured to retain therein the at least one movable fuel container and the at least one movable electrolyte container.

72. The system of claim 62, wherein the at least one movable fuel container is movable between a position inside one of the two spent fuel chambers to a position outside thereof.

73. The system of claim 62, wherein the at least one movable electrolyte container is movable between a position inside one of the two spent fuel chambers to a position outside thereof.

74. The system of claim 62, further comprising a separating wall arranged between the two spent fuel chambers.

75. The system of claim 62, wherein each of the at least one movable fuel and electrolyte containers are movable between a position inside the two spent fuel chambers to a position outside thereof.

76. The system of claim 62, further comprising a piston coupled to the at least one movable fuel container, wherein the piston is movable within one of the two spent fuel chambers.

77. The system of claim 62, further comprising a piston coupled to the at least one movable electrolyte container, wherein the piston is movable within one of the two spent fuel chambers.

78. The system of claim 62, further comprising:
   a first piston coupled to the at least one movable fuel container, wherein the first piston is movable within one of the two spent fuel chambers; and
   a second piston coupled to the at least one movable electrolyte container, wherein the second piston is movable within another of the two spent fuel chambers.

79. The system of claim 62, further comprising fuel arranged within the at least one movable fuel container and electrolyte arranged within the at least one movable electrolyte container.

80. The system of claim 62, wherein the first portion is non-removably connected to the main container and the second portion is non-removably connected to the fuel cell.

81. The system of claim 62, wherein the first portion is securely and sealingly connected to the main container and the second portion is securely and sealingly connected to the fuel cell.

82. The system of claim 62, wherein the first portion is rotatably mounted to the second portion.

83. The system of claim 62, wherein, when the first portion is disconnected from the second portion, the first portion prevents fluid from exiting out of the main container and the second portion prevents fluid from exiting out of the fuel cell.

84. The system of claim 62, wherein the valve comprises a closed position and an opened position.

85. The system of claim 62, wherein the valve comprises a plurality of exit ports which are in fluid communication with the fuel cell.

86. A method of refilling a fuel cell with a valve and a main container that comprises an outer sleeve, at least one movable fuel container, at least one movable electrolyte container, and two spent fuel chambers, the method comprising:
moving an outer sleeve to cause the at least one movable fuel container and the at least one movable electrolyte container to cause spent fuel from fuel cell to enter the two spent fuel chambers; and
forcing fuel and electrolyte to enter into the fuel cell from the at least one movable fuel container and the at least one movable electrolyte container.

87. The method of claim 86, wherein the forcing comprises compressing the at least one movable fuel container and the at least one movable electrolyte container to cause fuel and electrolyte to enter into the fuel cell.

88. The method of claim 86, further comprising controlling fluid flow between the main container and a fuel cell with the valve.

89. The method of claim 86, wherein the at least one movable fuel container comprises a bellows container.

90. The method of claim 86, wherein the at least one movable fuel container comprises a axially compressible container.

91. The method of claim 86, further comprising, before the moving, coupling one portion of the valve to the main container and another portion of the valve to the fuel cell.

92. The method of claim 86, further comprising, before the moving, placing the valve in fluid communication with the main container and the fuel cell.

93. The method of claim 86, further comprising, before the moving, coupling one portion of the valve to the main container and another portion of the valve to the fuel cell and thereafter connecting the one portion to the another portion.

94. The method of claim 93, further comprising controlling fluid flow between the main container and a fuel cell and vice versa with the valve.

95. The method of claim 86, further comprising, before the moving, securely attaching a male portion of the valve to the main container and securely attaching a female portion of the valve to the fuel cell and thereafter connecting the male portion and the female portion to each other.

96. The method of claim 95, further comprising, after the moving, disconnecting the male portion of the valve from the female portion of the valve, and preventing, with the male portion, spent fuel from exiting the main container and preventing, with the female portion, fuel and electrolyte from exiting the fuel cell.

97. A cartridge for refilling a fuel cell, the cartridge comprising:
a main container comprising at least one movable and compressible fuel container, at least one movable and compressible electrolyte container, and two spent fuel chambers; and
a device that moves the at least one movable and compressible fuel and electrolyte containers from a position within the two spent fuel chambers to a position at least partially outside thereof.

98. The cartridge of claim 97, wherein the device comprises an outer sleeve which is coupled to the at one movable and compressible fuel and electrolyte containers.

99. The cartridge of claim 97, wherein the at least one movable and compressible fuel container comprises a bellows.

100. The cartridge of claim 97, wherein the at least one movable and compressible fuel container comprises an axially compressible container.

101. The cartridge of claim 97, wherein the at least one movable and compressible fuel container comprises a variable volume container.

102. The cartridge of claim 97, wherein the at least one movable and compressible electrolyte container comprises a bellows.

103. The cartridge of claim 97, wherein the at least one movable and compressible electrolyte container comprises an axially compressible container.

104. The system of claim 97, wherein the at least one movable and compressible electrolyte container comprises a variable volume container.

105. The cartridge of claim 97, wherein the at least one movable and compressible fuel container comprises an outer bellows container and an inner bellow container.

106. The cartridge of claim 97, wherein the main container comprises an outer wall which surrounds the at least one movable and compressible fuel container, the at least one movable and compressible electrolyte container, and the two spent fuel chambers.

107. The cartridge of claim 97, wherein the two spent fuel chambers comprises a first spent fuel chamber and a second spent fuel chamber.

108. The cartridge of claim 107, further comprising a separating wall arranged between the first and second spent fuel chambers.

109. The cartridge of claim 97, further comprising a piston coupled to the at least one movable and compressible fuel container, wherein the piston is movable within one of the two spent fuel chambers.

110. The cartridge of claim 97, further comprising a piston coupled to the at least one movable and compressible electrolyte container, wherein the piston is movable within one of the two spent fuel chambers.

111. The cartridge of claim 97, further comprising:
a first piston coupled to the at least one movable and compressible fuel container, wherein the first piston is movable within one of the two spent fuel chambers; and
a second piston coupled to the at least one movable and compressible electrolyte container, wherein the second piston is movable within another of the two spent fuel chambers.

112. The cartridge of claim 97, further comprising fuel arranged within the at least one movable fuel container and electrolyte arranged within the at least one movable electrolyte container.

113. The cartridge of claim 97, further comprising a valve coupled to the main container.

114. The cartridge of claim 113, wherein the valve comprises first and second parts and wherein the first is disconnectable from a second part, whereby the first part prevents fluid from exiting out of the main container and the second part prevents fluid from exiting out of a fuel cell.

115. The cartridge of claim 113, wherein the valve comprises a closed position and an opened position.

116. The cartridge of claim 113, wherein the valve comprises a plurality of exit ports which are adapted for fluid communication with the fuel cell.

117. The cartridge of claim 97, further comprising a valve and a securing cap that secures the main container to the valve.

* * * * *